(12) United States Patent
Matsuoka et al.

(10) Patent No.: US 8,253,917 B2
(45) Date of Patent: Aug. 28, 2012

(54) SUBSTRATE FOR LIQUID CRYSTAL DISPLAY PANEL

(75) Inventors: Kohji Matsuoka, Suzuka (JP); Shinichi Hirato, Tsu (JP); Akihiro Shoraku, Suzuka (JP); Kenji Enda, Suzuka (JP); Tsuyoshi Tokuda, Tsu (JP); Toshihide Tsubata, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/023,616

(22) Filed: Feb. 9, 2011

(65) Prior Publication Data

US 2012/0044452 A1   Feb. 23, 2012

Related U.S. Application Data

(63) Continuation of application No. 11/574,766, filed as application No. PCT/JP2005/016564 on Sep. 2, 2005, now Pat. No. 7,911,578.

(30) Foreign Application Priority Data

Sep. 9, 2004 (JP) ................................. 2004-263091
Apr. 21, 2005 (JP) ................................. 2005-124330
Jul. 25, 2005 (JP) ................................. 2005-215044

(51) Int. Cl.
*G02F 1/1339* (2006.01)

(52) U.S. Cl. ....................................................... 349/156

(58) Field of Classification Search ........................ None
See application file for complete search history.

(56) References Cited

U.S. PATENT DOCUMENTS

| | | | |
|---|---|---|---|
| 6,535,264 B1 * | 3/2003 | Imabayashi et al. | 349/155 |
| 6,671,025 B1 | 12/2003 | Ikeda et al. | |
| 7,250,996 B2 * | 7/2007 | Yoshida et al. | 349/114 |
| 8,107,047 B2 * | 1/2012 | Song | 349/155 |
| 2001/0026347 A1 * | 10/2001 | Sawasaki et al. | 349/156 |
| 2004/0090582 A1 | 5/2004 | Ikeda et al. | |
| 2005/0007531 A1 * | 1/2005 | Okada et al. | 349/129 |
| 2005/0122452 A1 * | 6/2005 | Yoshida et al. | 349/114 |
| 2006/0103799 A1 | 5/2006 | Ikeda et al. | |
| 2007/0126973 A1 | 6/2007 | Ikeda et al. | |

FOREIGN PATENT DOCUMENTS

CN   1264844 A   8/2000

OTHER PUBLICATIONS

Matsuoka et al.; "Substrate for Liquid Crystal Display Panel"; U.S. Appl. No. 11/574,766, filed Mar. 6, 2007.
Matsuoka et al.; "Substrate for Liquid Crystal Display Panel"; U.S. Appl. No. 13/023,612, filed Feb. 9, 2011.

* cited by examiner

*Primary Examiner* — Sung Pak
(74) *Attorney, Agent, or Firm* — Keating & Bennett, LLP

(57) ABSTRACT

A substrate for a liquid crystal display panel includes a first projection structure and a second projection structure and/or a depression structure, the substrate for the liquid crystal display panel includes a specific structure at a part of or near the first projection structure, the specific structure having at least one of a planar shape different from a planar shape of the second projection structure and/or the depression structure and a planar area of ⅔ times or less or 1.5 times or more than a planar area of the second projection structure and/or the depression structure.

26 Claims, 92 Drawing Sheets

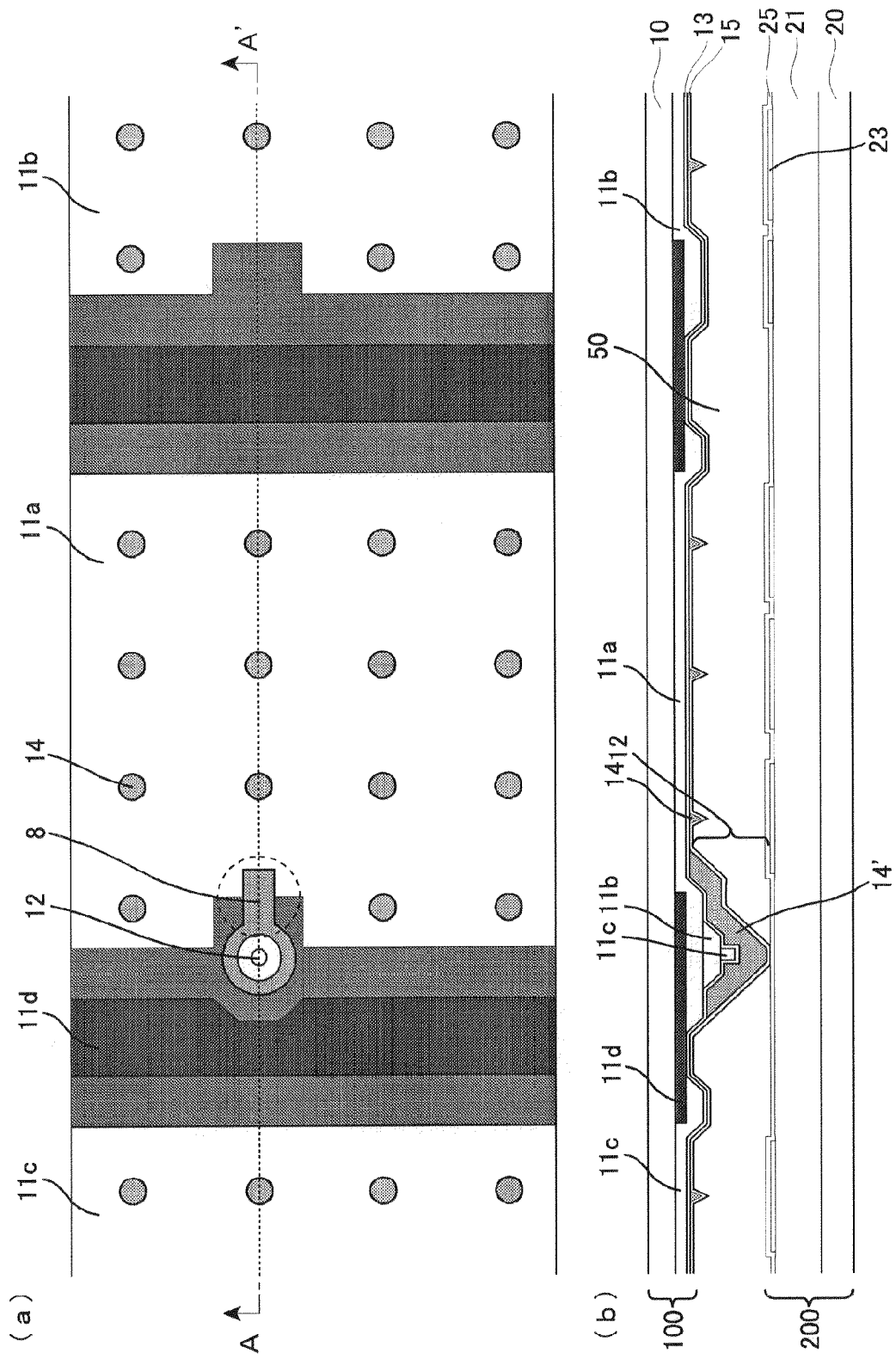

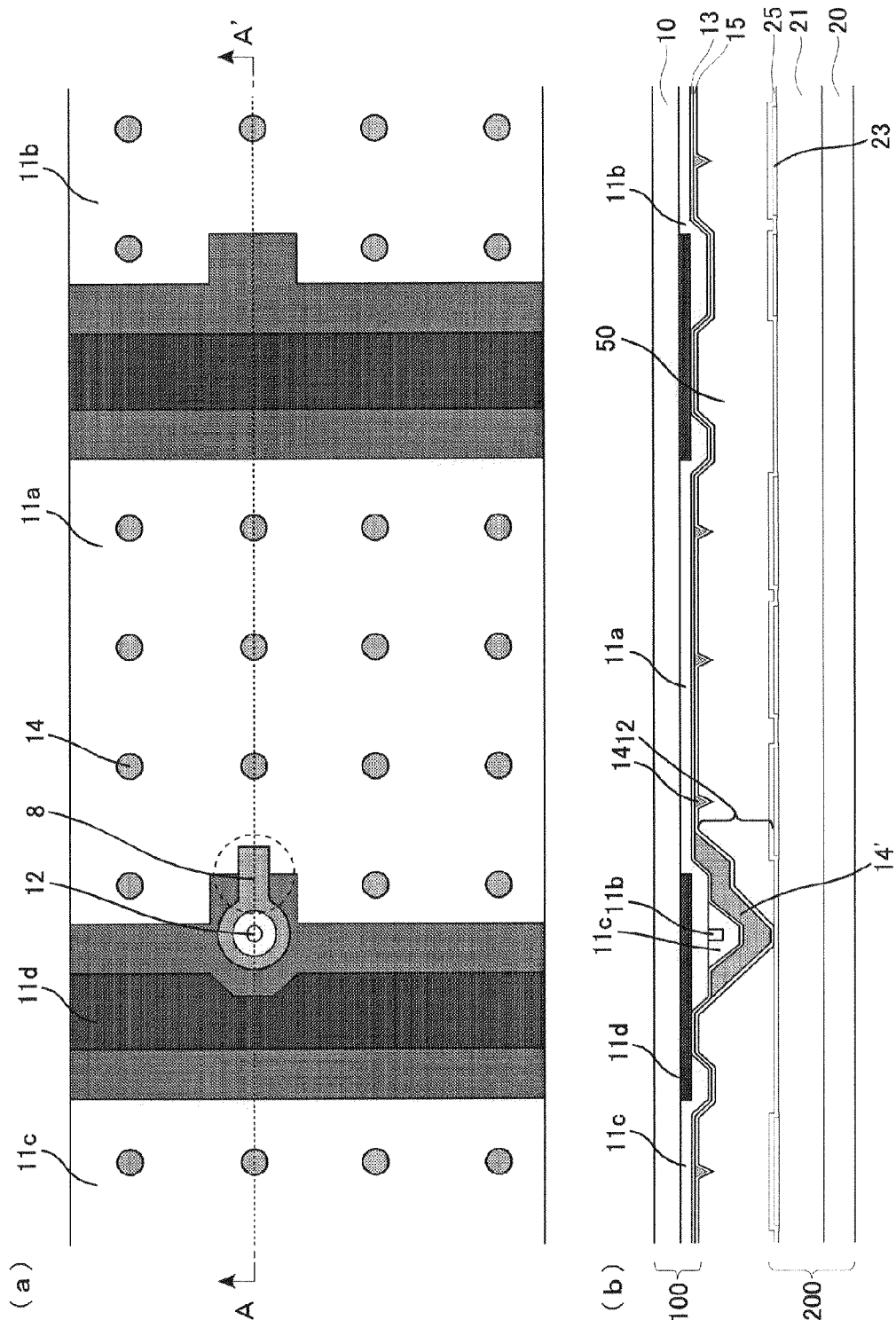

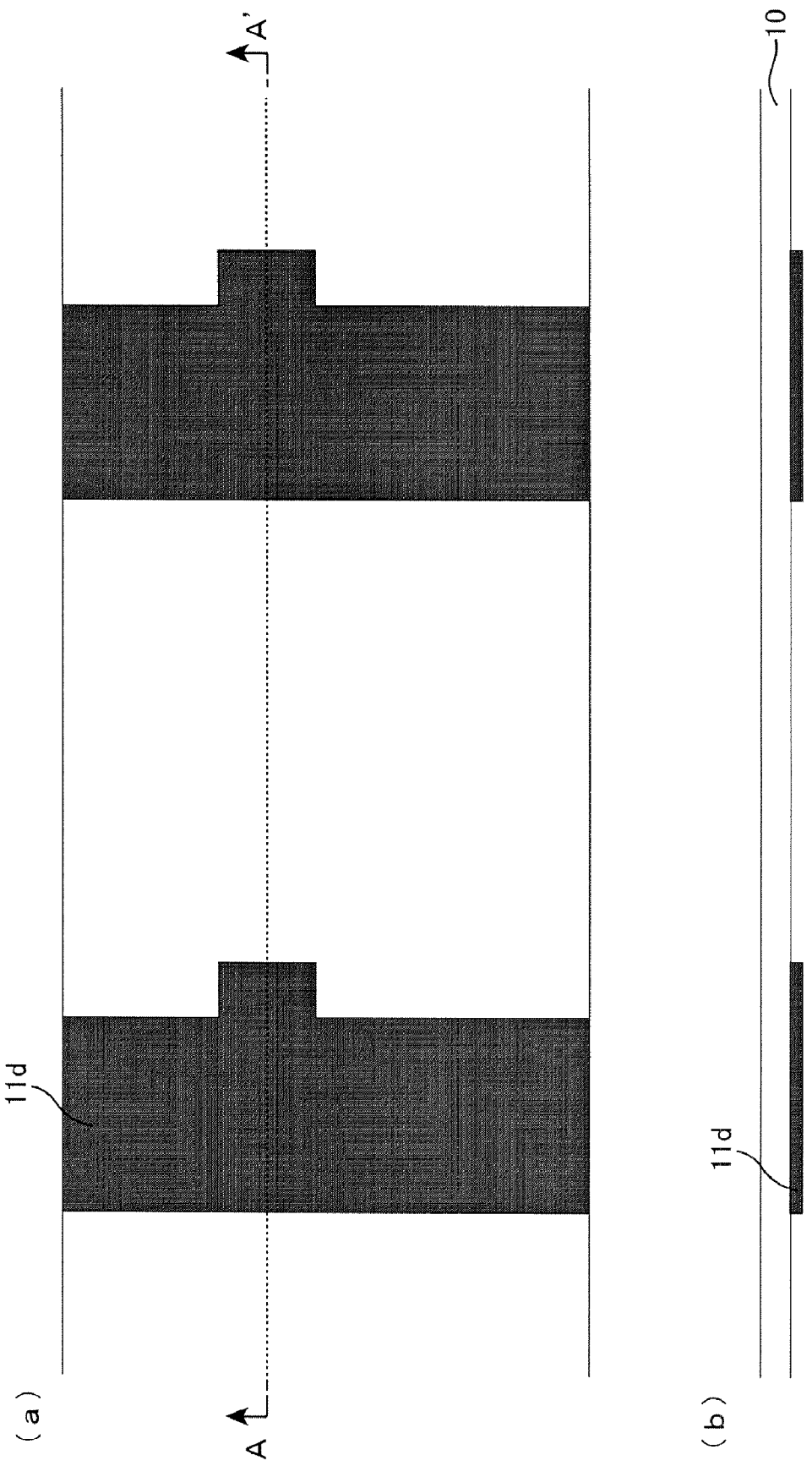

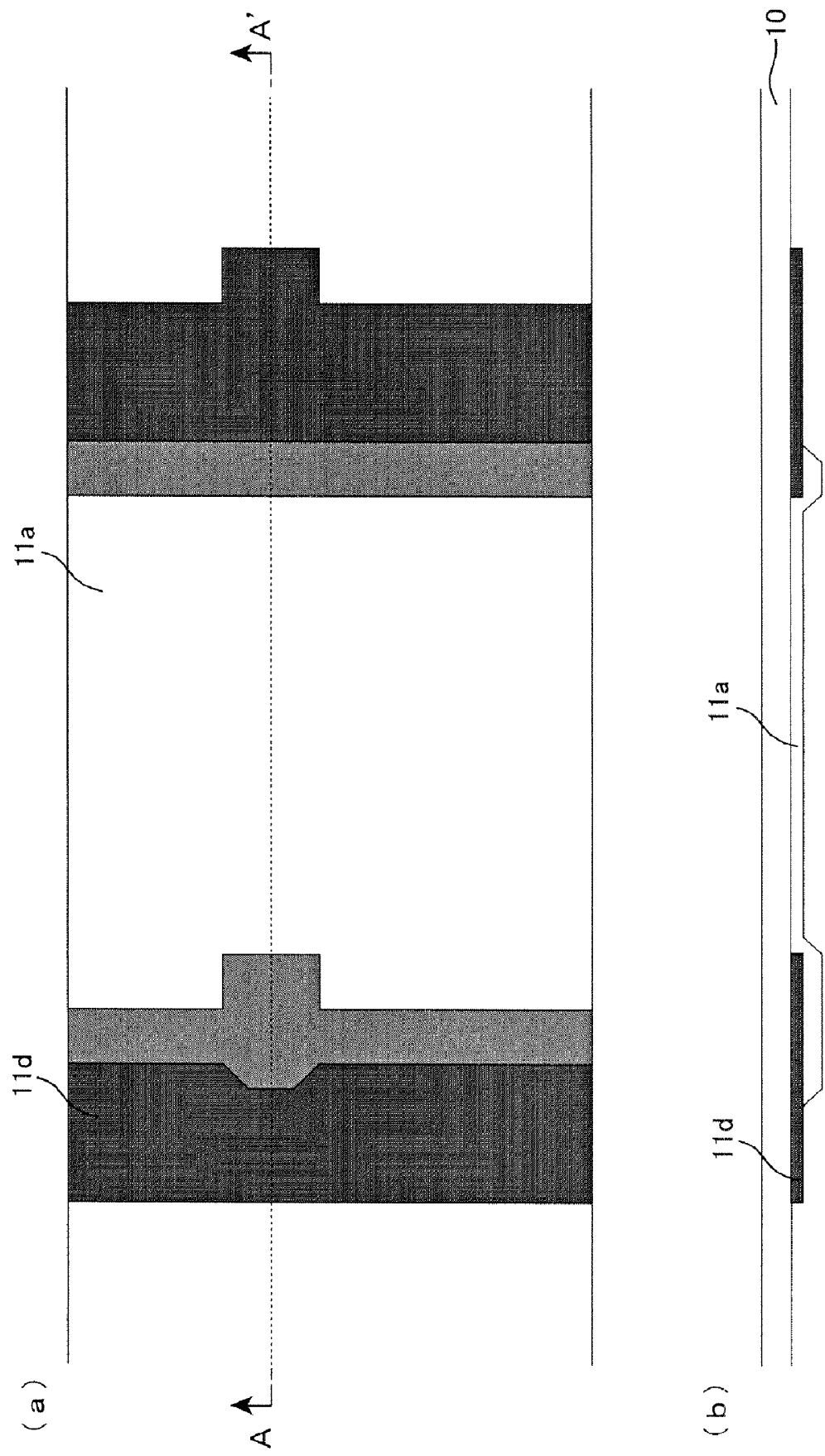

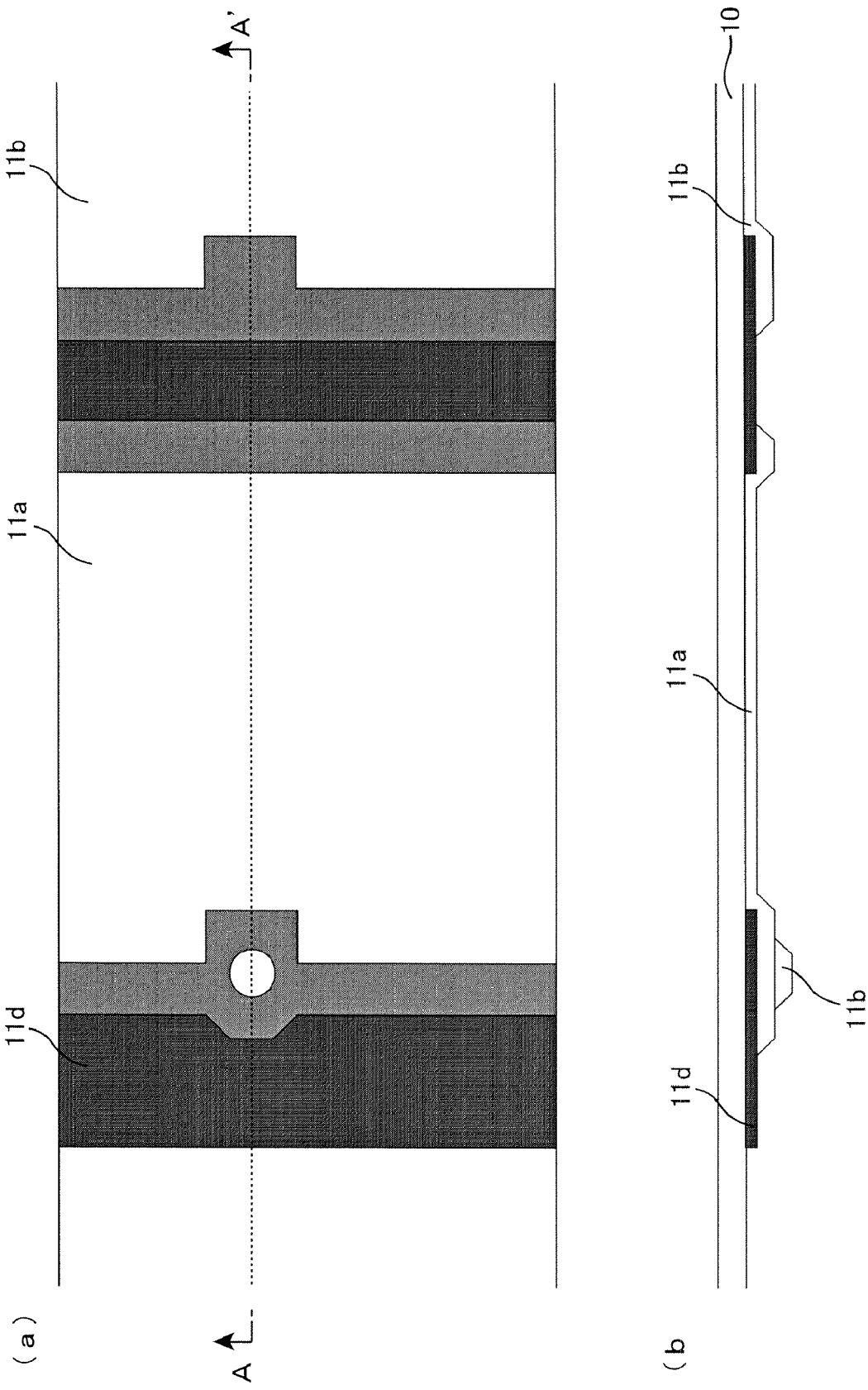

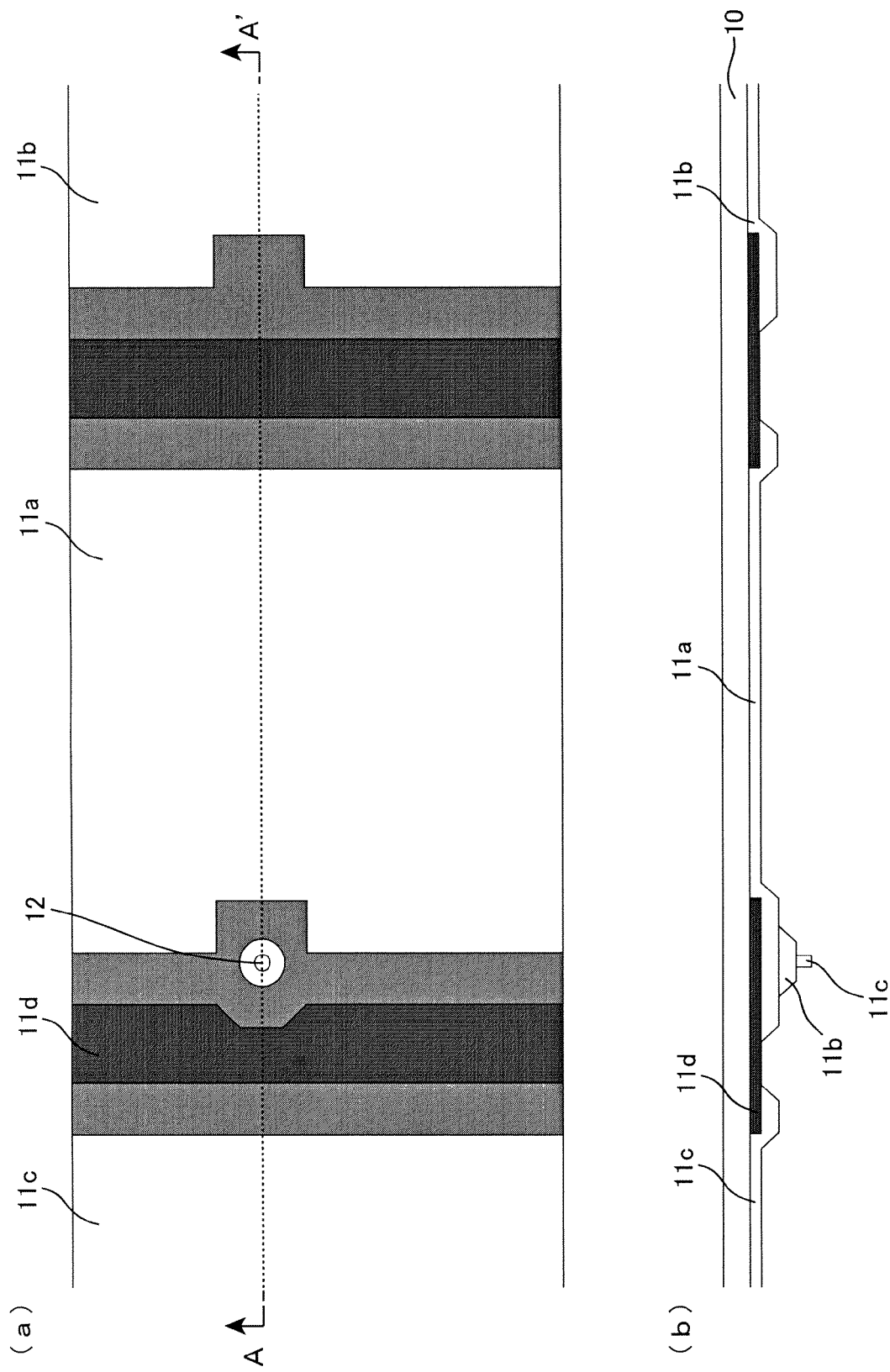

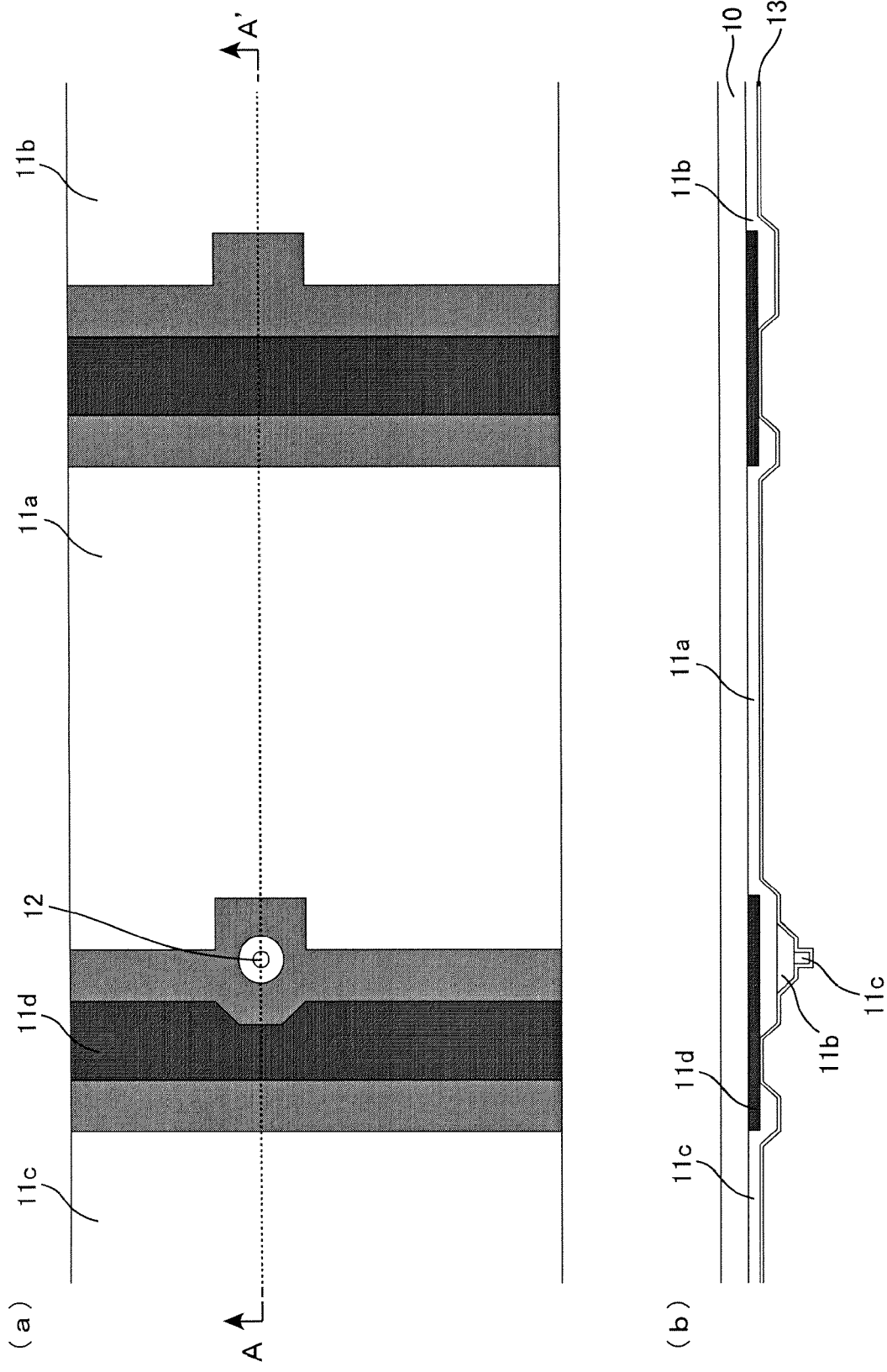

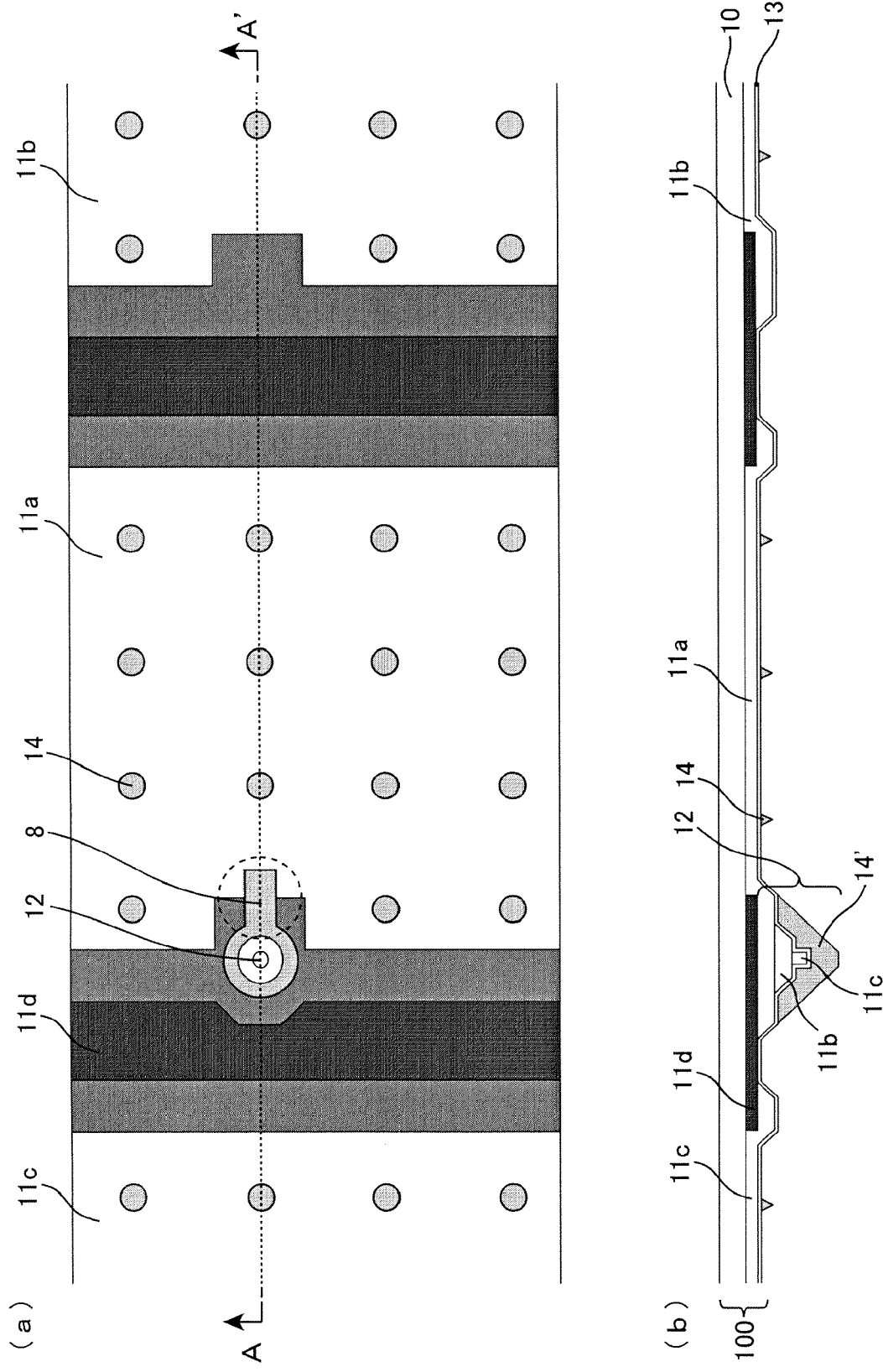

SUBSTRATE FOR LIQUID CRYSTAL DISPLAY PANEL

BACKGROUND OF THE INVENTION

1. Field of the Invention

The present invention relates to a substrate for liquid crystal display panel preferably used as a color filter substrate of liquid crystal display device. More particularly, it relates to a substrate for liquid crystal display panel preferably used as a color filter substrate of liquid crystal display device in multi-domain vertical alignment (MVA) mode and the like.

2. Description of the Related Art

The liquid crystal display device performs a display by controlling optical characteristics of light from a light source using a liquid crystal layer filled in a liquid crystal display panel, and the device is used in various fields because of its characteristics such as thin, light and low power consumption.

In general, a liquid crystal display panel which is a main member of such a liquid crystal display device has a structure in which a liquid crystal is sandwiched between a switching element array substrate and a color filter (CF) substrate and a thickness (cell gap) of a liquid crystal layer is maintained by a spacer arranged between the substrates. As the spacer, a sphere spacer formed of plastic or an inorganic material and the like and a columnar spacer formed of resin material and the like are known. It is preferable that the spacer is selectively arranged in a light shielding area (outside a display area) on a black matrix and the like so as not to lower display quality of the liquid crystal display device. In this respect, since the sphere spacer is spread so as to be arranged on a substrate in general, a high controlling technique is required in order to arrange it in a desired position. Meanwhile, the columnar spacer can be directly formed on a substrate by a photolithography method and the like using a photosensitive resin and the like. Therefore, it is superior in highly precise arrangement. In addition, the columnar spacer formed by such photolithography method is called a photo spacer (PS) also.

Conventionally, after the switching element array substrate and CF substrate are manufactured, the liquid crystal display panel is manufactured through a process of aligning, a process of bonding both substrates, a process of filling the liquid crystal and the like. In this case, the liquid crystal is filled by a vacuum injecting method. According to the vacuum injecting method, after both switching element array substrate and CF substrate are bonded, the bonded substrate is soaked in a liquid crystal bath and the liquid crystal is filled between the substrates by vacuum suction.

However, the liquid crystal display panel becomes larger recently and therefore the filling method of the liquid crystal is changed from the vacuum injecting method to a one drop filling method (a falling-drop method) in order to shorten the filling time of the liquid crystal. According to the one drop filling method, after the liquid crystal is dropped on one substrate (generally, on the CF substrate), the switching element array substrate and the CF substrate are bonded. Therefore, the liquid crystal can be filled in several minutes even in the case of a large-size liquid crystal display panel. Meanwhile, when the one drop filling method is used, it is necessary to strictly control an amount of the liquid crystal to be dropped in order to prevent an air bubble and the like in the liquid crystal layer. And when the liquid crystal is filled in the liquid crystal display panel having a projection structure such as PS, it is necessary to precisely measure a height and the like of the projection structure on the substrate to previously determine the amount of the liquid crystal to be dropped every cell.

As a method of measuring the height of the projection structure such as the PS without contacting a surface measured, a measuring technique using light interference (white light interference) is known, for example. When the height of the projection structure is automatically measured by the measuring technique using the while light interference, the most characteristic pattern (positioning part), distance data between the positioning part and a reference point (base point), and distance data between the positioning part and a top of the projection structure is previously set in a viewing range (measuring area) of an image recognition device. Thus, at the time of measurement, a measuring head is moved to the measuring area to perform rough origin setting (rough alignment) and then the positioning part is searched and precise origin setting is performed. Then, the top (coordinate) of the projection structure and the reference point are specified based on the above-mentioned distance data. Finally, the vicinity of the projection structure is irradiated with light from a white light source in a state in which an inclination angle is kept constant to form an interference stripe. And then height difference between the reference point and the top of the projection structure is measured by measuring a distance between the interference stripes.

When the PS height is automatically measured by such a measuring device, the positioning part for the origin setting by the measuring device has to exist on the substrate. However, when the projection structure on the substrate is used as the positioning part in case of the substrate for liquid crystal display panel, the positioning part could be confused with other patterns since many projection structures such as the columnar spacer and the protrusion for controlling an alignment are provided on the substrate. In addition, it is necessary to arrange the positioning part at a predetermined position precisely. When the PS (stacked PS) having a stacked structure is used as the positioning part, for example, the configuration of the interference stripe of the stacked PS formed by the white light interference is changed every measurement because of alignment shift of each layer, which causes a malfunction of the height measuring device. Thus, the substrate for liquid crystal display panel comprising a positioning part which can be appropriately used in origin setting by a measuring device has been demanded when PS height is measured.

In addition, the constitution of the columnar spacer is disclosed in many documents, for example, a CF substrate and the like in which a stacked PS is formed on a black matrix has been disclosed. However, there is no description about providing a positioning part used when the height of the columnar spacer is measured. Refer to Japanese Kokai Publication Hei-09-120063 (Patent Document 1), Japanese Kokai Publication Hei-10-232310 (Patent Document 2), Japanese Kokai Publication Hei-11-64618 (Patent Document 3), Japanese Kokai Publication Hei-11-248921 (Patent Document 4), Japanese Kokai Publication 2000-147234 (Patent Document 5), Japanese Kokai Publication No. 2000-258617 (Patent Document 6), Japanese Kokai Publication No. 2001-51266 (Patent Document 7), and Japanese Kokai Publication No. 2002-162629 (Patent Document 8), for example.

Regarding the positioning part provided on the substrate for liquid crystal display panel, it is disclosed that a positioning part used when the substrates are aligned at the time of bonding or a positioning part used in alignment of a mask at the time of forming a metal film pattern in a peripheral area of the substrate is arranged. However, there is room for improvement of a positioning part used in measuring PS height in view of its forming method and its arrangement. Refer to Japanese Kokai Publication No. Hei-09-127546 (Patent Document 9), Japanese Kokai Publication No. Hei-09-197434 (Patent Document 10), and Japanese Kokai Publication No. Hei-10-123549 (Patent Document 11), for example.

SUMMARY OF THE INVENTION

The present invention was made in view of the above problems and it is an object of the present invention to provide a substrate for liquid crystal display panel having a structure in which a height of a projection structure such as a columnar spacer provided on the substrate can be automatically measured by a measuring device, a liquid crystal display panel and a liquid crystal display device using it, and an examining method of the substrate for the liquid crystal display panel and a manufacturing method of the liquid crystal display panel using it.

The inventors of the present invention have studied a method of measuring a height of a projection structure such as a columnar spacer provided on a substrate for liquid crystal display panel and focused on the fact that a measuring technique using white light interference is effective in automatically measuring a height of a projection structure easily while preventing damage of a substrate. Thus, the inventors found that when a specific structure is provided at a part of or near a first projection structure to be measured as a positioning part, and the specific structure has at least one of a planar shape different from a planar shape of a second projection structure (an other kind projection structure) and/or a depression structure and a planar area of ⅔ times or less or 1.5 times or more than a planar area of the second projection structure and/or the depression structure, the first projection structure to be measured with a measuring device could be specified and its height could be measured with high precision, even if the second projection structure and/or the depression structure existed on the substrate. Thus, the above problems were solved, leading to completion of the present invention.

That is, a substrate for liquid crystal display panel according to the present invention comprises a first projection structure and a second projection structure and/or a depression structure, the substrate for liquid crystal display panel comprising a specific structure at apart of or near the first projection structure, the specific structure having at least one of a planar shape different from a planar shape of the second projection structure and/or the depression structure and a planar area of ⅔ times or less or 1.5 times or more than a planar area of the second projection structure and/or the depression structure. In addition, the projection structure is an area formed by a protrusion in the substrate and is higher than a reference point of the height level in the substrate. The depression structure is an area formed by a slit (groove), a hole and the like in the substrate and is lower than a reference point of the height level in the substrate. The specific structure is provided at a part of or near the first projection structure to be measured, and has a shape different from a part or the whole part of the second projection structure and/or the depression structure, or has an area of ⅔ times or less or 1.5 times or more than that of the second projection structure and/or the depression structure as viewed in plane from a direction of a normal line to a substrate face. According to the present invention, the configuration in which the specific structure has a shape different from that of a part or the whole part of the second projection structure and/or the depression structure is preferable in view of effectively preventing delay of takt time (processing speed) attributed to an image processing ability.

When there are two or more kinds of the first projection structure to be measured on the substrate, two or more kinds of the specific structure may be provided so as to correspond to each kind of the first projection structure. According to the present invention, a position of the first projection structure to be measured or a position of a reference point to determine a height of reference level can be precisely specified by recognizing the specific structure as a positioning part by a height measuring device. Therefore, the height of the first projection structure can be automatically measured precisely.

In the case where the planar shape of the specific structure is different from the second projection structure and/or the depression structure, it is preferable that the planar shape of the specific structure has at least one linear part of 4 μm or more in view of a resolution limit of an image recognition device. In addition, in order to perform precise positioning using the specific structure, it is preferable that a viewing range (measuring area) of an image recognition device and an interval between the specific structures are adjusted so as not to provide a plurality of specific structures in the viewing range.

It is preferable that the substrate for liquid crystal display panel comprises a columnar spacer as the first projection structure and a dot-shaped protrusion for controlling an alignment as the second projection structure, and the specific structure is provided at a part of or near the columnar spacer. The dot-shaped protrusion for controlling an alignment does not easily intersect with a black matrix as the rib-shaped protrusion for controlling an alignment intersects with a black matrix and it is difficult to use an intersecting point with the black matrix as the positioning part. And the dot-shaped protrusion usually has a shape easily confused with the columnar spacer as compared with the rib-shaped protrusion for controlling an alignment. However, according to this configuration, the height of the columnar spacer can be measured because the specific structure effectively prevents the columnar spacer and the dot-shaped protrusion for controlling an alignment from being confused.

In addition, the substrate for liquid crystal display panel according to the present invention in which the dot-shaped protrusion for controlling an alignment is provided can be applied to a multidomain vertical alignment (MVA) type liquid crystal display device.

It is preferable that the columnar spacer has a stacked structure. In this case, since each layer constituting the columnar spacer can be sequentially formed at the step in which a colored layer is formed, manufacturing costs of a substrate for liquid crystal display panel can be reduced. In the case of the columnar spacer having a stacked structure, it is not preferable to use a body part of the columnar spacer formed of the stacked structure as a positioning part in general in view of precision, since alignment of each layer could be shifted in the step of forming the spacer. However, in this case, since the specific structure is provided at a part of or near the columnar spacer having the stacked structure and used as a positioning part, highly precise positioning can be performed. As the specific structure, single layer structure is preferably used. In addition, the shape of the columnar spacer may be a cone or a pyramid other than a column or a square column. Similarly, the shape of the dot-shaped protrusion for controlling an alignment may be a column, a square column, a cone, a pyramid and the like.

Furthermore, as one preferable configuration of the columnar spacer, a black matrix is not arranged as a base of the columnar spacer. This configuration is advantageously used when a cell thickness (thickness of a liquid crystal layer) is thinly formed.

It is preferable that the substrate for liquid crystal display panel comprises a specific structure formed of a black matrix near the first projection structure. According to this case, when the characteristic part, which is formed by an outline of the black matrix, provided as the specific structure, can be recognized as a positioning part, highly precise positioning can be performed. In addition, when the specific structure is formed of the black matrix, the first projection structure is formed outside an area overlapping with the specific structure as viewed in plane. When the specific structure formed of the black matrix is provided not near the first projection structure but in the area overlapping with the first projection structure, precise positioning may be insufficiently performed in some cases. The black matrix may be provided nearer the liquid crystal layer (as upper layer) in relation to the colored layer or may be provided nearer the supporting substrate (as lower layer) in relation to the colored layer. However, when the black matrix is provided below the colored layer, the specific structure is recognized by a highly-sensitive image recognition device in order to prevent reduction of measurement precision due to interference between the black matrix and other colored layers (red layer, for example). In addition, as the black matrix, instead of the resin film containing a black pigment, a color stacked black matrix in which colored layers of three colors such as red, blue and green are stacked may be used.

It is preferable that the substrate for liquid crystal display panel comprises a specific structure formed of a colored layer near the first projection structure. In this case, highly precise positioning can be performed by recognizing the characteristic part, which is formed by an outline of the colored layer, provided as the specific structure as a positioning part. In addition, when the specific structure is formed of the colored layer, the first projection structure is formed outside an area overlapping with the specific structure as viewed in plane. When the specific structure formed of the colored layer is provided not near the first projection structure but in the area overlapping with the first projection structure, precise positioning may be insufficiently performed in some cases. The colored layer may be provided nearer the liquid crystal layer (as upper layer) in relation to the black matrix or may be provided nearer the supporting substrate (as lower layer) in relation to the black matrix. However, when the colored layer is provided below the black matrix, the specific structure is recognized by a highly-sensitive image recognition device in order to prevent reduction of measurement precision due to interference between the colored layer and the black matrix.

The present invention also relates to a substrate for liquid crystal display panel comprising a first projection structure and a second projection structure and/or a depression structure, the first projection structure having a single layer structure and a whole shape of the first projection structure being formed of a specific structure, and the specific structure having at least one of a planar shape different from a planar shape of the second projection structure and/or the depression structure and a planar area of $2/3$ times or less or 1.5 times or more than a planar area of the second projection structure and/or the depression structure. Thus, according to the present invention, the specific structure may be provided as the whole shape of the first projection structure having the single layer structure, and the operational advantage of the present invention can be obtained like the above case. In this case, it is preferable that the substrate for liquid crystal display panel comprises a columnar spacer having a single layer structure as the first projection structure and a dot-shaped protrusion for controlling an alignment as the second projection structure, and the whole shape of the columnar spacer is formed of the specific structure.

According to the present invention, it is preferable that the planar shape of the dot-shaped protrusion for controlling an alignment is a substantially circular. Thus, the alignment of the liquid crystal can be effectively controlled, leading to improvement in display quality.

In addition, it is preferable that the specific structure is provided on a non-display area. For example, it is preferable that it is provided in an area overlapping with a black matrix formed on the substrate for liquid crystal display panel as viewed in plane or an area overlapping with a wiring formed on a substrate facing to the substrate for liquid crystal display panel comprising the specific structure as viewed in plane. According to those configurations, disturbance and the like in alignment of the liquid crystal caused by the specific structure has a smaller effect on display quality, since the specific structure is provided in the non-display area (light shielding area) which is not used in display.

The present invention also relates to a substrate for liquid crystal display panel comprising a projection structure(s) and a black matrix, one or more of the projection structures having a single layer structure and one or more intersecting parts of the black matrix and an outline of the projection structure as viewed in plane.

Thus, according to the present invention, when the intersecting part of the outline of the projection structure having the single layer structure with the outline of the black matrix is recognized by a height measuring device as a positioning part, the position of the projection structure to be measured and the position of the reference point to determine a reference level of the height can be specified with high precision similar to the above-mentioned configuration in which the specific structure is provided. Therefore, the height of the projection structure can be precisely measured. In this case, it is preferable that the projection structure comprises a columnar spacer and a dot-shaped protrusion for controlling an alignment and the dot-shaped protrusion for controlling an alignment has a single layer structure and one or more intersecting parts of the black matrix and an outline of the dot-shaped protrusion as viewed in plane.

The present invention also relates to a substrate for liquid crystal display panel comprising a projection structure, a depression structure(s) and a black matrix, one or more of the depression structures have one or more intersecting parts of the black matrix and an outline of the depression structure as viewed in plane.

Thus, according to the present invention, when the intersecting point of the outline of the depression structure with the outline of the black matrix is recognized by a height measuring device as a positioning part, the position of the projection structure to be measured and the position of the reference point to determine a reference level of the height can be specified with high precision similar to the above-mentioned configuration, in which the specific structure is provided. Therefore, the height of the projection structure can be precisely measured. In this case, it is preferable that the projection structure comprises a columnar spacer, the depression structure comprises a slit for controlling an alignment and/or a hole for controlling an alignment, and the slit for controlling an alignment and/or the hole for controlling an alignment has one or more intersecting parts of the black matrix and an outline of the slit and/or the hole as viewed in plane.

According to the present invention, it is preferable that each cell area has the intersecting part. In addition, each cell area means an area used for one substrate constituting a liquid crystal display panel in a multiple substrates for liquid crystal display panels. In this case, the multiple substrates for liquid crystal display panels are divided into plural numbers and an appropriate dropping amount of the liquid crystal can be determined for each substrate.

In addition, according to the present invention, it is preferable that the specific structure or the intersecting part is substantially uniformly provided on the substrate surface. Thus, an optimal liquid crystal amount dropped can be determined with higher precision. In addition, influence on display quality by disturbance in the alignment of the liquid crystal caused by the specific structure can be substantially uniform on the substrate surface.

It is preferable that the substrate for liquid crystal display panel is a color filter substrate. Ina liquid crystal display panel, a projection structure such as a columnar spacer, whose height is measured, is provided on the side of a color filter substrate in many cases. Therefore, it is preferable that the specific structure is provided on the side of the color filter substrate in the present invention.

In addition, the present invention relates to a liquid crystal display panel and a liquid crystal display device comprise the above-mentioned substrate for liquid crystal display panel. According to the liquid crystal display panel and the liquid crystal display device of the present invention, the liquid crystal display panel and the liquid crystal display device with high display quality can be provided, since the height of the columnar spacer is measured using the specific structure to optimize the liquid crystal amount dropped.

In addition, the present invention relates to a method for examining a substrate for liquid crystal display panel comprising a columnar spacer and at least one structure for specifying a position, the method comprising at least: a process of specifying a position of the structure for specifying a position; a process of determining a position of a reference point and a spacer top based on predetermined distance data from a structure for specifying a position; and a process of measuring a difference in height between determined positions of the reference point and the spacer top.

In this case, as the structure for specifying a position, the specific structure or the intersecting part in the substrate for liquid crystal display panel or the intersecting part of an outline of the linearly formed protrusion for controlling an alignment and/or the slit for controlling an alignment with an outline of the black matrix in the present invention may be preferably used. As the reference point, it is not particularly limited as long as it can be used as a reference (height is 0) when the height of the columnar spacer is measured. According to the examining method of the substrate for liquid crystal display panel in the present invention, influence caused by a constitution of the columnar spacer or a member arranged near the columnar space can be minimized and the height can be precisely measured. Also, the height can be automatically measured, when a measuring device, in which a program to perform the above-mentioned processes is written, is used.

The present invention also relates to a method for manufacturing a liquid crystal display panel using the above-mentioned method for examining the substrate for liquid crystal display panel, an amount of a liquid crystal dropped on a substrate being determined depending on a difference in height between a position of the reference point and a position of the spacer top. According to the method for manufacturing a liquid crystal display panel, the liquid crystal display panel having high display quality can be stably manufactured since the amount of the liquid crystal dropped by a one drop filling method is determined based on the measured result of the height of the columnar spacer.

According to the substrate for liquid crystal display panel in the present invention, the position of the projection part to be measured and the position of the reference point to determine the reference level for the height can be specified with high precision, since the specific structure which can be recognized by a height measuring device as a positioning part is provided. Therefore, the height of the projection structure can be automatically measured with high precision.

BRIEF DESCRIPTION OF THE DRAWINGS

FIG. 1 (*a*) is a schematic plan view showing a constitution of a color filter substrate mounted on a liquid crystal display panel according to Example 1 of the present invention, and FIG. 1 (*b*) is a schematic section view showing the liquid crystal display panel taken along line A-A' in FIG. 1 (*a*).

FIG. 2 (*a*) is a schematic plan view showing a constitution of a color filter substrate mounted on a liquid crystal display panel according to Example 2 of the present invention, and FIG. 2 (*b*) is a schematic section view showing the liquid crystal display panel taken along line A-A' in FIG. 2 (*a*).

FIG. 30(b) is a schematic section view showing the liquid crystal display panel taken along line A-A' in FIG. 30 (a).

FIG. 85-1 (*a*) is a schematic plan view showing a manufacturing process of a color filter (CF) substrate mounted on a liquid crystal display device according to Example 1, and FIG. 85-1 (*b*) is a schematic section view showing the CF substrate taken along line A-A' in FIG. 85-1 (*a*) (after a BM layer is formed).

FIG. 85-2 (*a*) is a schematic plan view showing a manufacturing process of a color filter (CF) substrate mounted on a liquid crystal display device according to Example 1, and FIG. 85-2 (*b*) is a schematic section view showing the CF substrate taken along line A-A' in FIG. 85-2 (*a*) (after a first colored layer is formed).

FIG. 85-3 (*a*) is a schematic plan view showing a manufacturing process of a color filter (CF) substrate mounted on a liquid crystal display device according to Example 1, and FIG. 85-3 (*b*) is a schematic section view showing the CF substrate taken along line A-A' in FIG. 85-3 (*a*) (after a second colored layer is formed).

FIG. 85-4 (*a*) is a schematic plan view showing a manufacturing process of a color filter (CF) substrate mounted on a liquid crystal display device according to Example 1, and FIG. 85-4 (*b*) is a schematic section view showing the CF substrate taken along line A-A' in FIG. 85-4 (*a*) (after a third colored layer is formed).

FIG. 85-5 (*a*) is a schematic plan view showing a manufacturing process of a color filter (CF) substrate mounted on a liquid crystal display device according to Example 1, and FIG. 85-5 (b) is a schematic section view showing the CF substrate taken along line A-A' in FIG. 85-5 (a) (after an opposed electrode is formed).

FIG. 85-6 (a) is a schematic plan view showing a manufacturing process of a color filter (CF) substrate mounted on a liquid crystal display device according to Example 1, and FIG. 85-6 (b) is a schematic section view showing the CF substrate taken along line A-A' in FIG. 85-6 (a) (after a dot-shaped protrusion for controlling an alignment and a protrusion material layer are formed).

FIG. 86-1 is a schematic view showing a whole constitution (optical system) of a height measuring device using white light interference.

FIG. 86-2 is an enlarged schematic view showing a constitution of an interferometer type objective lens (Mirau interferometer) in the height measuring device shown in FIG. 86-1.

DETAILED DESCRIPTION OF THE PREFERRED EMBODIMENTS

The present invention will be described in more detail with reference to the drawings hereinafter, but the present invention is not limited to these Examples only.

Example 1

Figures 1, 86:
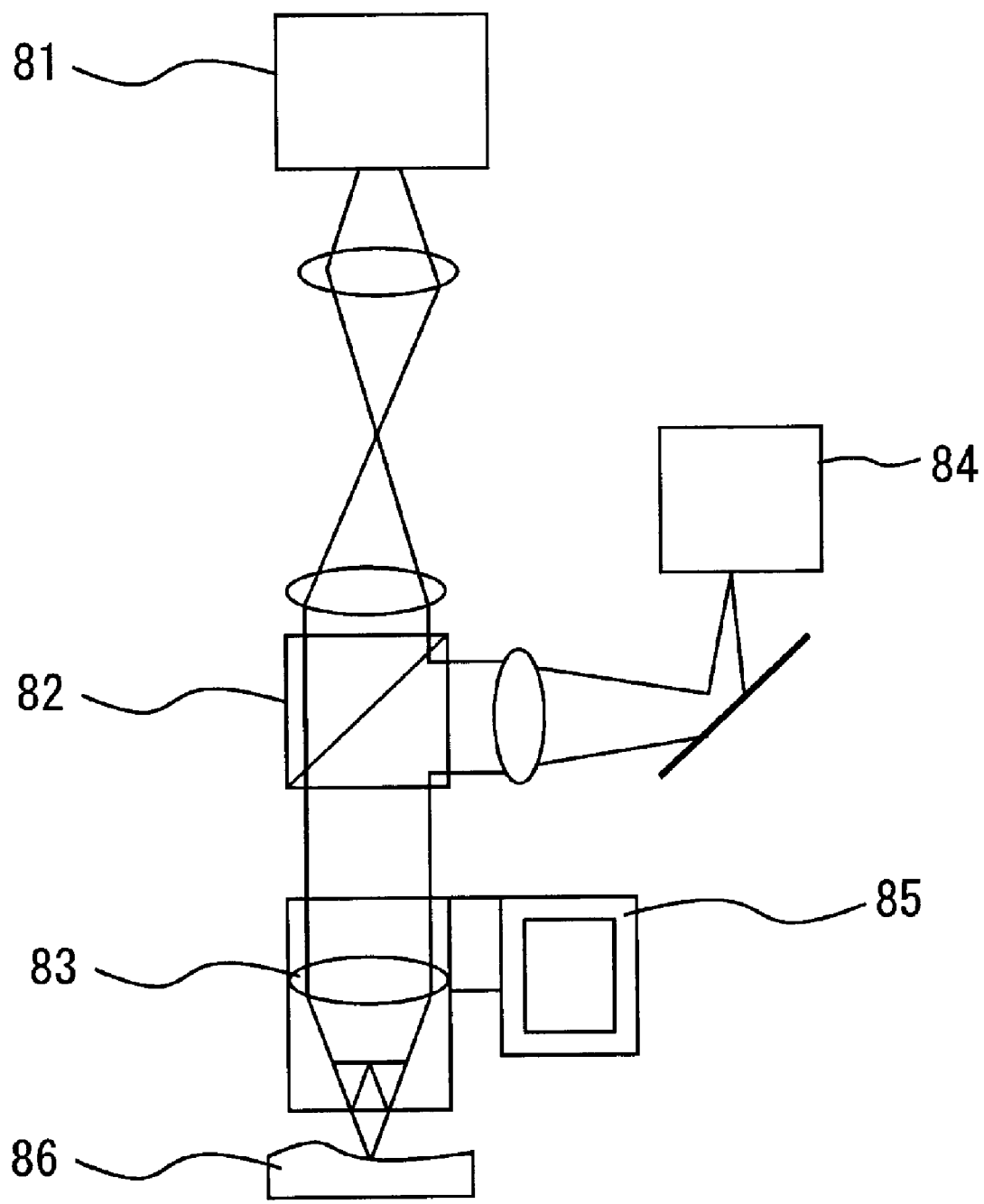

FIG. 1 (a) is a schematic plan view showing a constitution of a color filter (CF) substrate mounted on a liquid crystal display panel according to Example 1 of the present invention, and FIG. 1 (b) is a schematic section view showing the liquid crystal display panel taken along line A-A' in FIG. 1 (a).

As shown in FIG. 1 (b), the liquid crystal display panel according to Example 1 has a structure in which a liquid crystal layer 50 is sandwiched between a color filter (CF) substrate 100 and a switching element array substrate 200.

The CF substrate 100 has a structure in which an insulating transparent supporting substrate 10, a colored layer comprising a first colored layer 11a, a second colored layer 11b, and a third colored layer 11c formed in a display area on the transparent supporting substrate 10, a black matrix (BM) layer 11d formed in a non-display area on the transparent supporting substrate 10, an ITO transparent opposed electrode 13 formed on the colored layer and the BM layer 11d, a plurality of dot-shaped (rivet-shaped) protrusions for controlling an alignment 14 in form of cones formed in the display are on the ITO transparent opposed electrode 13, and a polyimide alignment layer 15 formed so as to cover an entire surface of the substrate are stacked. On the other hand, the switching element array substrate 200 has a structure in which an array-side pattern 21 comprising a switching element circuit layer, an interlayer insulation film and the like, a pixel electrode 23 formed in the shape of an island, and a polyimide alignment layer 25 formed so as to cover an entire surface of the substrate are sequentially stacked on an insulating transparent supporting substrate 20. In addition, the polyimide alignment layers 15 and 25 on the CF substrate 100 and the switching element array substrate 200 respectively are formed separately after a series of substrate manufacturing processes. The switching element is not particularly limited and it may be a thin film transistor (TFT) using amorphous silicon, a TFT using polysilicon, a TFT using a continuous grain silicon (CGS), a thin film diode (TFD) such as MIM (Metal Insulator Metal) and the like.

According to the liquid crystal display device in Example 1, a thickness (cell gap) of the liquid crystal layer 50 is maintained by a stacked PS (columnar spacer) 12 formed on the CF substrate 100.

According to Example 1, the stacked PS 12 has a structure in which the first colored layer 11a, the second colored layer 11b, the third colored layer 11c, and a layer (referred to also as "protrusion material layer") 14' formed of the same material as that of the dot-shaped protrusion for controlling an alignment 14 are sequentially stacked on the BM layer 11d on the side of the transparent supporting substrate 10. According to the first colored layer 11a, a part constituting the stacked PS 12 and a part constituting the display area are integrated and the part constituting the stacked PS 12 is located above the BM layer 11d. According to the second colored layer 11b, a part constituting the stacked PS 12 and a part constituting the display area are separated and the part constituting the stacked PS 12 has a circular planar shape and formed on a part of the first colored layer 11a. According to the third colored layer 11c, a part constituting the stacked PS 12 and a part constituting the display area are separated and the part constituting the stacked PS 12 is formed in the center of the second colored layer 11b concentrically with the second colored layer 11b. The protrusion material layer 14', which is the uppermost layer, has a lower end positioned on the first colored layer 11a, and entirely covers the second colored layer 11b and the third colored layer 11c. And the layer 14' has a flat top and a main part (a stacked part which serves as a spacer except for a specific structure 8) having a planar shape of circle. In addition, the rectangular specific structure 8 is provided on the protrusion material layer 14' as shown by dotted line in the drawing, and a part of the structure 8 sticks out from the BM layer 11d.

Thus, the stacked PS 12 according to this Example has a substantially cone shape in which the top is a flat face and has the rectangular specific structure 8 at the bottom.

One example of a method for manufacturing a liquid crystal display device according to Example 1 will be described hereinafter, but the present invention is not limited to this example.

Figure 6:
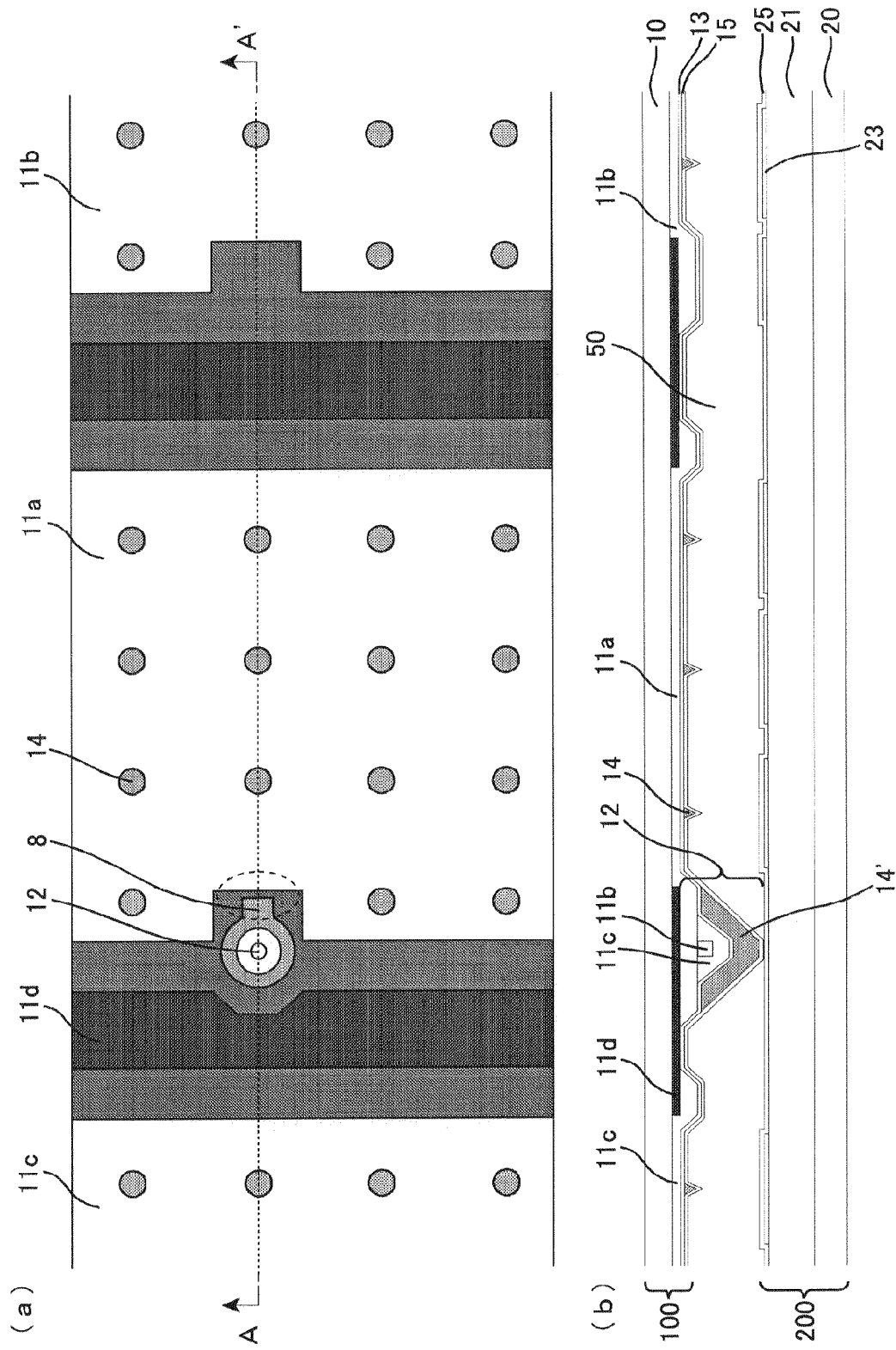
FIG. 6 (*a*) is a schematic plan view showing a constitution of a color filter substrate mounted on a liquid crystal display panel according to Example 6 of the present invention, and FIG. 6 (*b*) is a schematic section view showing the liquid crystal display panel taken along line A-A' in FIG. 6 (*a*).
Figure 7:
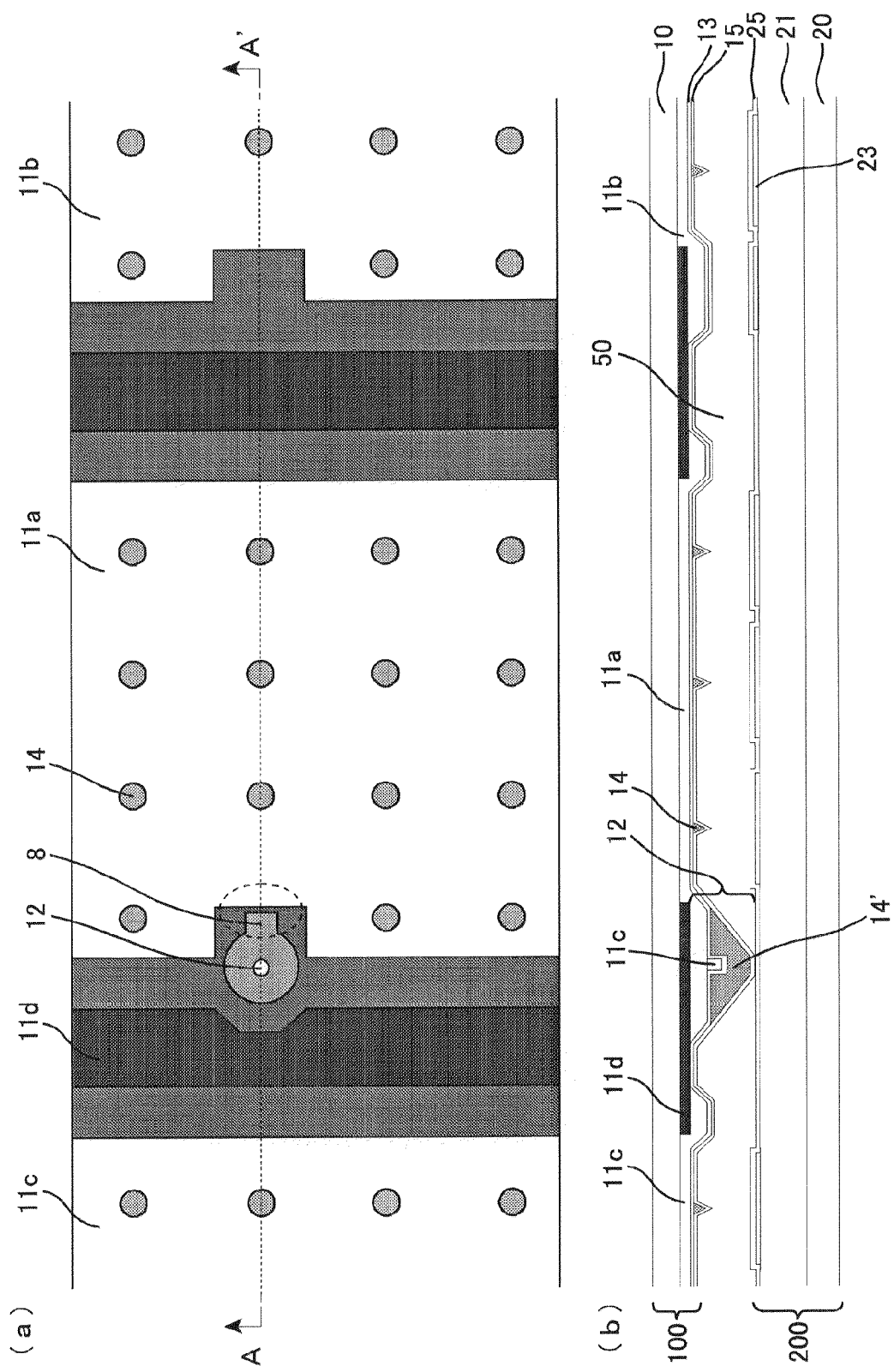
FIG. 7 (*a*) is a schematic plan view showing a constitution of a color filter substrate mounted on a liquid crystal display panel according to Example 7 of the present invention, and FIG. 7 (*b*) is a schematic section view showing the liquid crystal display panel taken along line A-A' in FIG. 7 (*a*).
Figure 8:
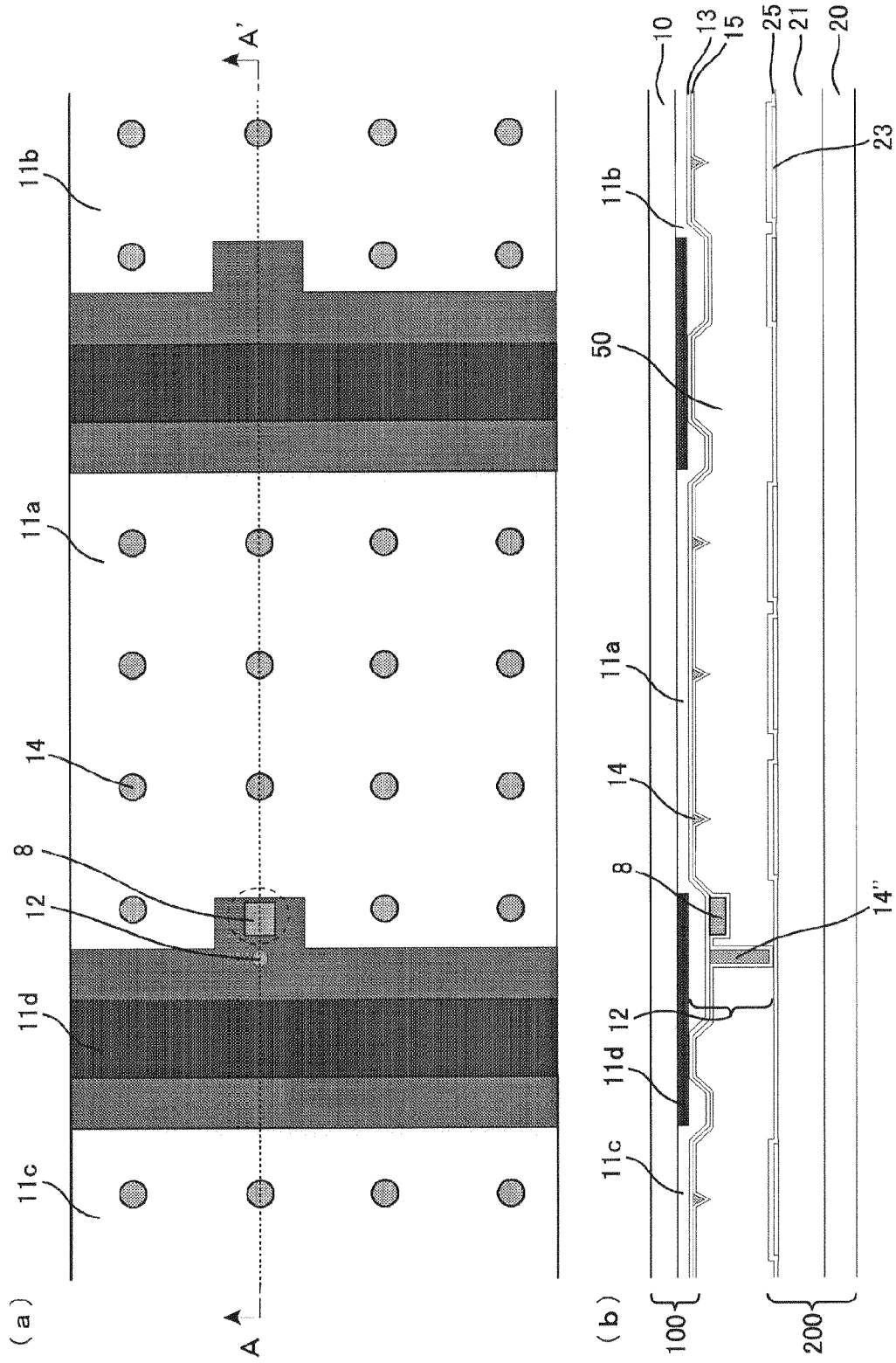
FIG. 8 (*a*) is a schematic plan view showing a constitution of a color filter substrate mounted on a liquid crystal display panel according to Example 8 of the present invention, and FIG. 8 (*b*) is a schematic section view showing the liquid crystal display panel taken along line A-A' in FIG. 8 (*a*).

FIGS. 85-1 (a), 85-2 (a), 85-3 (a), 85-4 (a), 85-5 (a), and 85-6 (a) are schematic plan views showing manufacturing steps of a color filter (CF) substrate mounted on a liquid crystal display device according to Example 1, and FIGS. 85-1 (b), 85-2 (b), 85-3 (b), 85-4 (b), 85-5 (b), and 85-6 (b) are schematic section views respectively showing the CF substrate taken along lines A-A' in FIGS. 85-1 to 85-6 (a)s.

Figure 4:
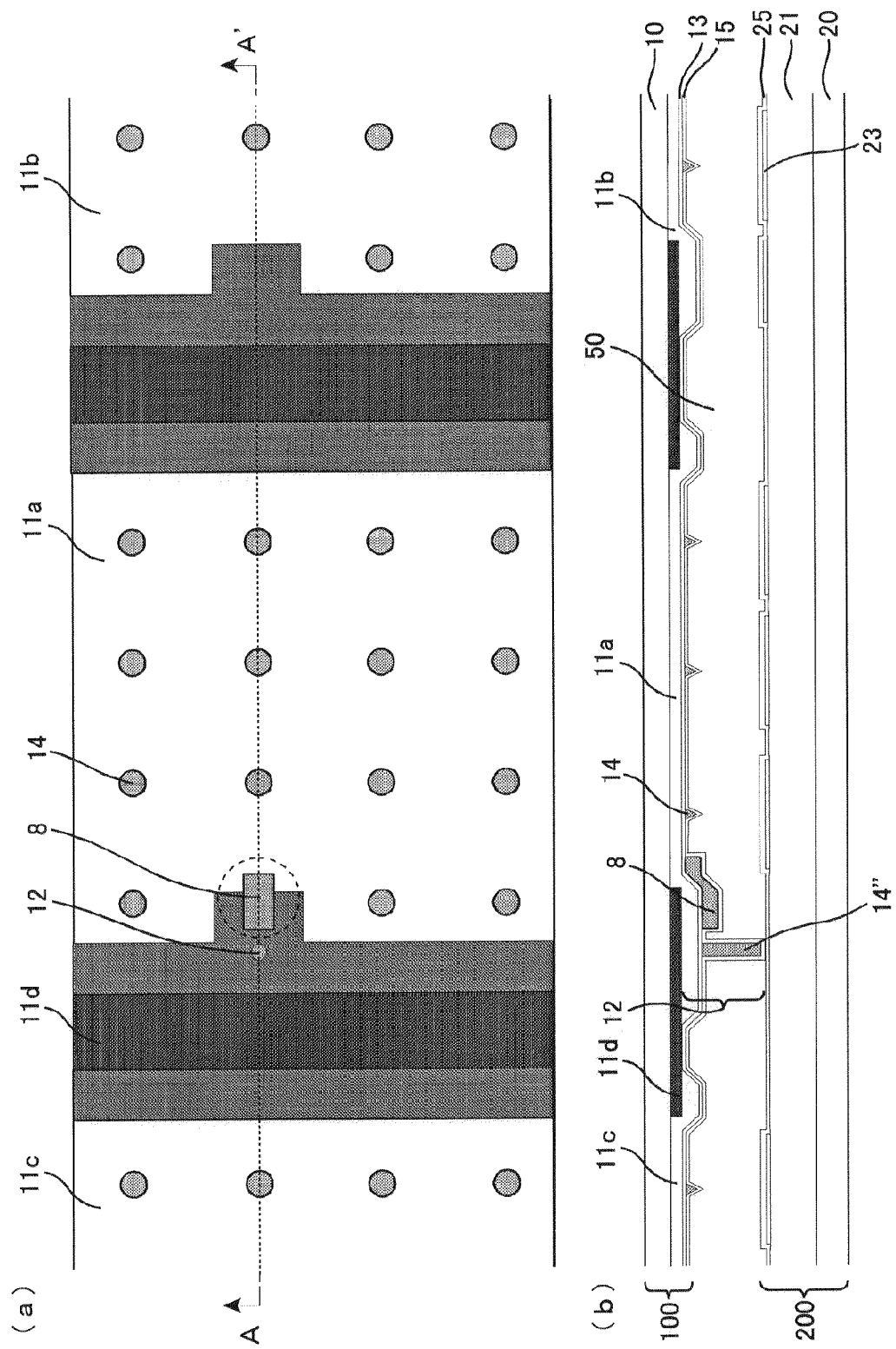
FIG. 4 (*a*) is a schematic plan view showing a constitution of a color filter substrate mounted on a liquid crystal display panel according to Example 4 of the present invention, and FIG. 4 (*b*) is a schematic section view showing the liquid crystal display panel taken along line A-A' in FIG. 4 (*a*).
Figure 5:
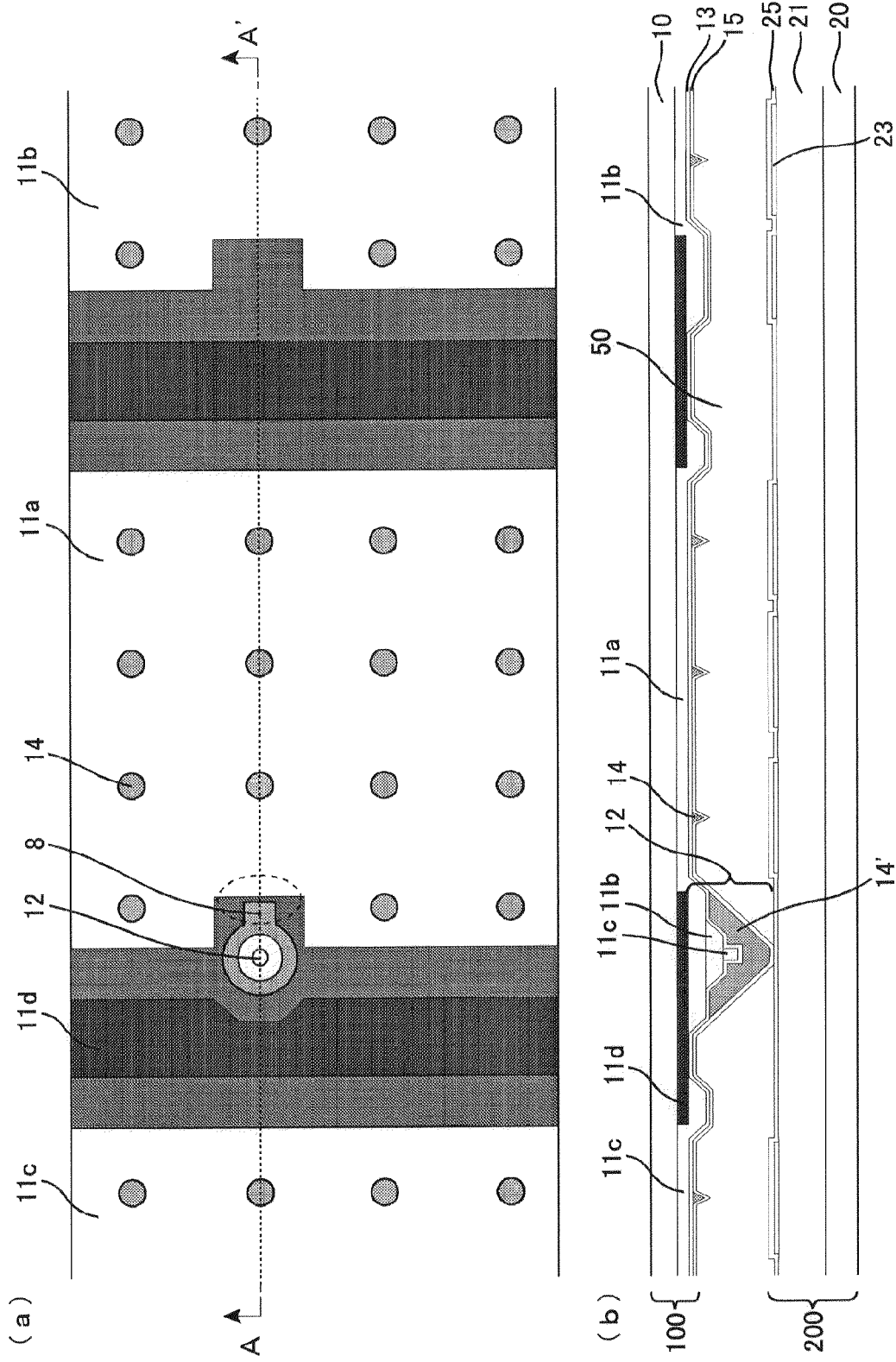
FIG. 5 (*a*) is a schematic plan view showing a constitution of a color filter substrate mounted on a liquid crystal display panel according to Example 5 of the present invention, and FIG. 5 (*b*) is a schematic section view showing the liquid crystal display panel taken along line A-A' in FIG. 5 (*a*).
Figures 2, 86:
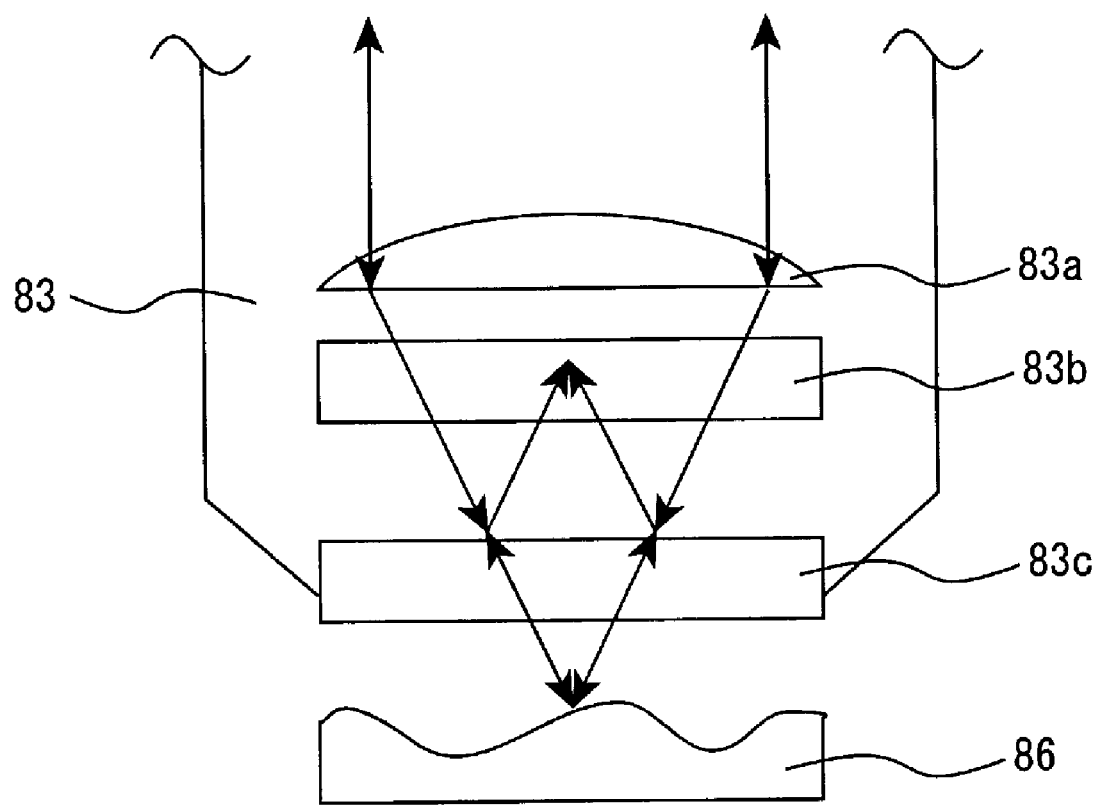

First, the insulating transparent supporting substrate 10 is prepared. The insulating transparent supporting substrate 10 is not particularly limited, but a glass substrate is preferable. Then, as shown in FIG. 85-1, the black matrix (BM) layer 11d is patterned on the transparent supporting substrate 10. Then, as shown in FIGS. 85-2 to 85-4, the colored layers such as the first colored layer 11a, the second colored layer 11b and the third colored layer 11c are sequentially patterned. At this time, a part of the patterns of the colored layers is sequentially stacked at a place in which the stacked PS 12 is arranged. Then, the opposed electrode 13 is formed as shown in FIG. 85-5. The opposed electrode 13 is generally formed of a transparent conductive material, and especially indium tin oxide (ITO), indium zinc oxide (IZO) and the like are preferably used. A method of forming the opposed electrode 13 is not particularly limited and a sputtering may be mentioned, for example. Then, as shown in FIG. 85-6, the dot-shaped protrusion for controlling an alignment 14 and the protrusion material layer 14', which is the uppermost layer of the stacked PS, are formed at the same time. As a material of the dot-shaped protrusion for controlling an alignment 14 and the protrusion material layer 14', a photosensitive resin is preferable and especially, a positive type photosensitive resin such as an acrylic resin, a polyimide resin, a novolac resin is preferable. In addition, methods of forming the BM layer 11d, the colored layers, the alignment controlling protrusion 14 and the protrusion material layer 14' are not particularly limited. For example, a photolithography method, in which a liquid material is applied by slit and spin coating or slot coating and then exposure, development and baking are performed, a dry film laminating (transfer) method, an ink jet method and the like may be used. Thus, the color filter (CF) substrate 100 is completed. Then, as shown in FIG. 1, before the substrate 100 is bonded to the switching element array substrate 200, the alignment layer 15 is formed on the whole surface of the substrate. The alignment layer 15 is preferably a vertical alignment layer and as a material of the vertical alignment layer, a polyimide resin is preferably used, for example. In general, the alignment layer 15 is subjected to a rubbing process after formation of the alignment layer 15. However, the rubbing process may not be performed when the vertical alignment layer is formed. In some cases, the alignment layer 15 itself may not be formed.

Then, a height of the stacked PS 12 formed on the CF substrate 100 is measured with a height measuring device which uses white light interference as shown in FIGS. 86-1 and 86-2. More specifically, the specific structure is searched and automatically positioned with high precision in a viewing range of an image recognition device. The image recognition device may be integrated with a height measuring device or may be separated type which can be connected to the height measuring device. Then, the reference point and the top of the columnar spacer can be automatically specified based on predetermined distance data from the specified structure to a reference point and to a spacer top. A difference in height between the reference point and the columnar spacer top, that is, the height of the columnar spacer is automatically measured with a height measuring device using the white light interference.

Based on thus-obtained measurement results, an amount of the liquid crystal dropped is determined and an appropriate amount of the liquid crystal is applied onto the CF substrate 100 with a dispenser for dropping liquid crystal and the like. The liquid crystal material dropped and filled is not particularly limited, but it preferably has a negative dielectric anisotropy ($\Delta \epsilon < 0$).

Finally, the CF substrate 100 is bonded to the switching element array substrate 200 manufactured separately by a conventional well-known method on which the alignment layer 25 is formed, with a sealing material (not shown) therebetween, whereby the liquid crystal display device is completed.

According to the CF substrate 100 in the above-described Example 1, the height of the stacked PS 12 can be automatically measured with a height measuring device, since the image recognition device can recognize the entire specific structure 8, a linear part and an angular part of the specific structure 8, an intersecting part of an outline of the specific structure 8 and an outline of the BM layer 11d and the like as a positioning pattern, As a result, the liquid crystal amount dropped on the CF substrate 100 can be calculated with high precision in the process of bonding the CF substrate 100 to the switching element array substrate 200. Therefore, a highly reliable liquid crystal display panel, in which the liquid crystal is filled by a one drop filling method and appropriate amount of the liquid crystal is filled. In addition, the alignment between the CF substrate 100 and the switching element array substrate 200 at the bonding process can be performed using the specific structure 8.

The specific structure 8 is provided so as to stick out from the BM layer 11d on the CF substrate 100 according to Example 1, but disturbance in the alignment of the liquid crystal due to the specific structure 8 hardly affects display quality since the structure 8 is provided in an area overlapping with a light-shielding area of the array-side pattern 21 of the switching element array substrate 200 as viewed in plane. In addition, an extended part from the protrusion material layer 14' having the specific structure 8 may be formed so as to be connected to the dot-shaped protrusion for controlling an alignment 14.

An angular part of 90° is formed also in the BM layer 11d on the CF substrate 100 in Example 1. However, an outlined part (projection part) of the BM 11d, in which the angular part of 90° is formed, overlaps with the stacked PS 12 as viewed in plane, and therefore it is difficult to recognize the outlined part as a pattern by an image recognition device. In addition, an angular part of 135° is also formed in the BM layer 11d, but it is regarded as a substantially circle shape because of its large angle, and it is confused with the dot-shaped protrusion for controlling an alignment 14 having a planar shape of substantially circle. Therefore, the angular part of the 135° is not recognized as the specific pattern by an image recognition device. Similarly, when the dot-shaped protrusion for controlling an alignment 14 has a planar shape of substantially circle, it is highly likely that not only the circle but also an ellipse or a polygon such as a regular octagon, a regular dodecagon or the like is confused.

In addition, a combination of the colored layers (the first colored layer 11a, the second colored layer 11b and the third colored layer 11c) is not particularly limited, and a combination of a red layer (R), a green layer (G), and a blue layer (B), or a combination of a cyan layer (C), a yellow layer (Y), a magenta layer (M) may be used, or a combination of three colors other than the above combinations may be used. Furthermore, according to the present invention, the combination of colored layers may comprise four colors or more, and a white layer (W) may be added, for example.

In the CF substrate 100 of Example 1, the stacked PS 12 has a structure in which the first colored layer 11a, the second colored layer 11b, the third colored layer 11c and the protrusion material layer 14' formed of the same material as that of the colored layer in pixel area are sequentially stacked on the side of the transparent supporting substrate 10. However, the kind of the colored layer and the order of stacked layers, the number of the stacked layers and the like are not particularly limited in the present invention. That is, the stacked PS 12 may comprise, instead of the first colored layer, a fourth colored layer which is not formed in the pixel area, or may have the second colored layer 11b as the lowermost layer, or may comprise four or more stacked layers. Similarly, in the CF substrate 100 according to Example 1, the second colored layer 11b and the third colored layer 11c in the part constituting the stacked PS 12 are separated from those in the part constituting the display area. However, the structure of the colored layers constituting the stacked PS 12 is not particularly limited in the present invention, and the part constituting the stacked PS 12 and the part constituting the display area may be integrally provided.

In addition, in the substrate 100 according to Example 1, the stacked PS 12 is stacked on the BM layer 11d, but the stacked PS may not have the BM layer as a base. That is, when the BM layer is not arranged, the first colored layer is provided as a base and the second and third colored layers may be provided thereon in the shape of dots.

Example 2

FIG. 2 (a) is a schematic plan view showing a constitution of a color filter (CF) substrate mounted on a liquid crystal display panel according to Example 2 of the present invention, and FIG. 2 (b) is a schematic section view showing the liquid crystal display panel taken along line A-A' in FIG. 2(a).

The liquid crystal display panel according to Example 2 has the same constitution as that of the liquid crystal display panel according to Example 1 except that the third colored layer 11c in the stacked PS 12 is provided so as to cover the second colored layer 11b. The same operation effect as that in Example 1 can be provided also in the liquid crystal display panel of Example 2.

Example 3

Figure 3:
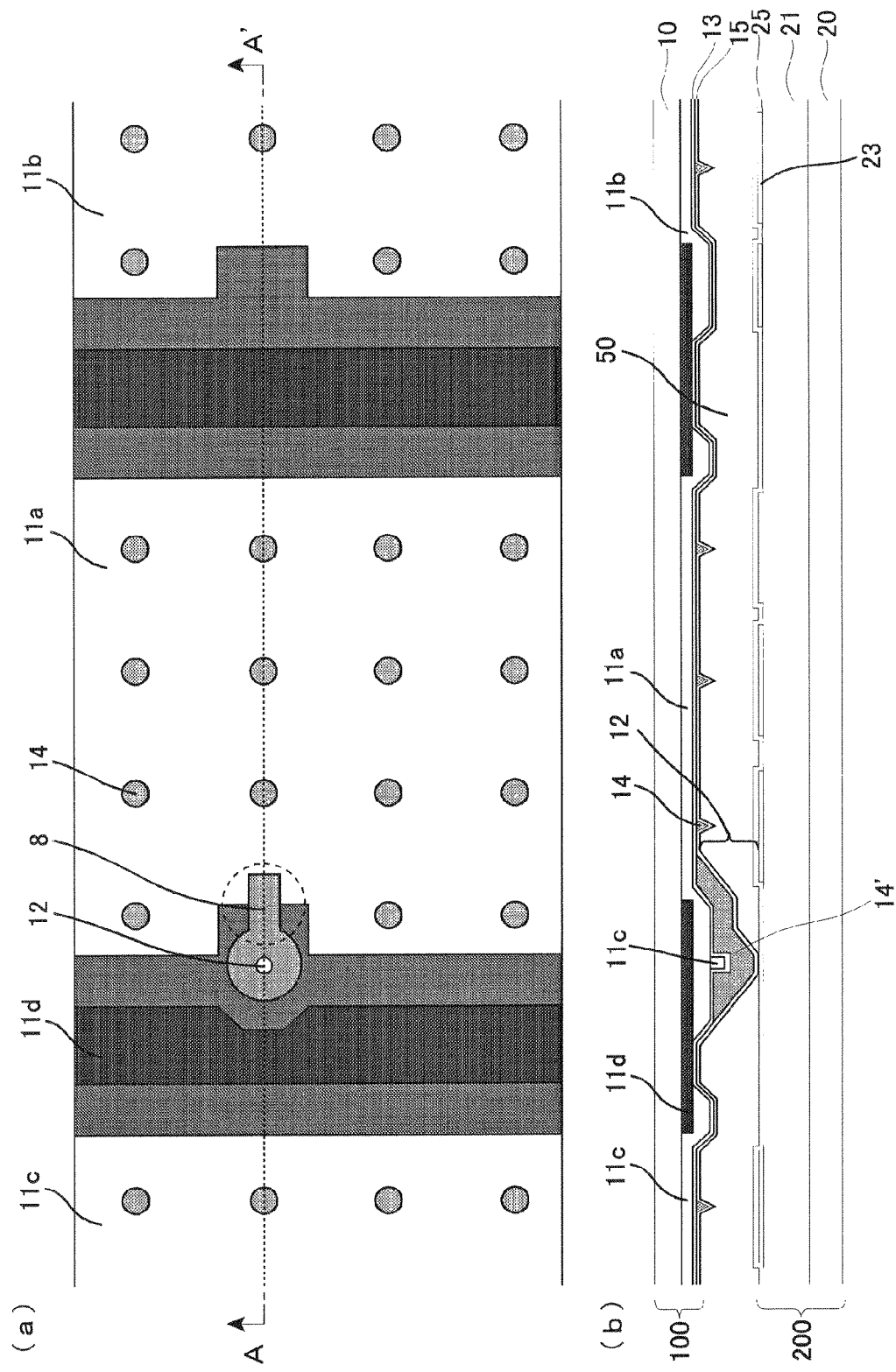
FIG. 3 (*a*) is a schematic plan view showing a constitution of a color filter substrate mounted on a liquid crystal display panel according to Example 3 of the present invention, and FIG. 3 (*b*) is a schematic section view showing the liquid crystal display panel taken along line A-A' in FIG. 3 (*a*).

FIG. 3 (a) is a schematic plan view showing a constitution of a color filter (CF) substrate mounted on a liquid crystal display panel according to Example 3 of the present invention, and FIG. 3 (b) is a schematic section view showing the liquid crystal display panel taken along line A-A' in FIG. 3 (a).

The liquid crystal display panel according to Example 3 is the same as that of the liquid crystal display panel according to Example 1 except that the stacked PS 12 does not comprise the second colored layer 11b. That is, according to Example 3, the stacked PS 12 has a structure in which the first colored layer 11a, the third colored layer 11c and the protrusion material layer 14' are sequentially stacked on the BM layer 11d from the side of the transparent supporting substrate 10. The same operation effect as that in Example 1 can be provided also in the liquid crystal display panel of Example 3.

In addition, even when the stacked PS 12 has a structure in which the first colored layer 11a, the second colored layer 11b and the protrusion material layer 14' are sequentially stacked on the BM layer 11d from the side of the transparent supporting substrate 10, the same operation effect as that of Example 1 can be also provided.

Example 4

FIG. 4 (a) is a schematic plan view showing a constitution of a color filter (CF) substrate mounted on a liquid crystal display panel according to Example 4 of the present invention, and FIG. 4 (b) is a schematic section view showing the liquid crystal display panel taken along line A-A' in FIG. 4 (a).

According to Example 4, the stacked PS 12 has a constitution in which the first colored layer 11a and the protrusion material layer 14" are sequentially stacked from the side of the transparent supporting substrate 10. According to the first colored layer 11a, a part constituting the stacked PS 12 and a part constituting a display area are integrally formed and the part constituting the stacked PS 12 is located above the BM layer 11d. The protrusion material layer 14" is formed in the shape of a column on a part of the first colored layer 11a. Also, as shown by a dotted line in the drawing, the rectangular specific structure 8 formed of the same material as that of the protrusion material layer 14" is provided near the stacked PS 12 so as to stick out from the BM layer 11d.

As for the other constitutions, the liquid crystal display panel according to Example 4 is the same as that of the liquid crystal display panel according to Example 1.

The same operation effect as that in Example 1 can be provided also in the liquid crystal display of Example 4.

Examples 5 to 8

FIGS. 5 (a), 6 (a), 7 (a), and 8 (a) are schematic plan views showing constitutions of color filter (CF) substrates mounted on liquid crystal display panels according to Examples 5 to 8 of the present invention, and FIGS. 5 (b), 6 (b), 7 (b), 8 (b) are schematic section views respectively showing the liquid crystal display panels taken along lines A-A' in FIGS. 5 to 8(a)s.

The liquid crystal display panels according to Examples 5 to 8 respectively have the same constitutions as those according to Examples 1 to 4, except that the specific structure 8 (surrounded by a circle in the drawings) is formed so as not to stick out from the BM layer 11d.

According to the liquid crystal display panels according to Examples 5 to 8, the same operation effect as those in Examples 1 to 4 can be provided, since the entire specific structure 8, a linear part and an angular part of the specific structure 8 and the like can be recognized by an image recognition device as a positioning pattern, In addition, according to the liquid crystal display panels in Examples 5 to 8, the specific structure 8 does not necessarily overlap with a light shielding area on the switching element array substrate 200 since the specific structure 8 (surrounded by a dotted line) does not stick out from the BM layer 11d, and therefore, a degree of freedom in design can be improved.

Examples 9 to 12

Figure 9:
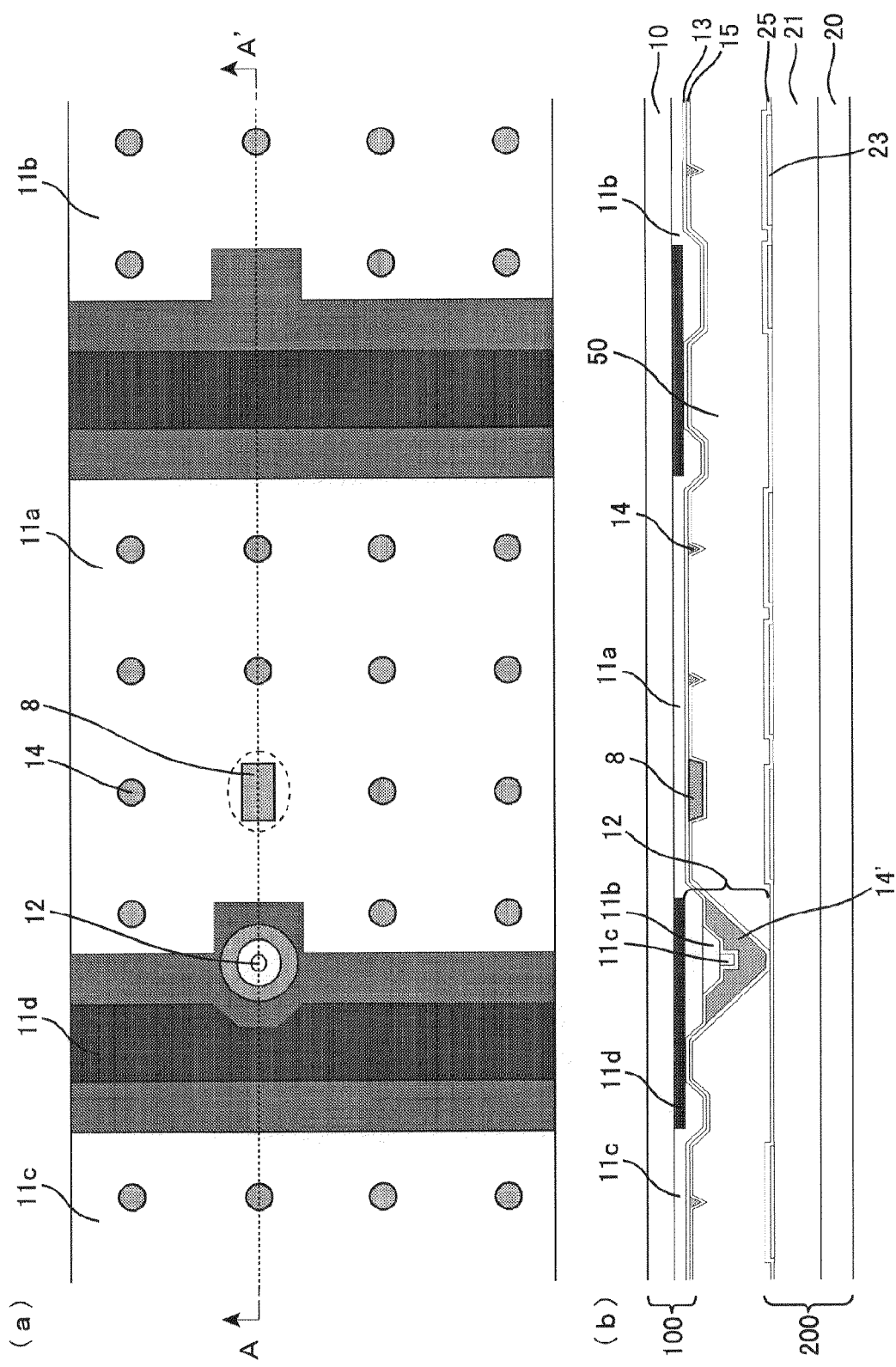
FIG. 9 (*a*) is a schematic plan view showing a constitution of a color filter substrate mounted on a liquid crystal display panel according to Example 9 of the present invention, and FIG. 9 (*b*) is a schematic section view showing the liquid crystal display panel taken along line A-A' in FIG. 9 (*a*).
Figure 10:
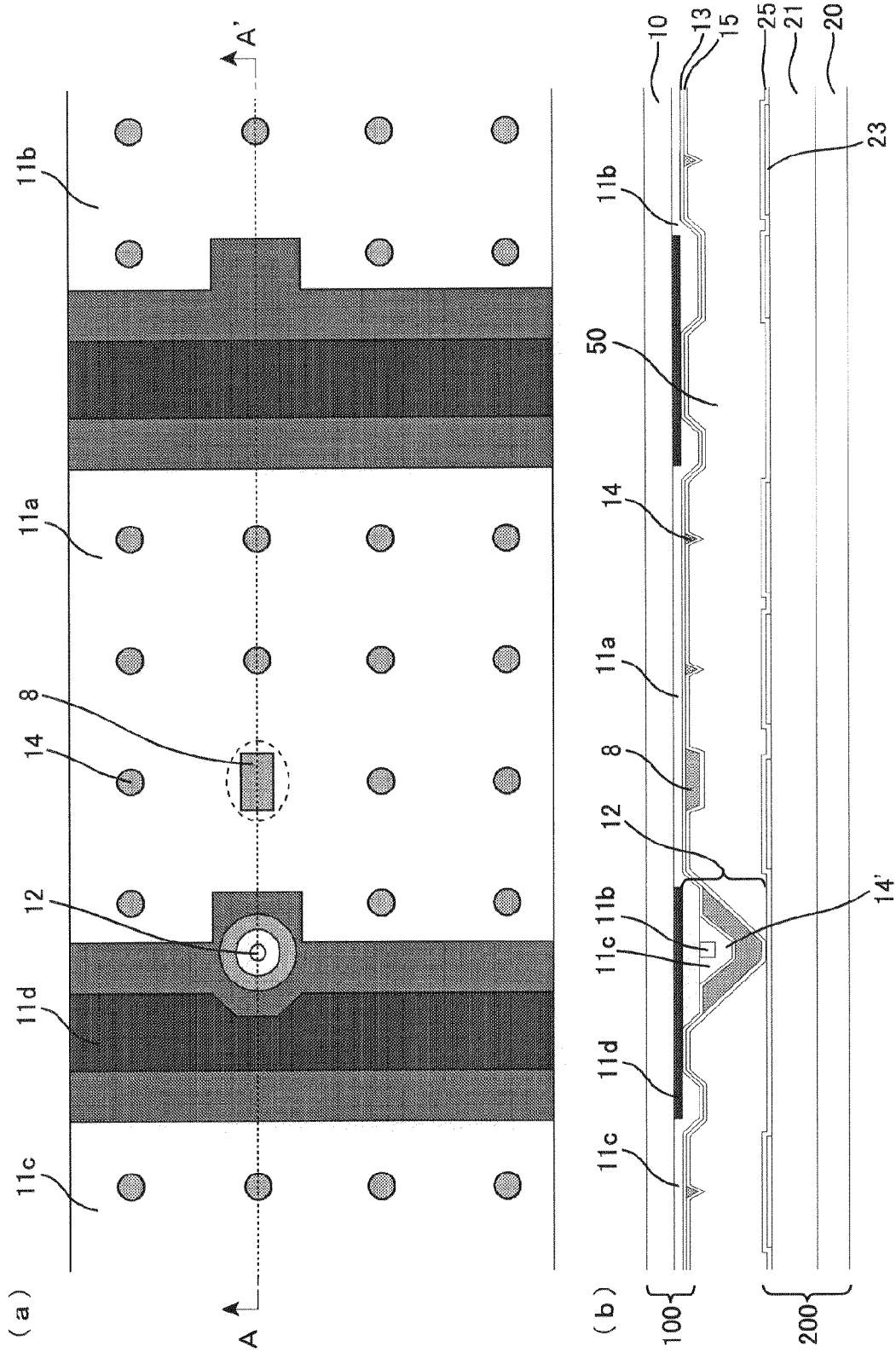
FIG. 10 (*a*) is a schematic plan view showing a constitution of a color filter substrate mounted on a liquid crystal display panel according to Example 10 of the present invention, and FIG. 10(*b*) is a schematic section view showing the liquid crystal display panel taken along line A-A' in FIG. 10(*a*).
Figure 11:
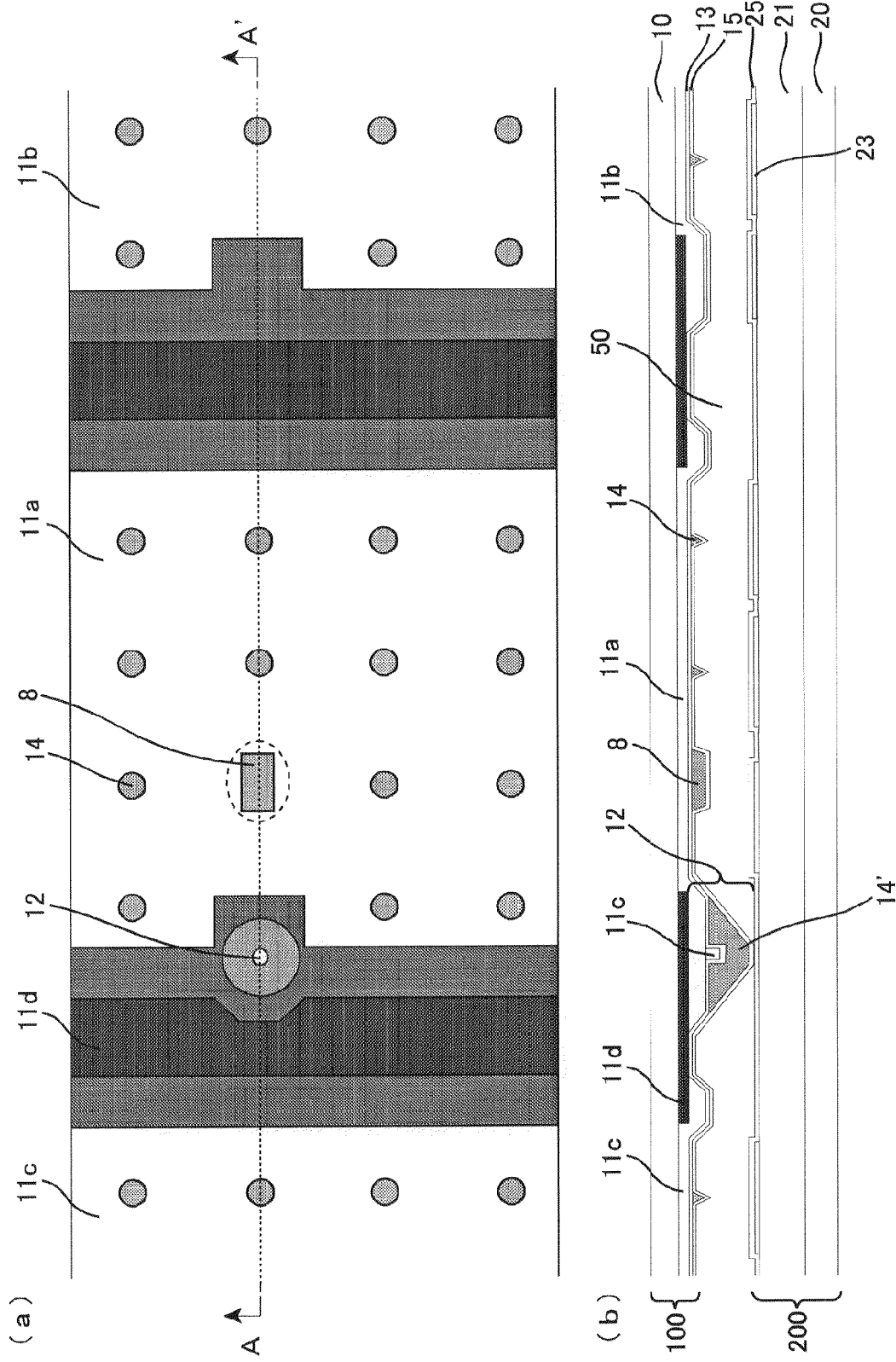
FIG. 11 (*a*) is a schematic plan view showing a constitution of a color filter substrate mounted on a liquid crystal display panel according to Example 11 of the present invention, and FIG. 11 (b) is a schematic section view showing the liquid crystal display panel taken along line A-A' in FIG. 11 (a).
Figure 12:
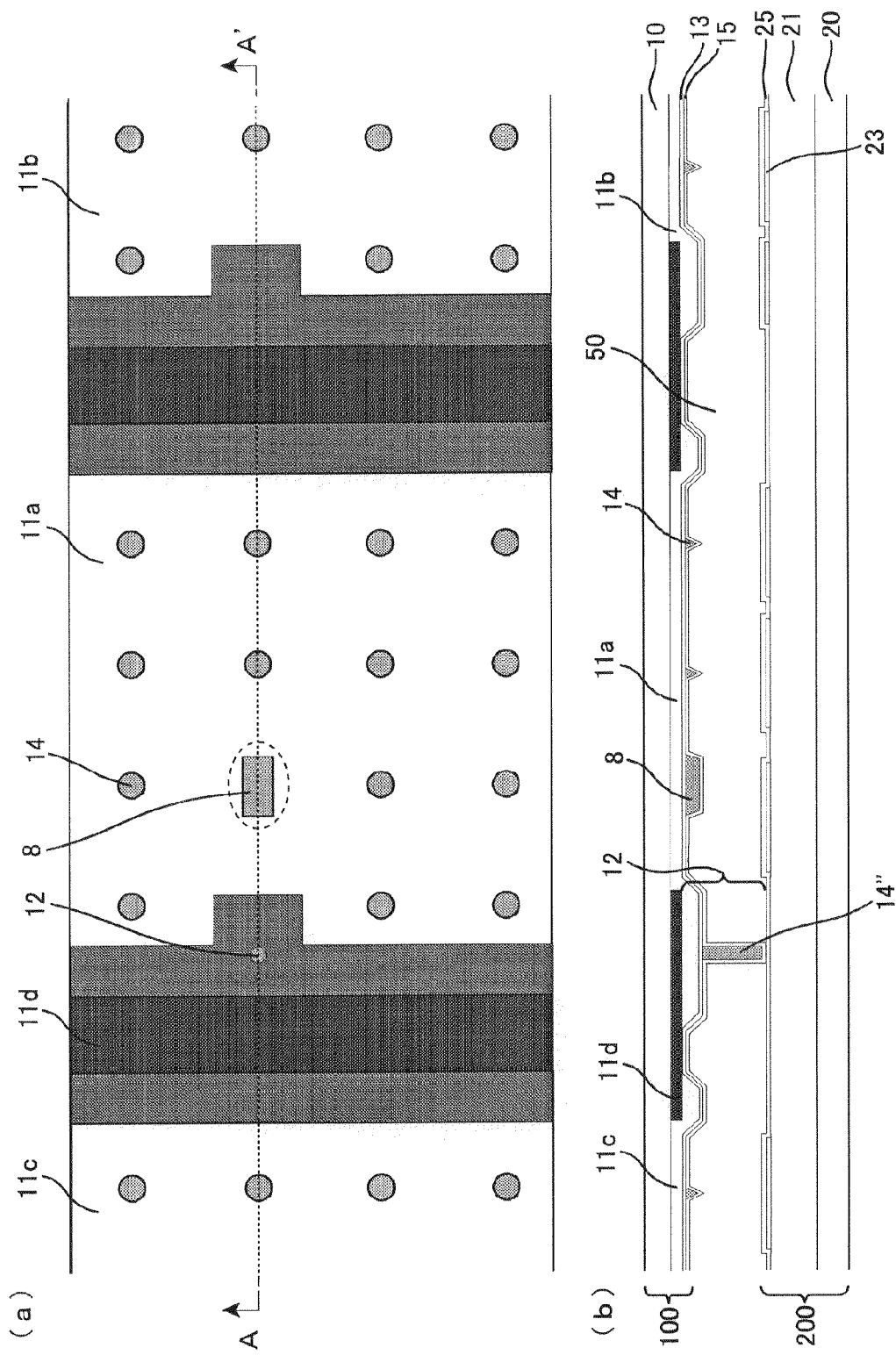
FIG. 12 (a) is a schematic plan view showing a constitution of a color filter substrate mounted on a liquid crystal display panel according to Example 12 of the present invention, and FIG. 12 (b) is a schematic section view showing the liquid crystal display panel taken along line A-A' in FIG. 12 (a).

FIGS. 9 (a), 10 (a), 11 (a), and 12 (a) are schematic plan views showing constitutions of color filter (CF) substrates mounted on liquid crystal display panels according to Examples 9 to 12 of the present invention, and FIGS. 9 (b), 10 (b), 11 (b), and 12 (b) are schematic section views showing the liquid crystal display panels taken along lines A-A' in FIGS. 9 to 12(a)s.

The liquid crystal display panels according to Examples 9 to 12 respectively have the same constitutions as those according to Examples 1 to 4, except that the specific structure 8 (surrounded by a dotted line in the drawings) is not formed in a light shielding area but it is formed at a dot-shaped protrusion for controlling an alignment near the stacked PS 12.

According to the liquid crystal display panels in Examples 9 to 12, the same operation effects as those in Examples 1 to 4 can be provided, since the entire specific structure 8, and a linear part and an angular part of the specific structure 8 can be recognized by an image recognition device as a positioning pattern.

Examples 13 to 17

Figure 13:
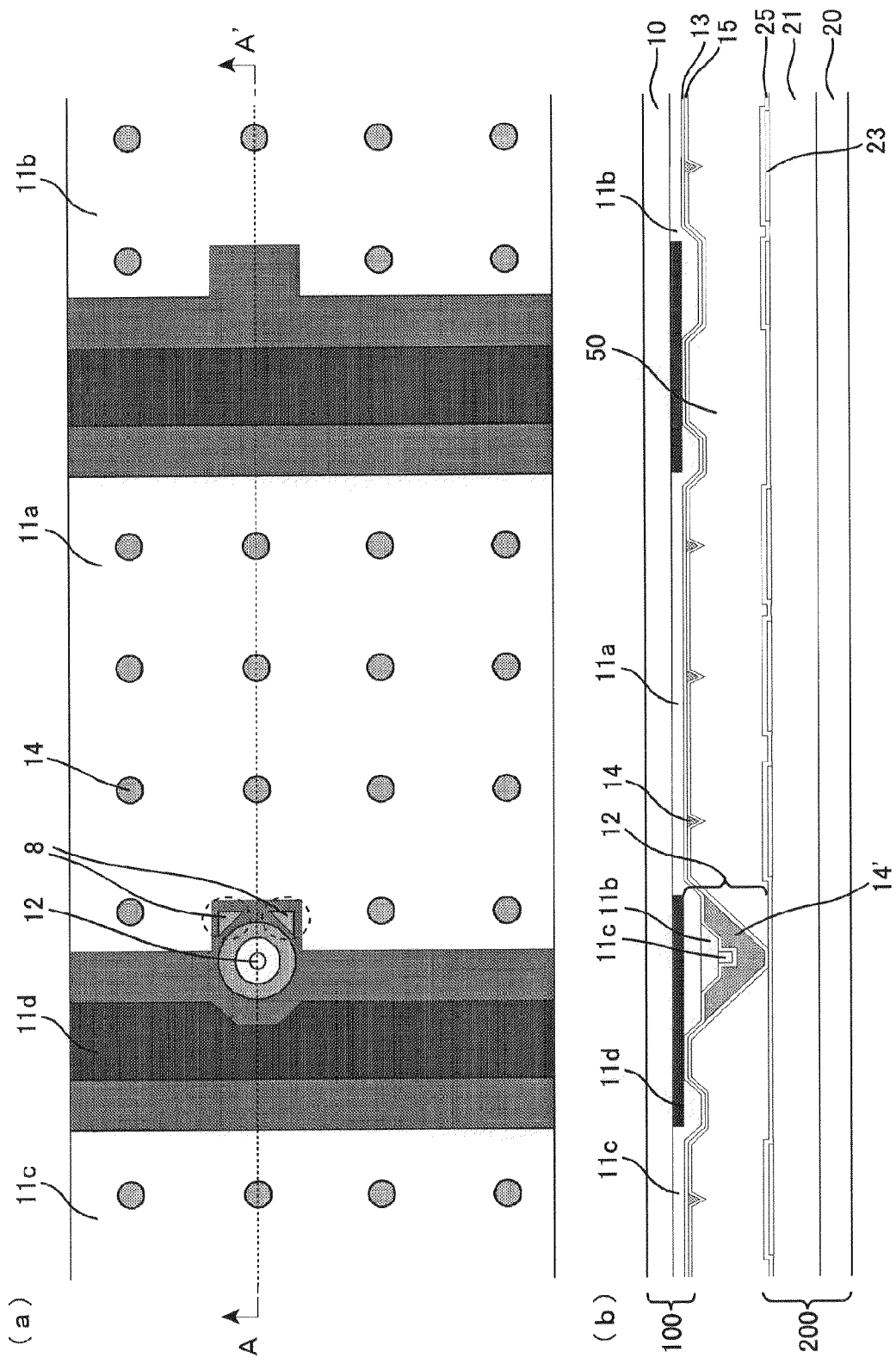
FIG. 13 (a) is a schematic plan view showing a constitution of a color filter substrate mounted on a liquid crystal display panel according to Example 13 of the present invention, and FIG. 13 (b) is a schematic section view showing the liquid crystal display panel taken along line A-A' in FIG. 13 (a).
Figure 14:
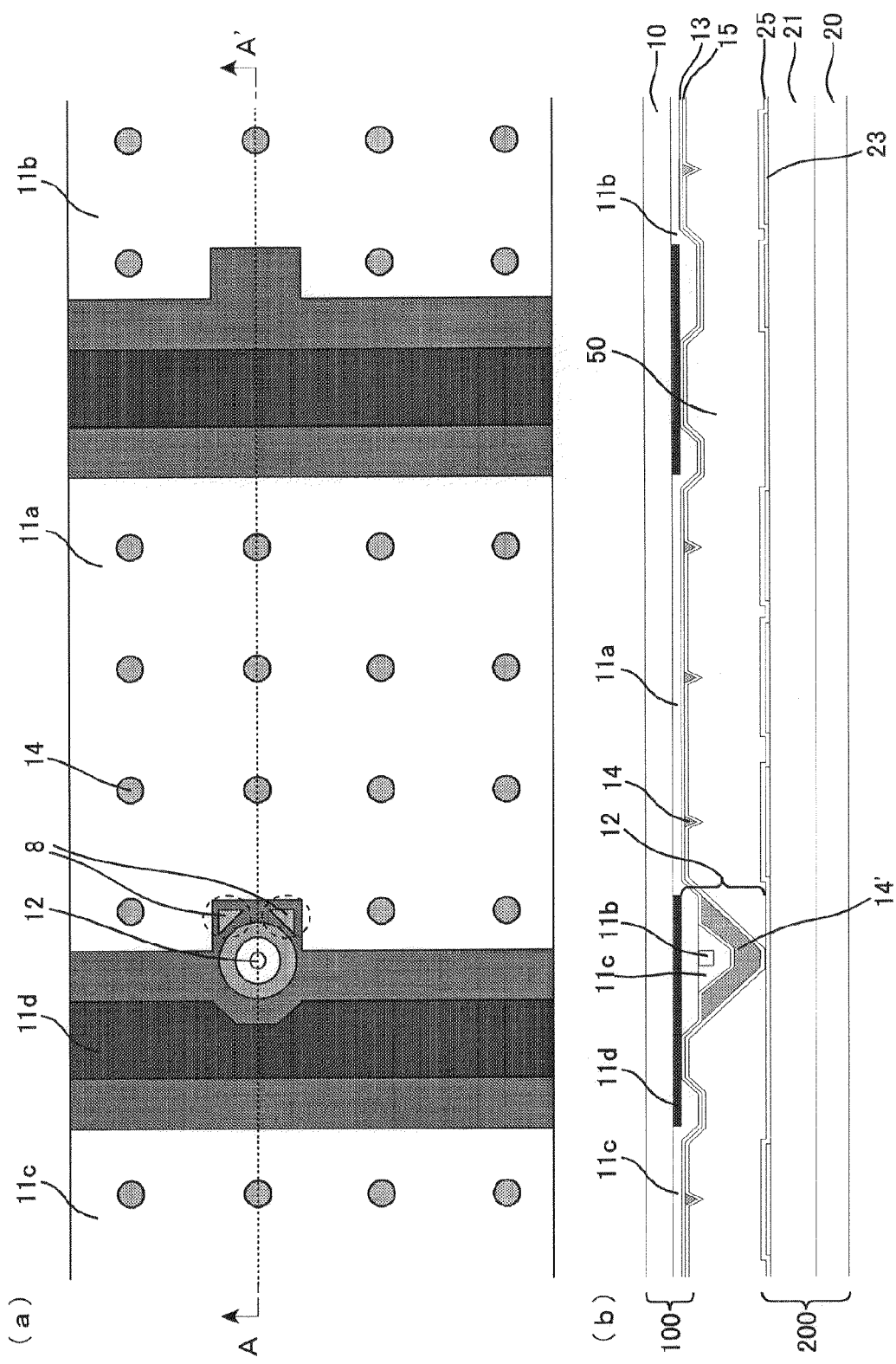
FIG. 14 (a) is a schematic plan view showing a constitution of a color filter substrate mounted on a liquid crystal display panel according to Example 14 of the present invention, and FIG. 14 (b) is a schematic section view showing the liquid crystal display panel taken along line A-A' in FIG. 14 (a).
Figure 15:
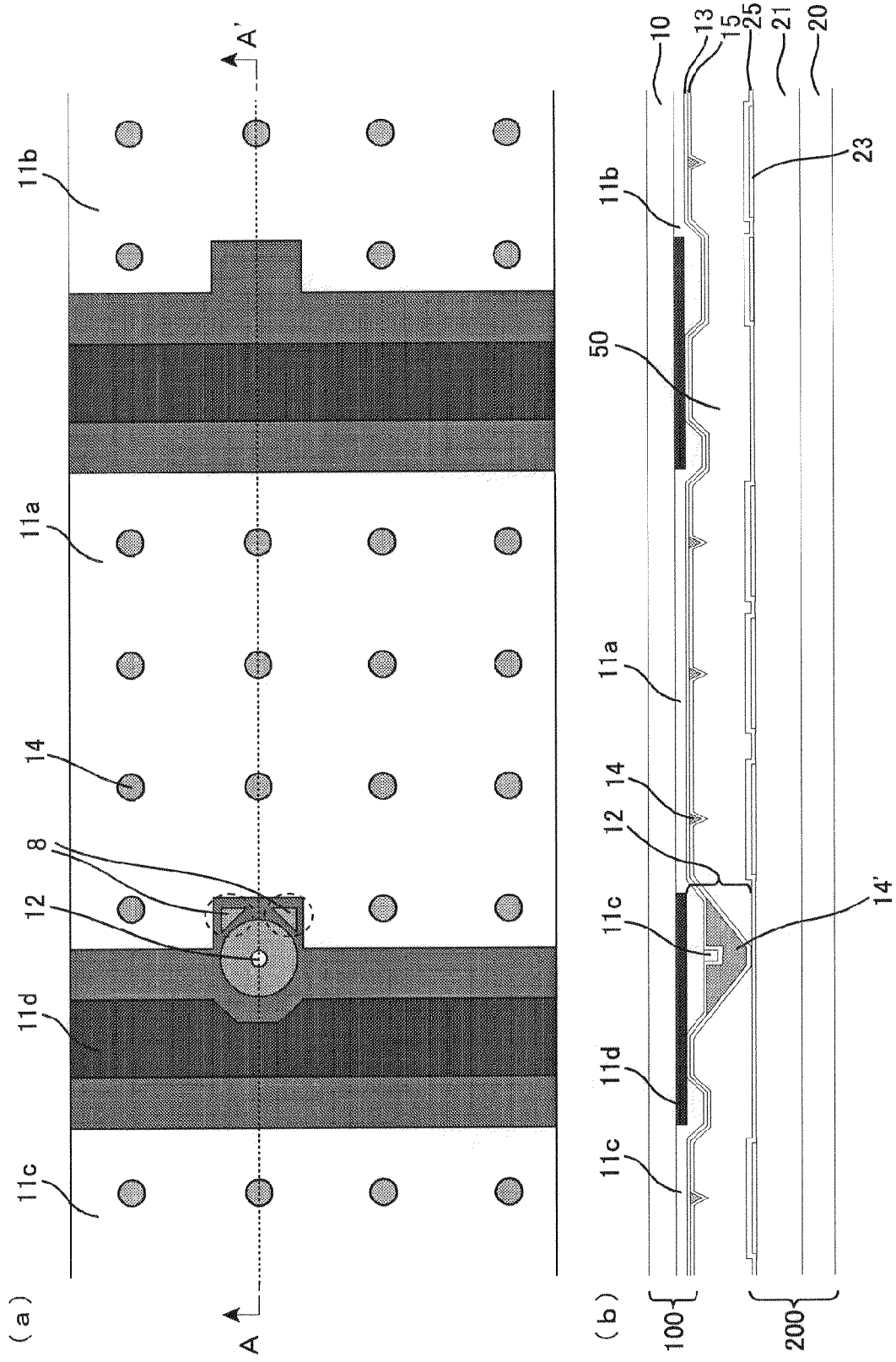
FIG. 15 (a) is a schematic plan view showing a constitution of a color filter substrate mounted on a liquid crystal display panel according to Example 15 of the present invention, and FIG. 15 (b) is a schematic section view showing the liquid crystal display panel taken along line A-A' in FIG. 15 (a).
Figure 16:
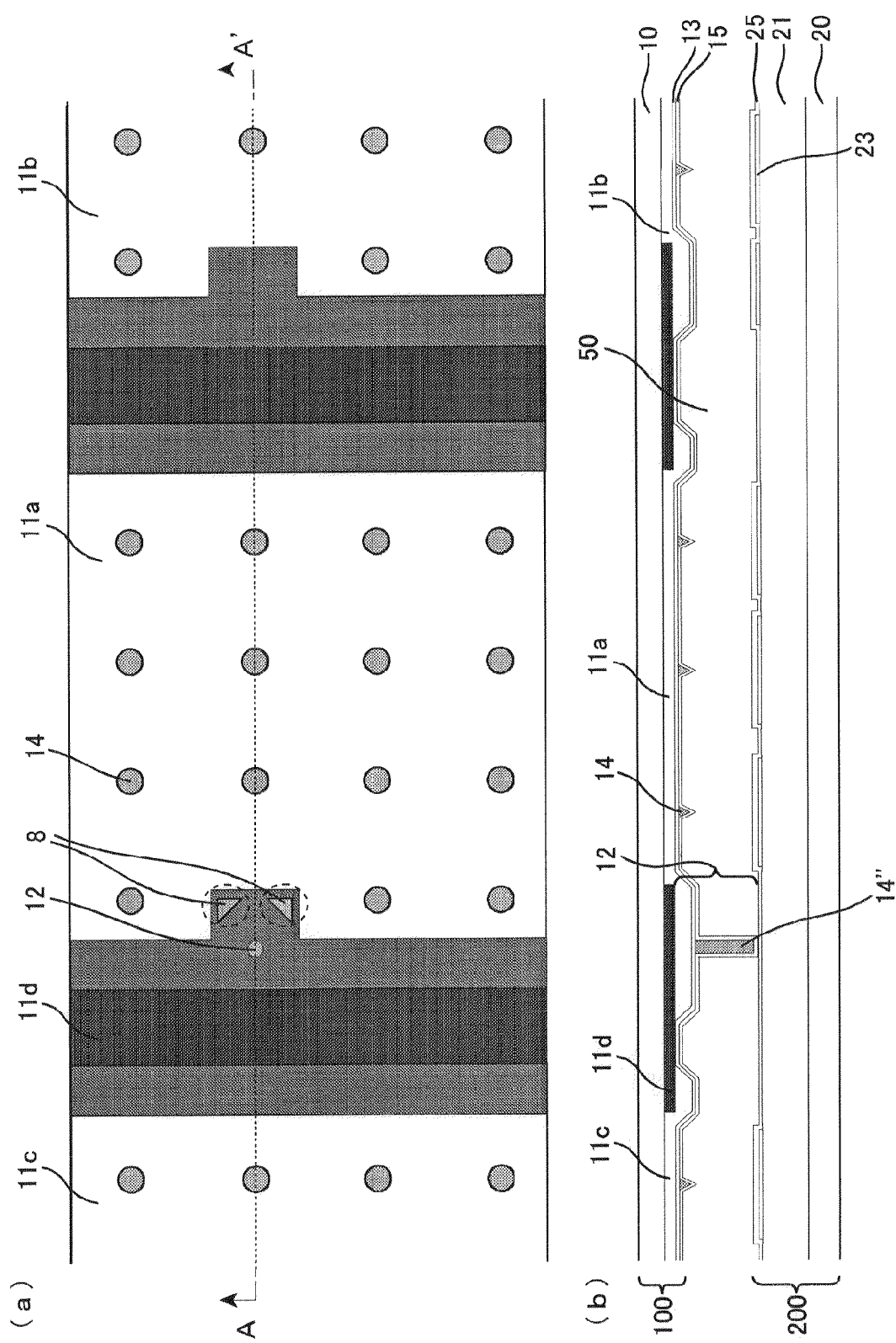
FIG. 16 (a) is a schematic plan view showing a constitution of a color filter substrate mounted on a liquid crystal display panel according to Example 16 of the present invention, and FIG. 16 (b) is a schematic section view showing the liquid crystal display panel taken along line A-A' in FIG. 16 (a).
Figure 17:
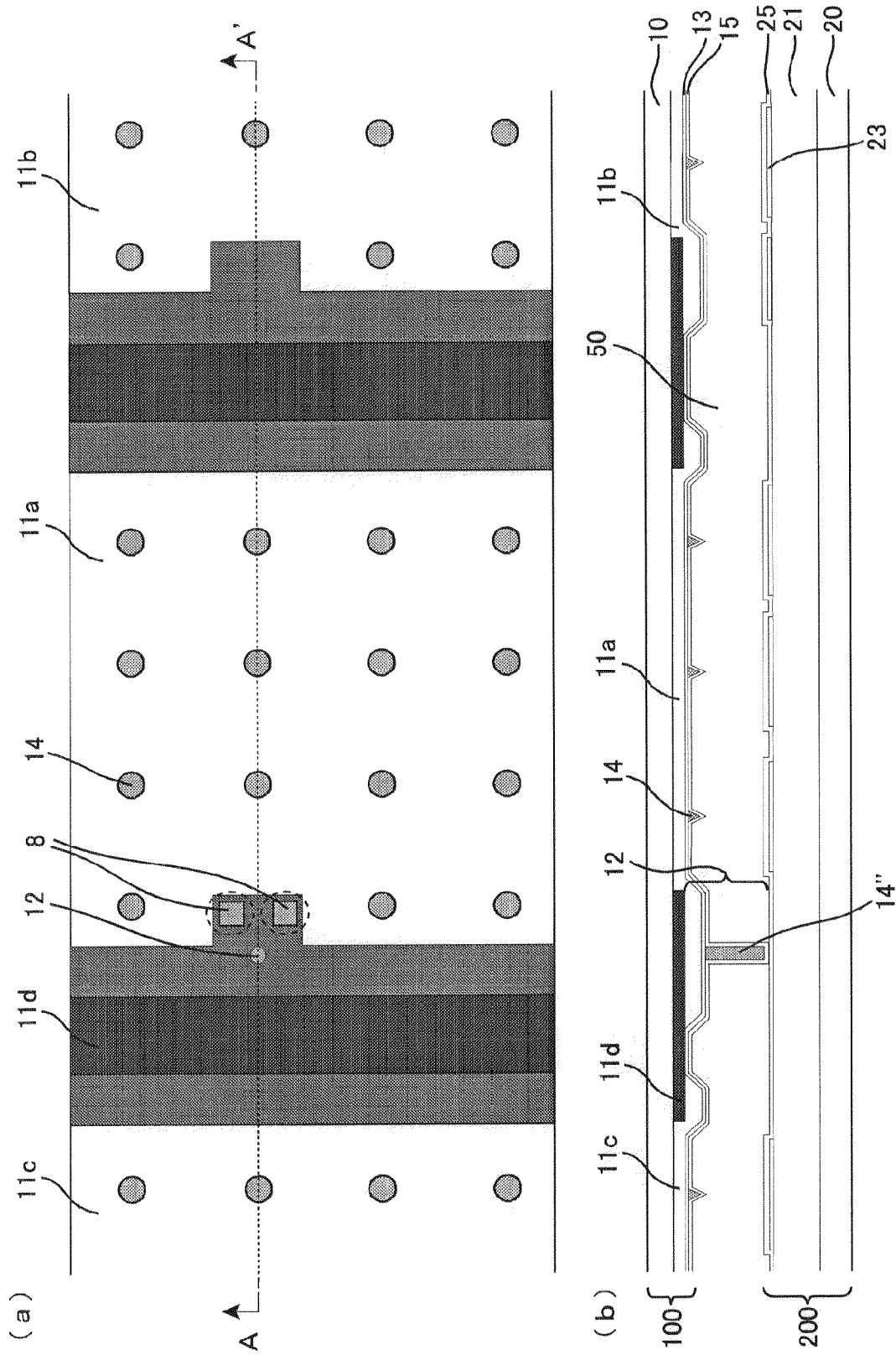
FIG. 17 (a) is a schematic plan view showing a constitution of a color filter substrate mounted on a liquid crystal display panel according to Example 17 of the present invention, and FIG. 17 (b) is a schematic section view showing the liquid crystal display panel taken along line A-A' in FIG. 17 (a).

FIGS. 13 (a), 14 (a), 15 (a), 16 (a), and 17 (a) are schematic plan views showing constitutions of color filter (CF) substrates mounted on liquid crystal display panels according to Examples 13 to 17 of the present invention, and FIGS. 13 (b), 14 (b), 15 (b), 16 (b), 17(b) are schematic section views showing the liquid crystal display panels taken along lines A-A' in FIGS. 13 to 17 (a)s.

According to the liquid crystal display panels in Examples 13 to 17, a pair of triangular or quadrangular specific structures 8 formed of the same material as that of the protrusion material layer 14' is formed on a BM layer 11d near the stacked PS 12 as shown by dotted lines in the drawings.

As for the other constitutions, the liquid crystal display panels in Examples 13 to 17 respectively have the same configurations as those of the liquid crystal display panels in Examples 5 to 8.

The same operation effects as those in Examples 5 to 8 can be provided also in the liquid crystal display panels of Examples 13 to 17.

In addition, the planar shape of the specific structure 8 in this Example is not particularly limited to the triangle or the quadrangle and it may be any shape.

Examples 18 to 20

Figure 18:
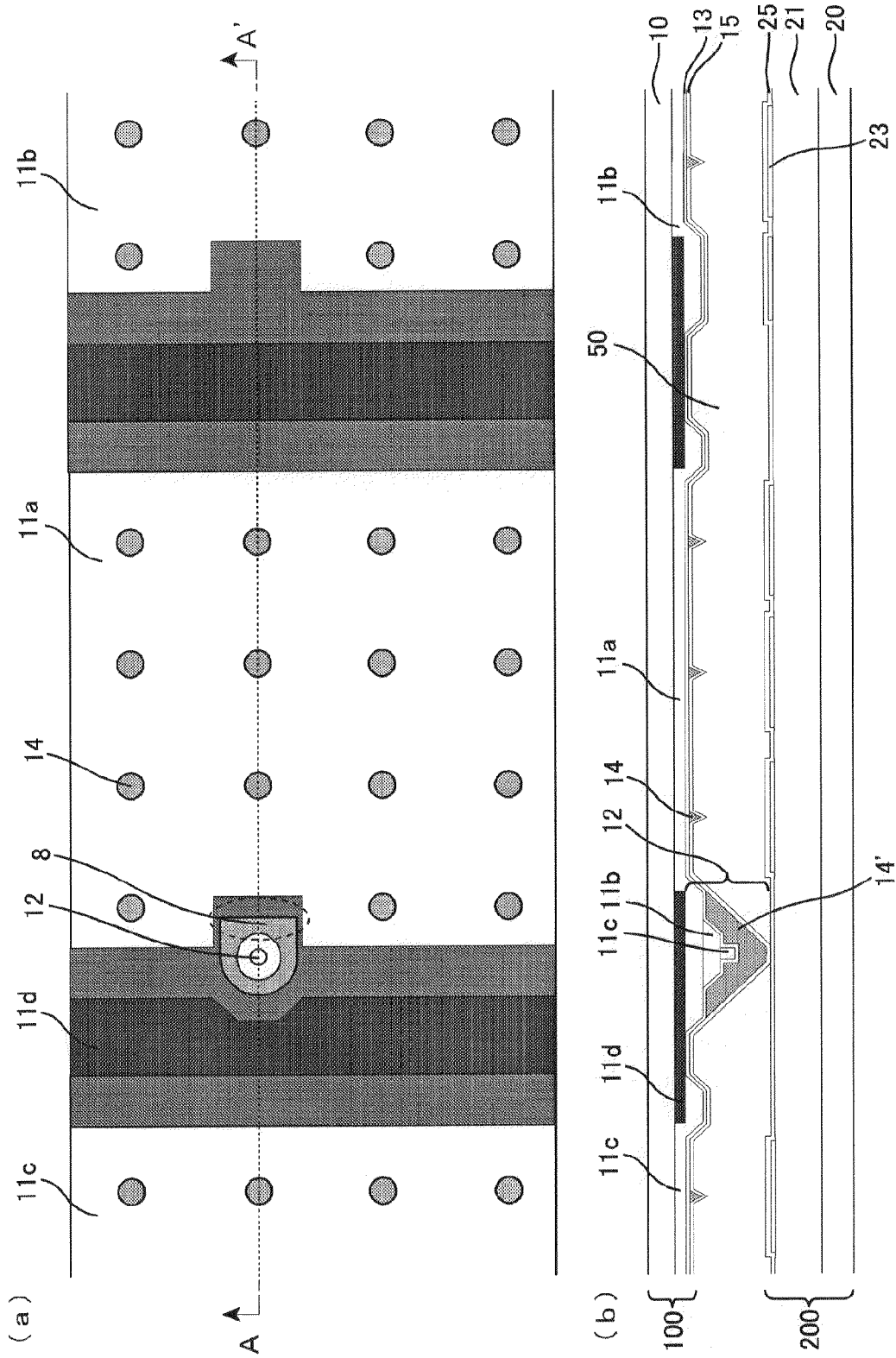
FIG. 18 (a) is a schematic plan view showing a constitution of a color filter substrate mounted on a liquid crystal display panel according to Example 18 of the present invention, and FIG. 18 (b) is a schematic section view showing the liquid crystal display panel taken along line A-A' in FIG. 18 (a).
Figure 19:
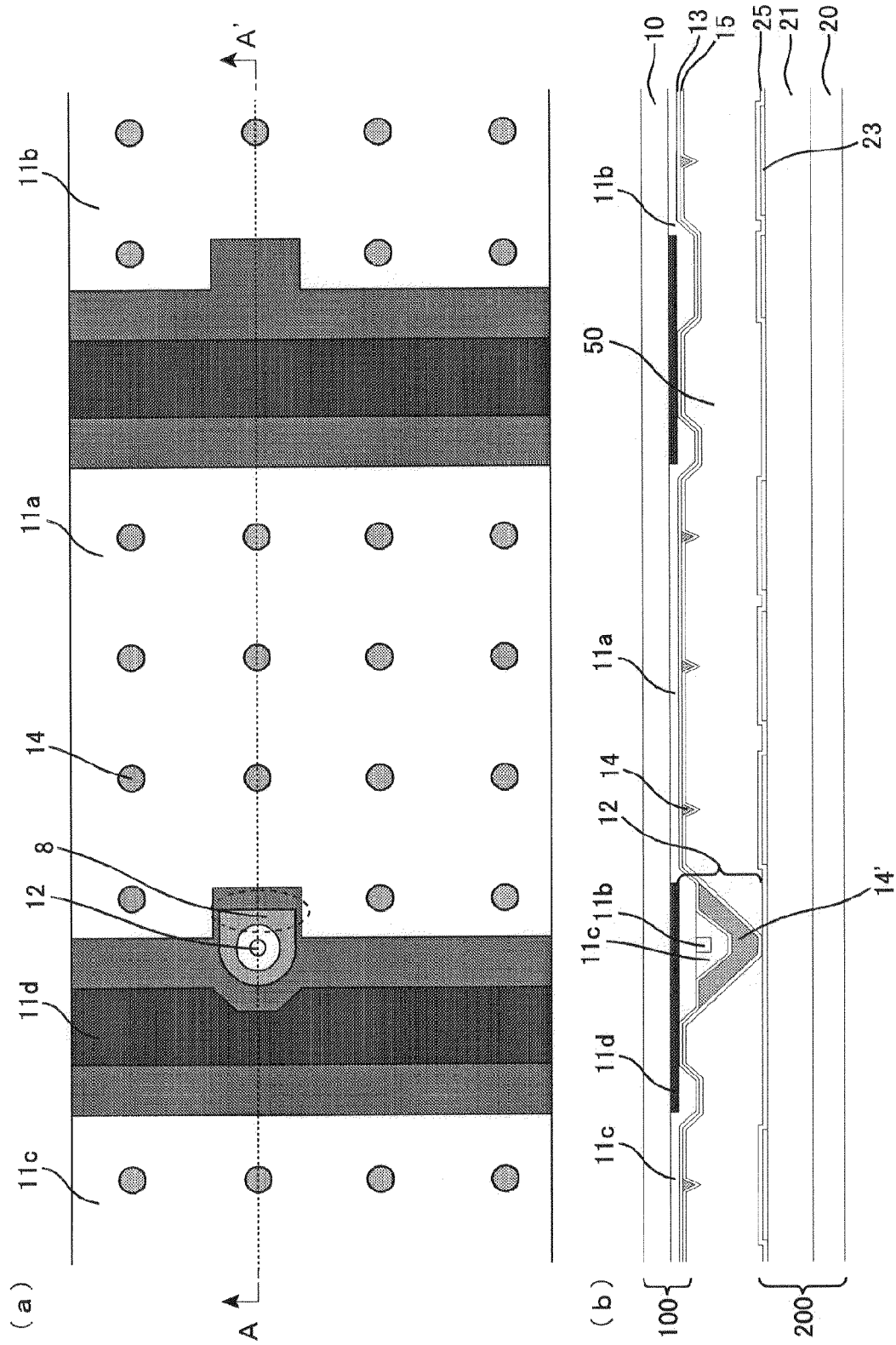
FIG. 19 (a) is a schematic plan view showing a constitution of a color filter substrate mounted on a liquid crystal display panel according to Example 19 of the present invention, and FIG. 19 (b) is a schematic section view showing the liquid crystal display panel taken along line A-A' in FIG. 19 (a).
Figure 20:
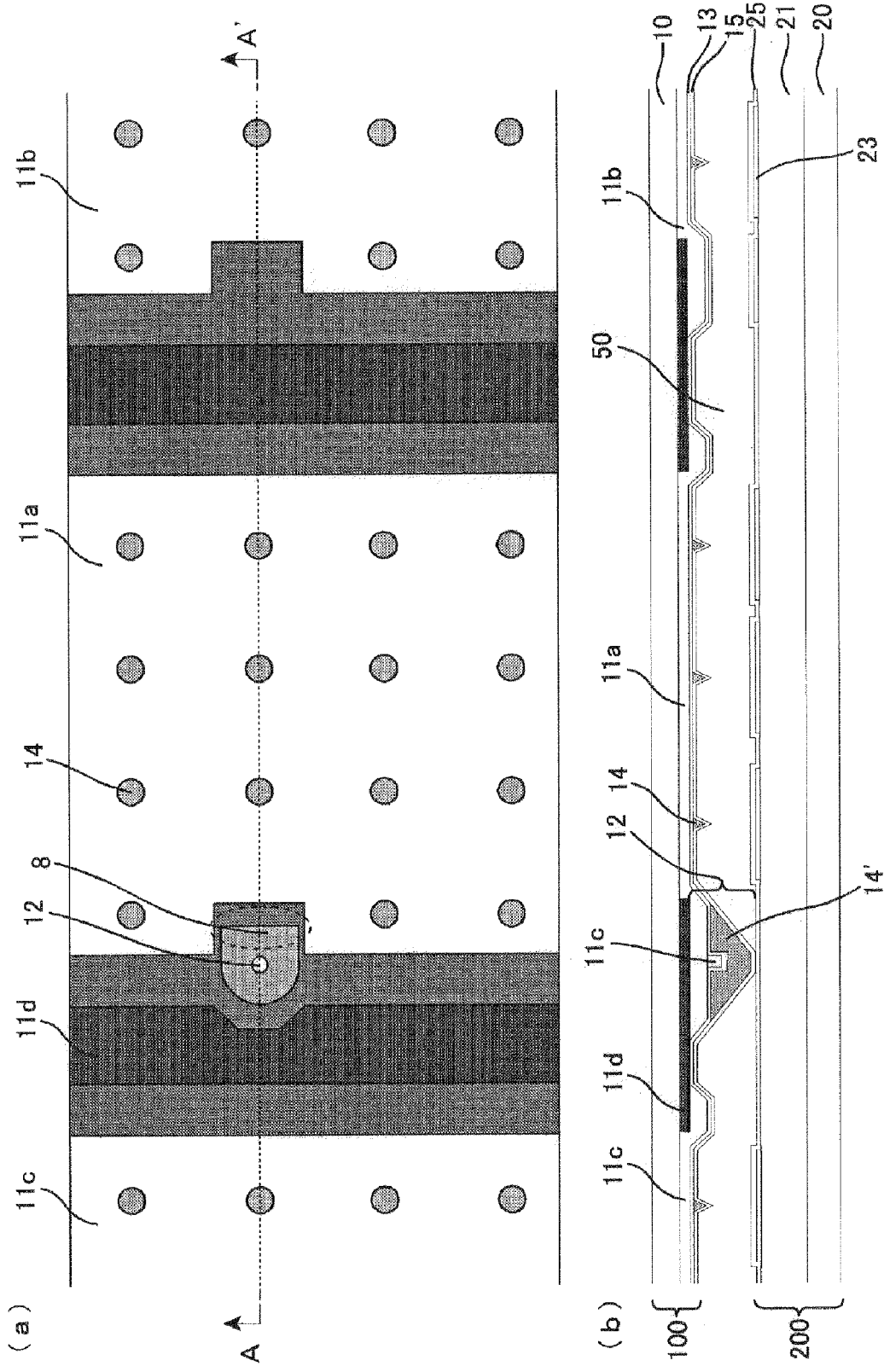
FIG. 20 (a) is a schematic plan view showing a constitution of a color filter substrate mounted on a liquid crystal display panel according to Example 20 of the present invention, and FIG. 20 (b) is a schematic section view showing the liquid crystal display panel taken along line A-A' in FIG. 20 (a).
Figure 21:
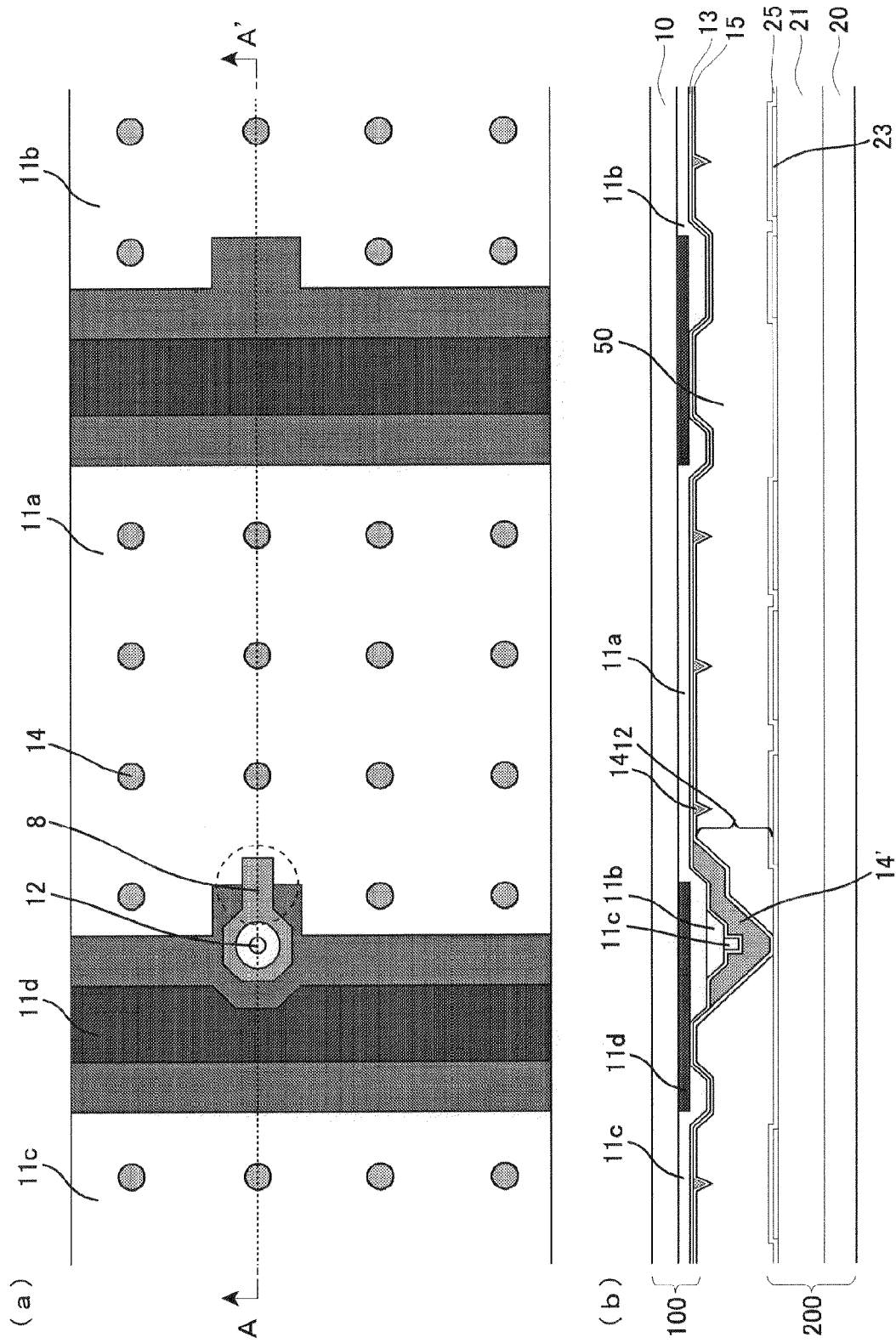
FIG. 21 (a) is a schematic plan view showing a constitution of a color filter substrate mounted on a liquid crystal display panel according to Example 21 of the present invention, and FIG. 21 (b) is a schematic section view showing the liquid crystal display panel taken along line A-A' in FIG. 21 (a).
Figure 22:
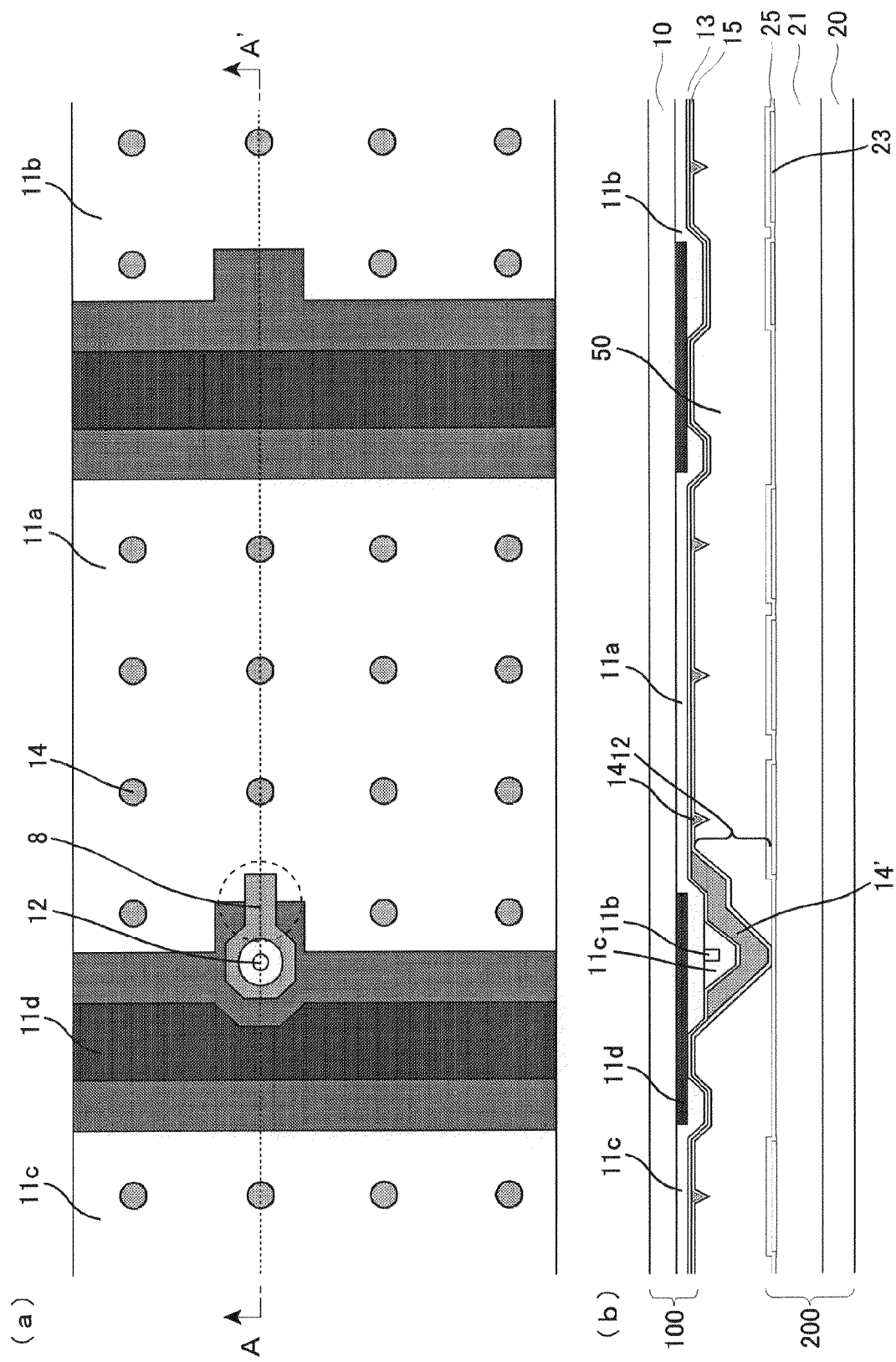
FIG. 22 (a) is a schematic plan view showing a constitution of a color filter substrate mounted on a liquid crystal display panel according to Example 22 of the present invention, and FIG. 22 (b) is a schematic section view showing the liquid crystal display panel taken along line A-A' in FIG. 22 (a).
Figure 23:
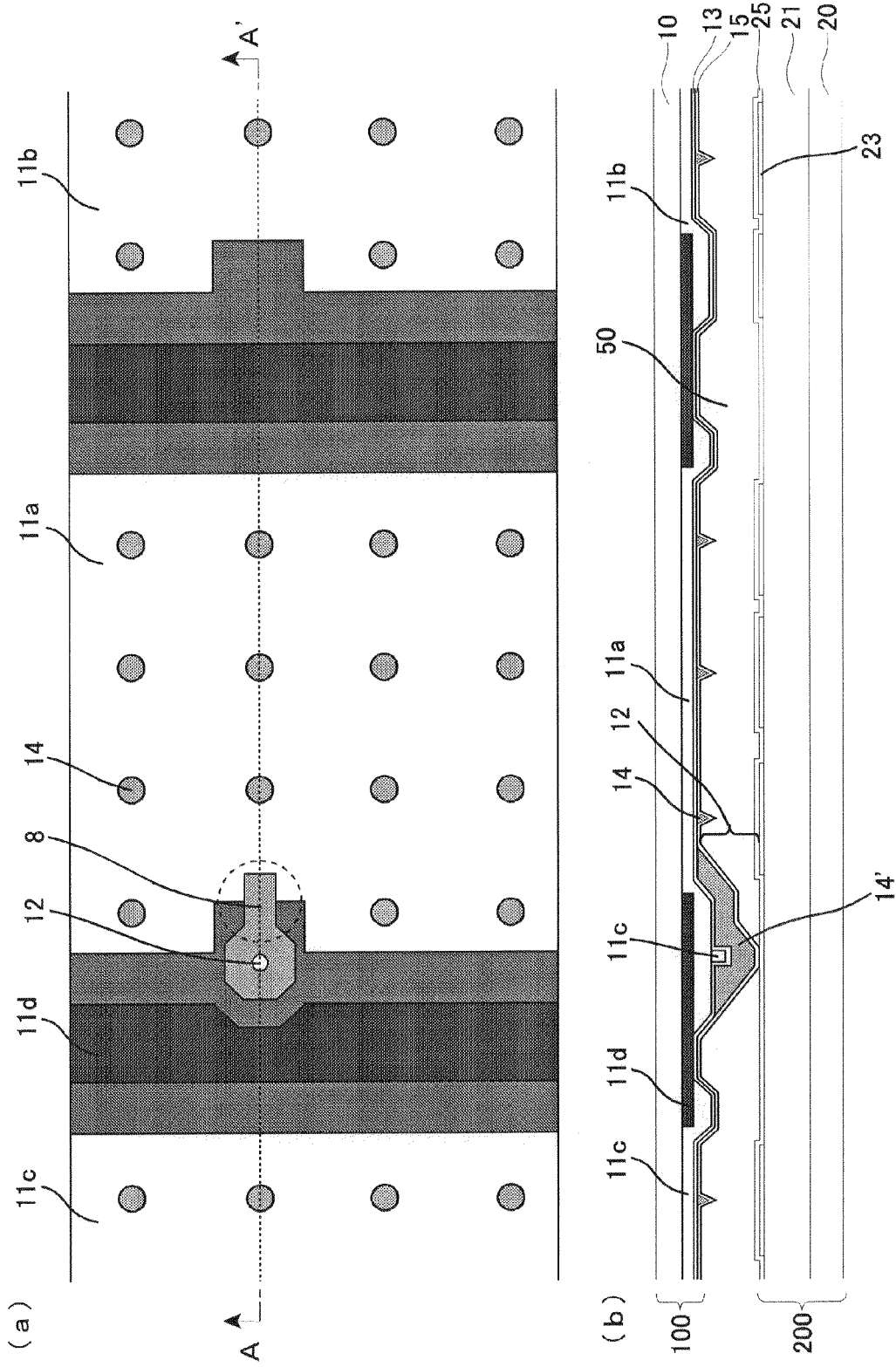
FIG. 23 (a) is a schematic plan view showing a constitution of a color filter substrate mounted on a liquid crystal display panel according to Example 23 of the present invention, and FIG. 23 (b) is a schematic section view showing the liquid crystal display panel taken along line A-A' in FIG. 23 (a).
Figure 24:
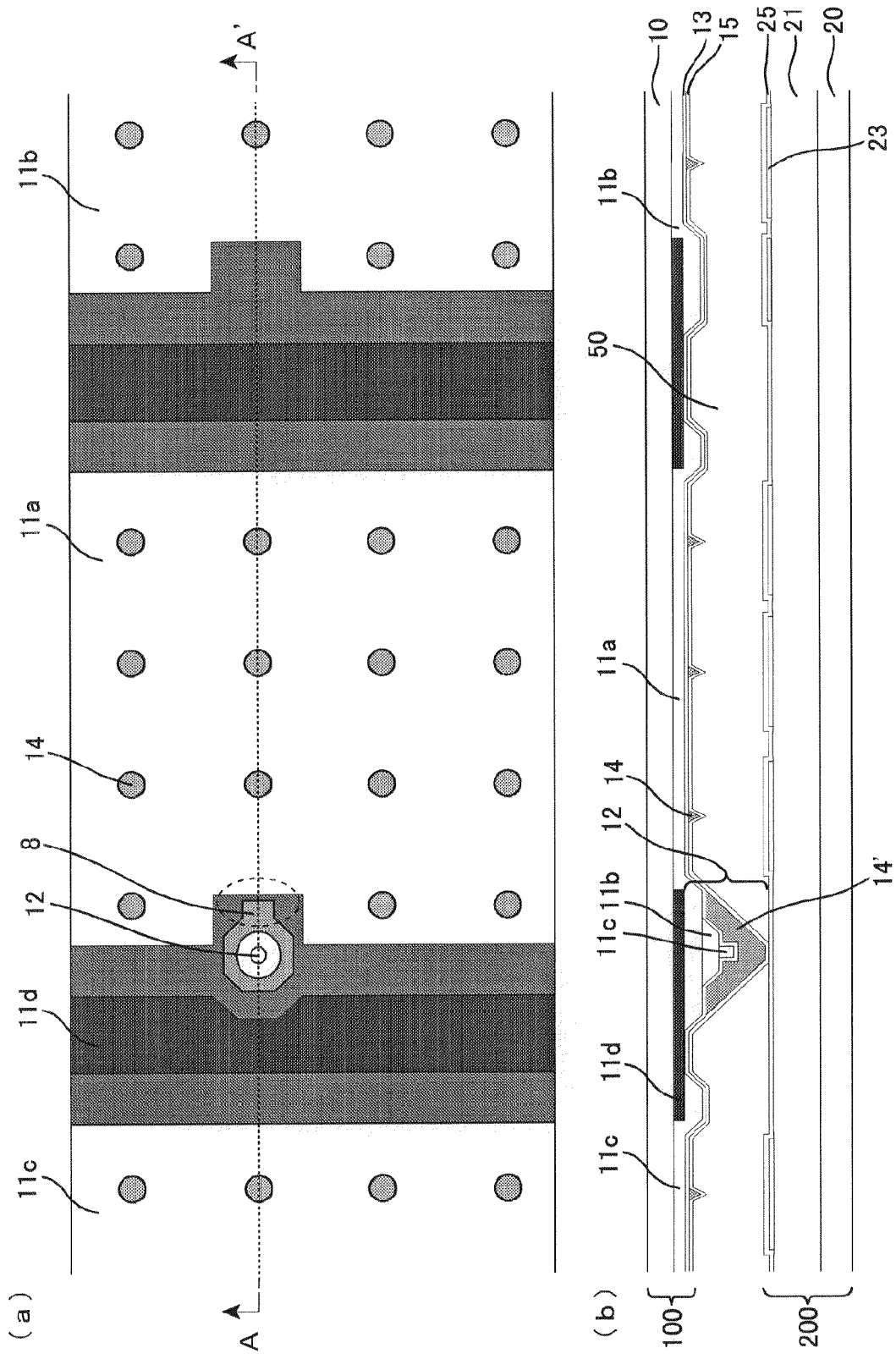
FIG. 24 (a) is a schematic plan view showing a constitution of a color filter substrate mounted on a liquid crystal display panel according to Example 24 of the present invention, and FIG. 24 (b) is a schematic section view showing the liquid crystal display panel taken along line A-A' in FIG. 24 (a).
Figure 25:
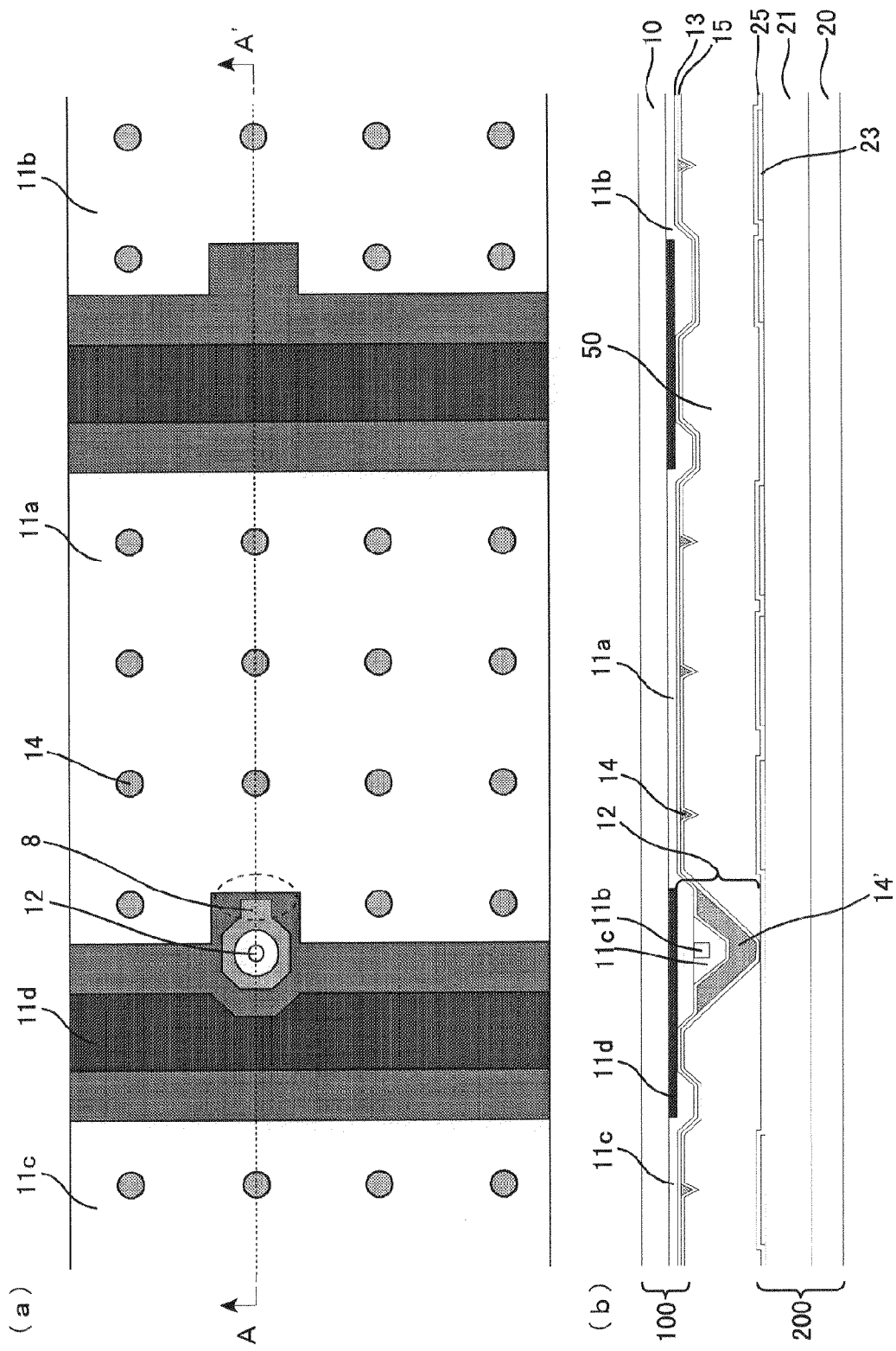
FIG. 25 (a) is a schematic plan view showing a constitution of a color filter substrate mounted on a liquid crystal display panel according to Example 25 of the present invention, and FIG. 25 (b) is a schematic section view showing the liquid crystal display panel taken along line A-A' in FIG. 25 (a).
Figure 26:
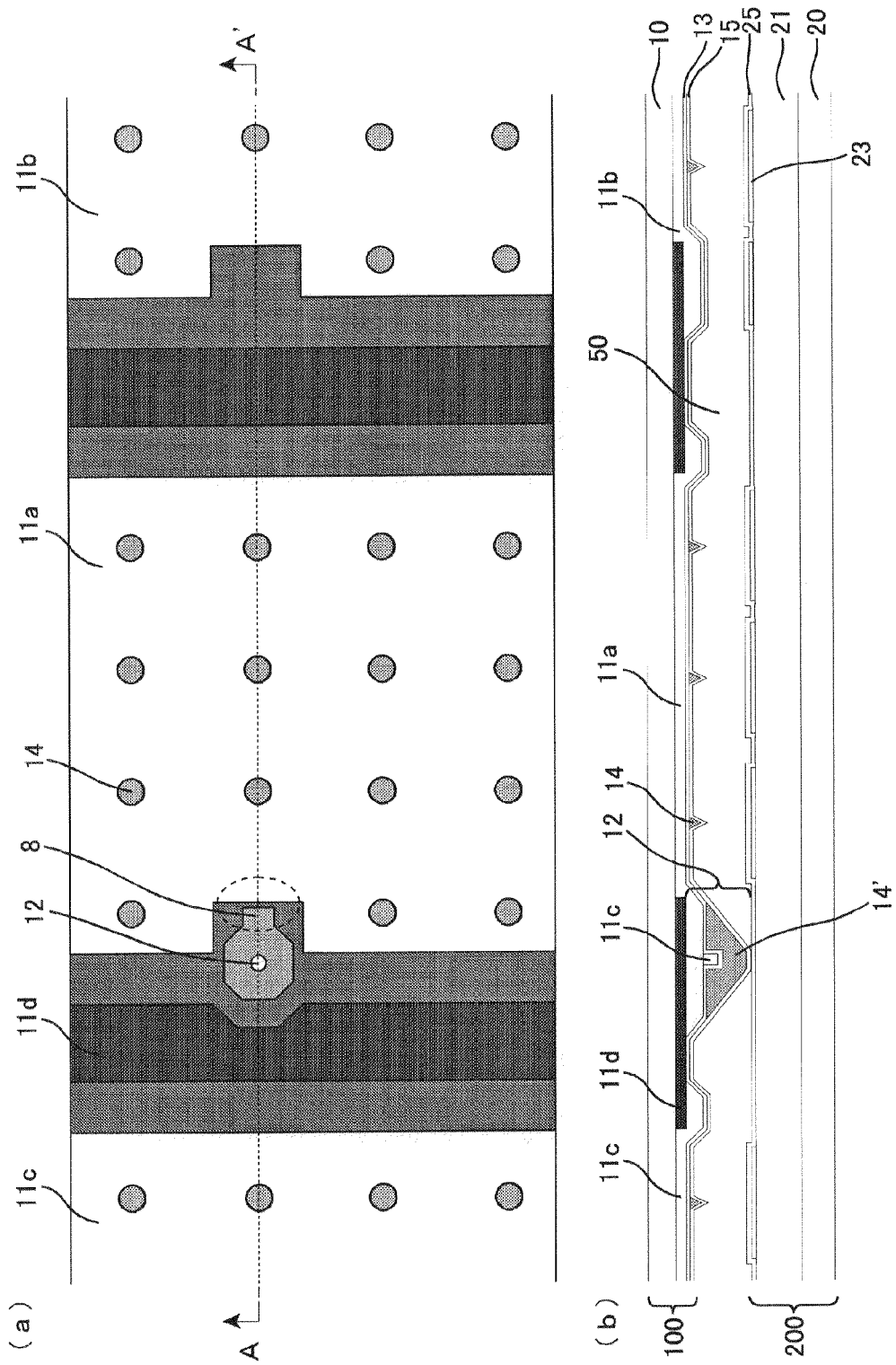
FIG. 26 (a) is a schematic plan view showing a constitution of a color filter substrate mounted on a liquid crystal display panel according to Example 26 of the present invention, and FIG. 26 (b) is a schematic section view showing the liquid crystal display panel taken along line A-A' in FIG. 26 (a).
Figure 27:
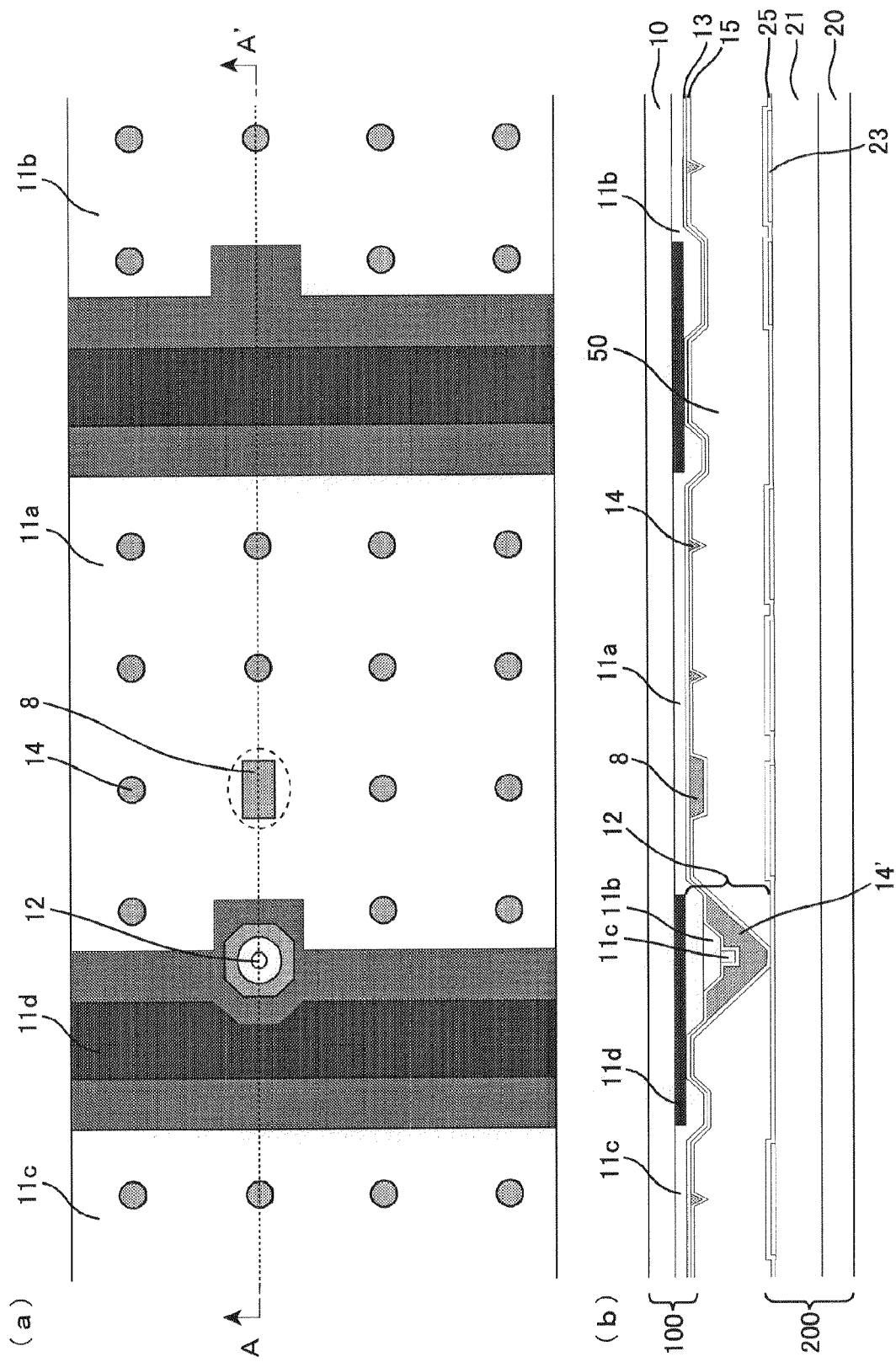
FIG. 27 (a) is a schematic plan view showing a constitution of a color filter substrate mounted on a liquid crystal display panel according to Example 27 of the present invention, and FIG. 27 (b) is a schematic section view showing the liquid crystal display panel taken along line A-A' in FIG. 27 (a).
Figure 28:
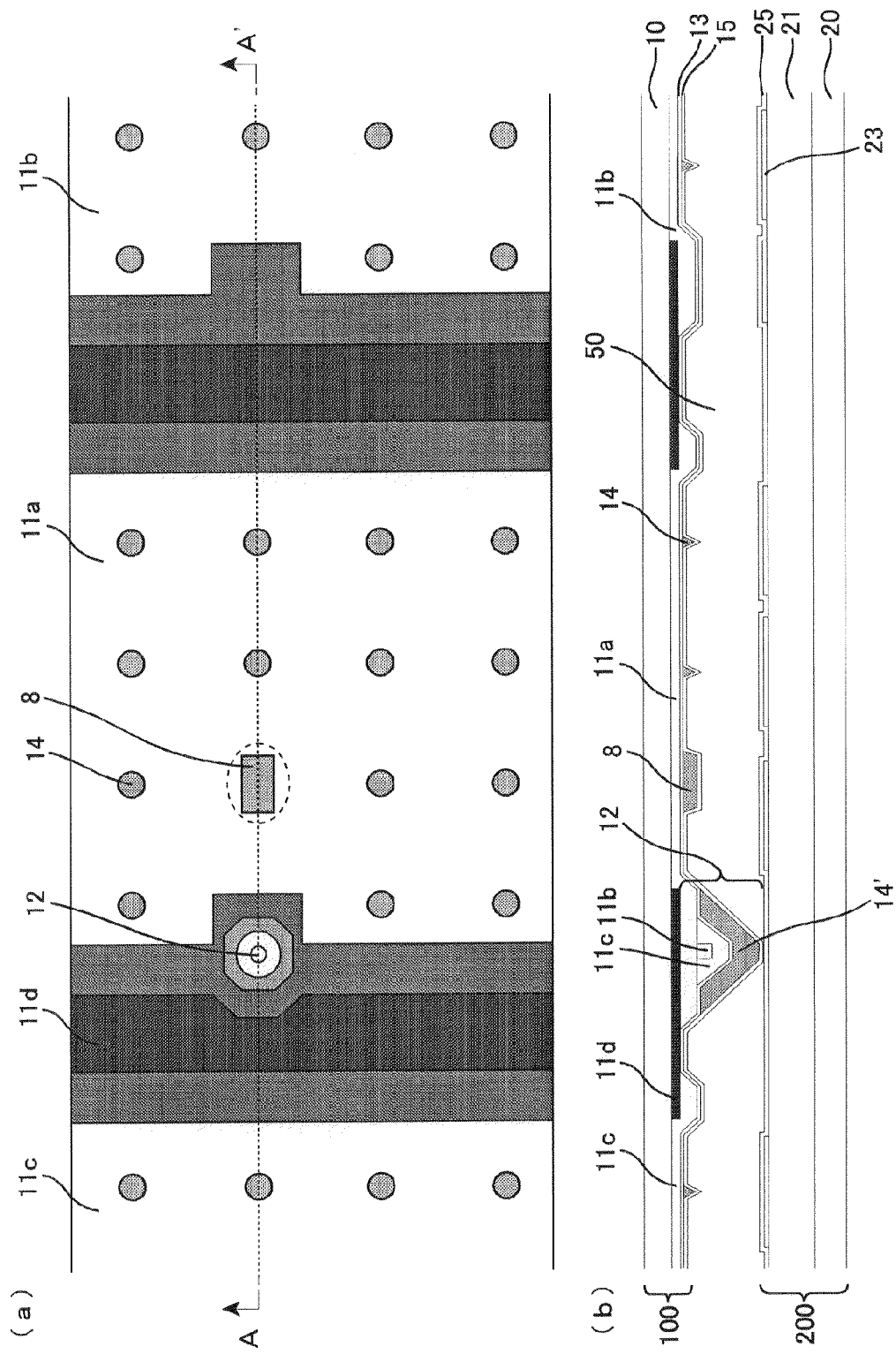
FIG. 28 (a) is a schematic plan view showing a constitution of a color filter substrate mounted on a liquid crystal display panel according to Example 28 of the present invention, and FIG. 28 (b) is a schematic section view showing the liquid crystal display panel taken along line A-A' in FIG. 28 (a).
Figure 29:
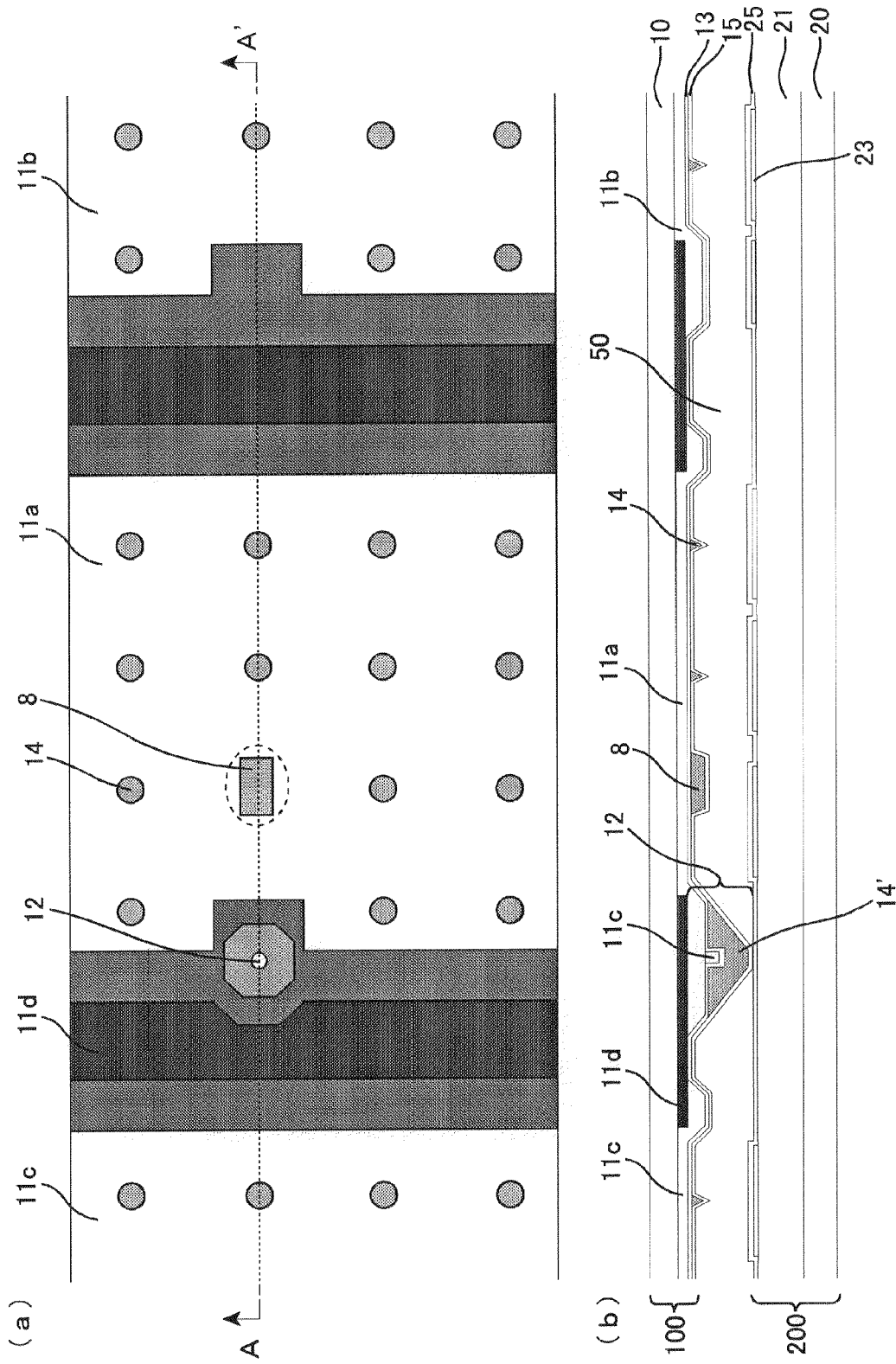
FIG. 29 (a) is a schematic plan view showing a constitution of a color filter substrate mounted on a liquid crystal display panel according to Example 29 of the present invention, and FIG. 29 (b) is a schematic section view showing the liquid crystal display panel taken along line A-A' in FIG. 29 (a).
Figure 30:
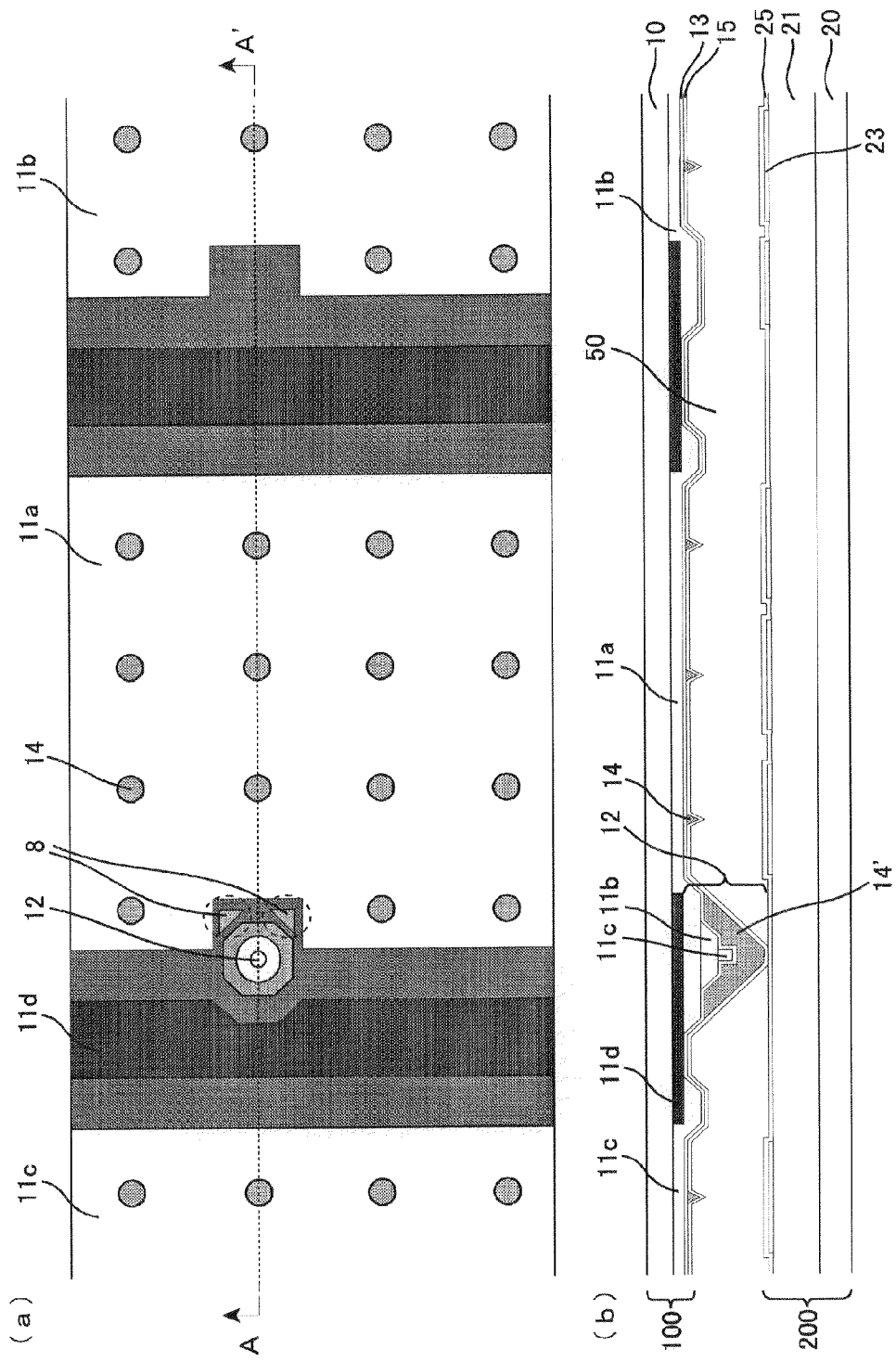
FIG. 30 (a) is a schematic plan view showing a constitution of a color filter substrate mounted on a liquid crystal display panel according to Example 30 of the present invention.
Figure 31:
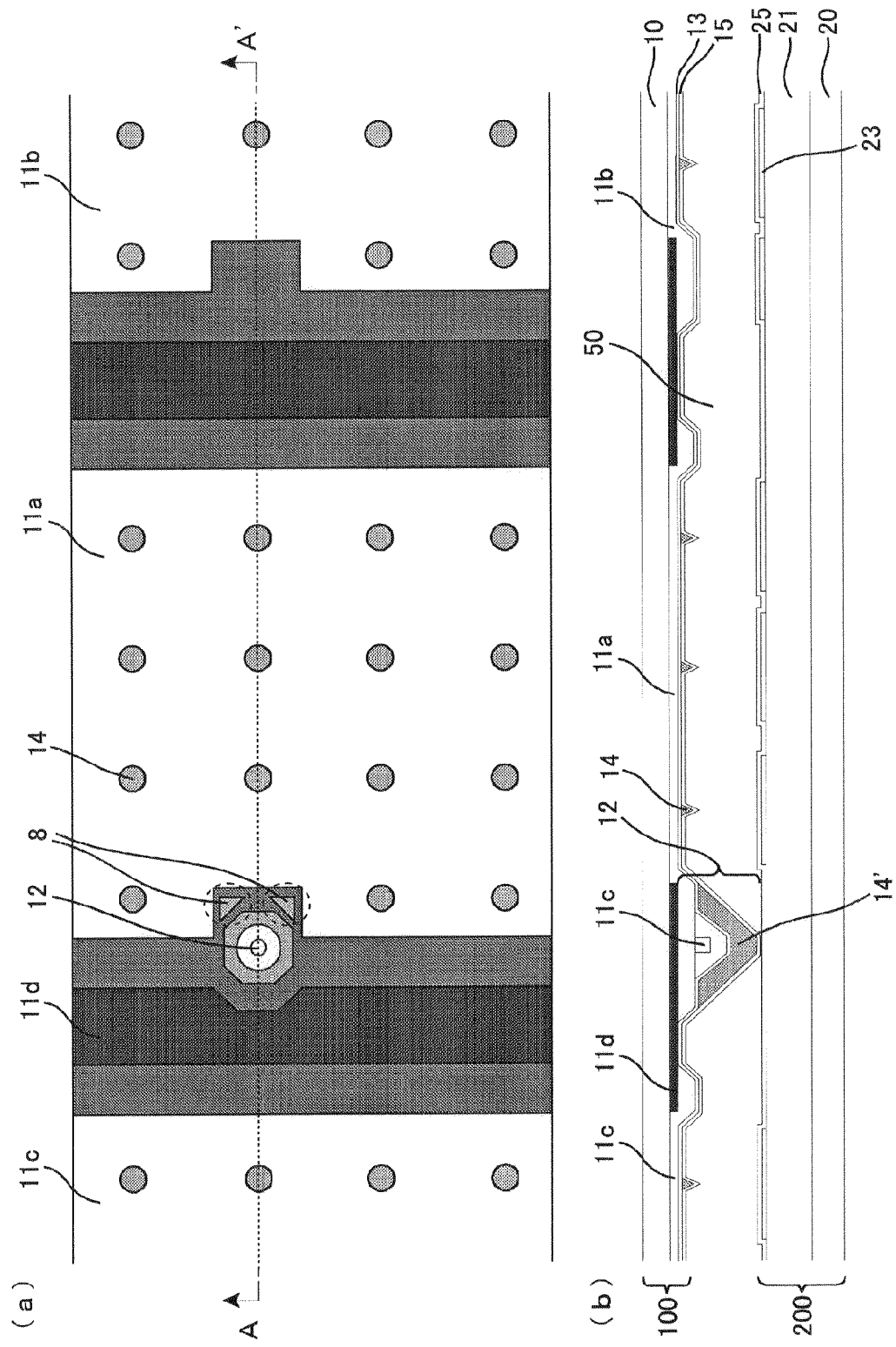
FIG. 31 (a) is a schematic plan view showing a constitution of a color filter substrate mounted on a liquid crystal display panel according to Example 31 of the present invention, and FIG. 31 (b) is a schematic section view showing the liquid crystal display panel taken along line A-A' in FIG. 31 (a).
Figure 32:
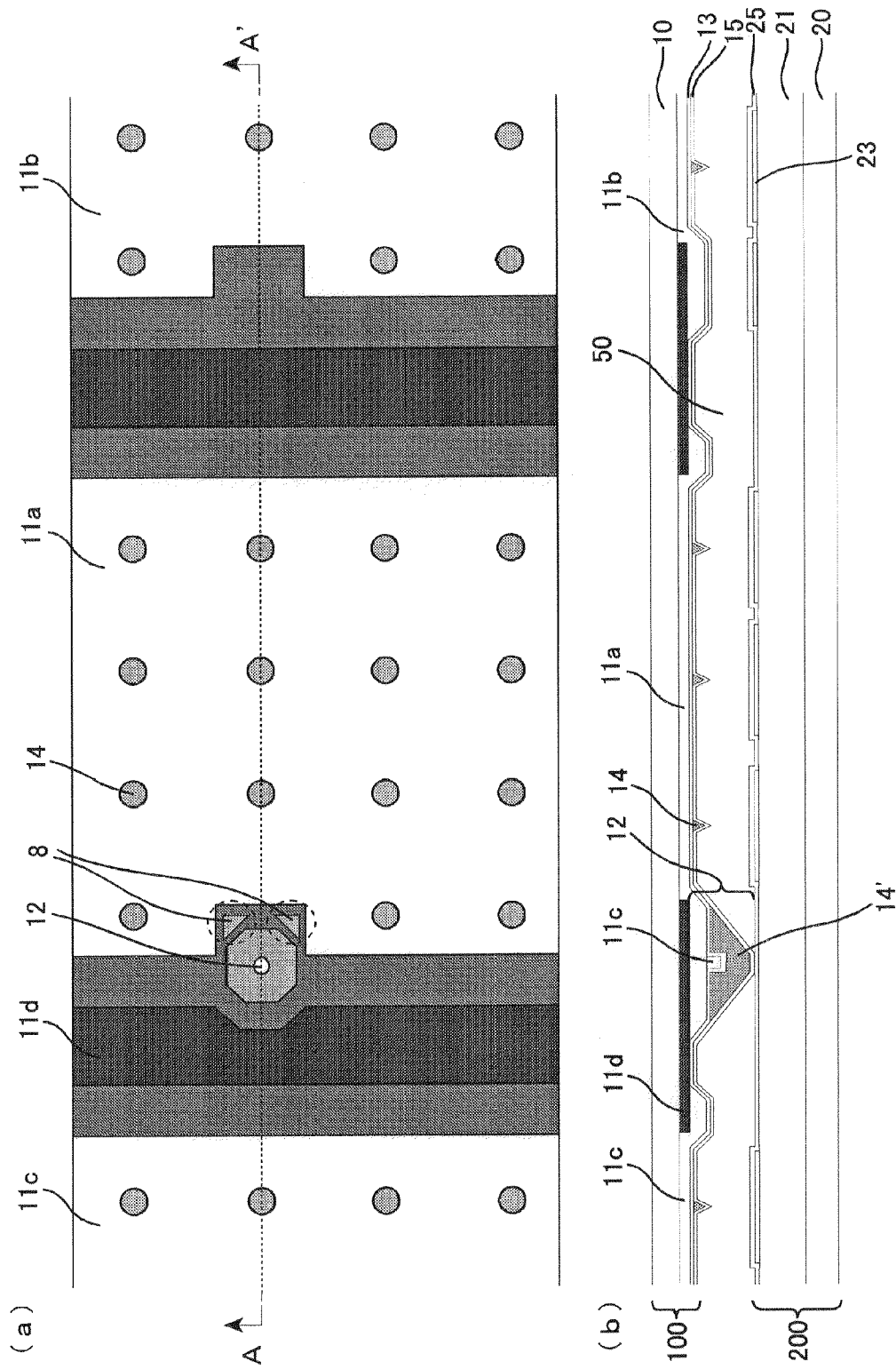
FIG. 32 (a) is a schematic plan view showing a constitution of a color filter substrate mounted on a liquid crystal display panel according to Example 32 of the present invention, and FIG. 32 (b) is a schematic section view showing the liquid crystal display panel taken along line A-A' in FIG. 32 (a).
Figure 33:
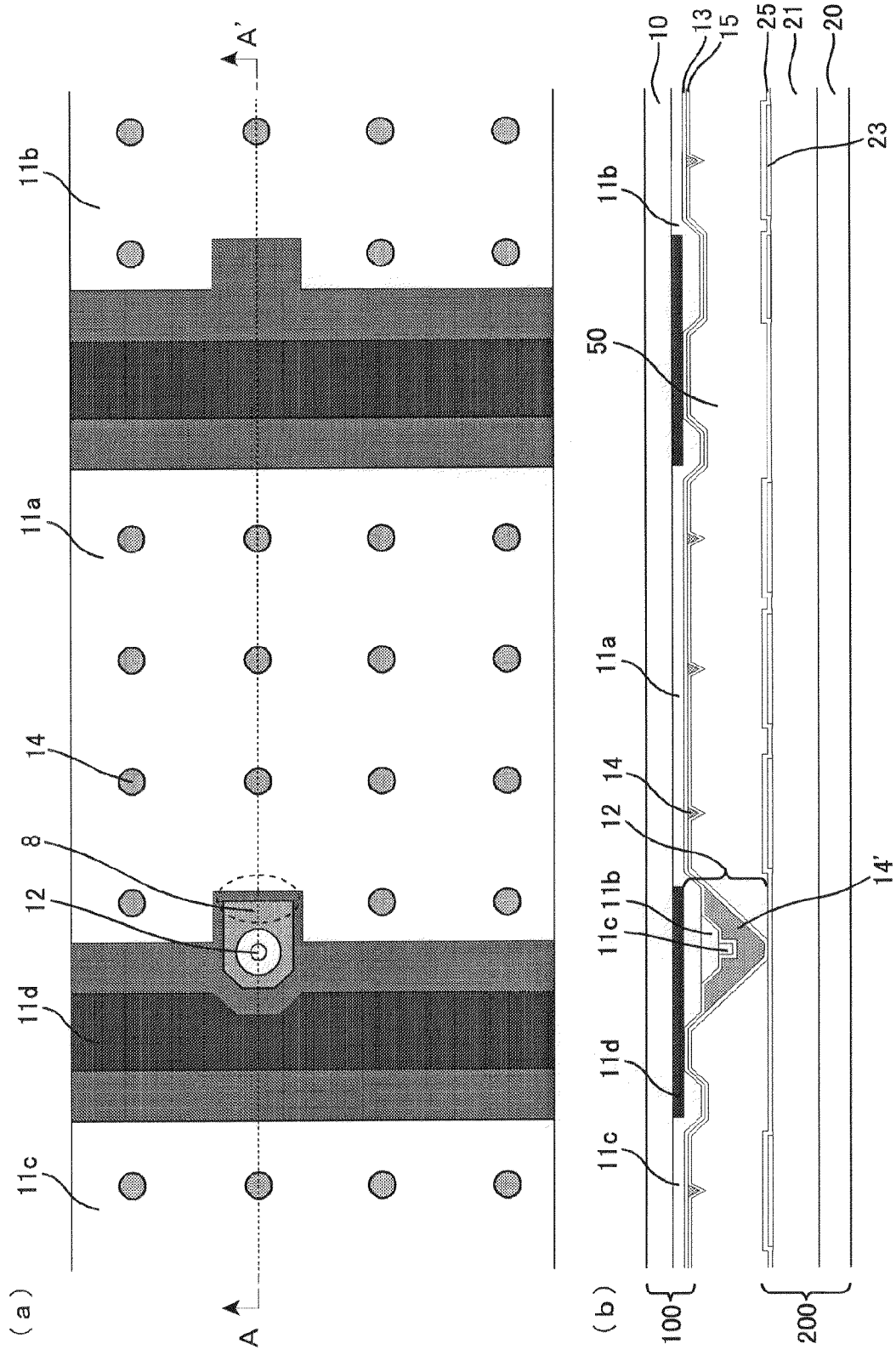
FIG. 33 (a) is a schematic plan view showing a constitution of a color filter substrate mounted on a liquid crystal display panel according to Example 33 of the present invention, and FIG. 33 (b) is a schematic section view showing the liquid crystal display panel taken along line A-A' in FIG. 33 (a).
Figure 34:
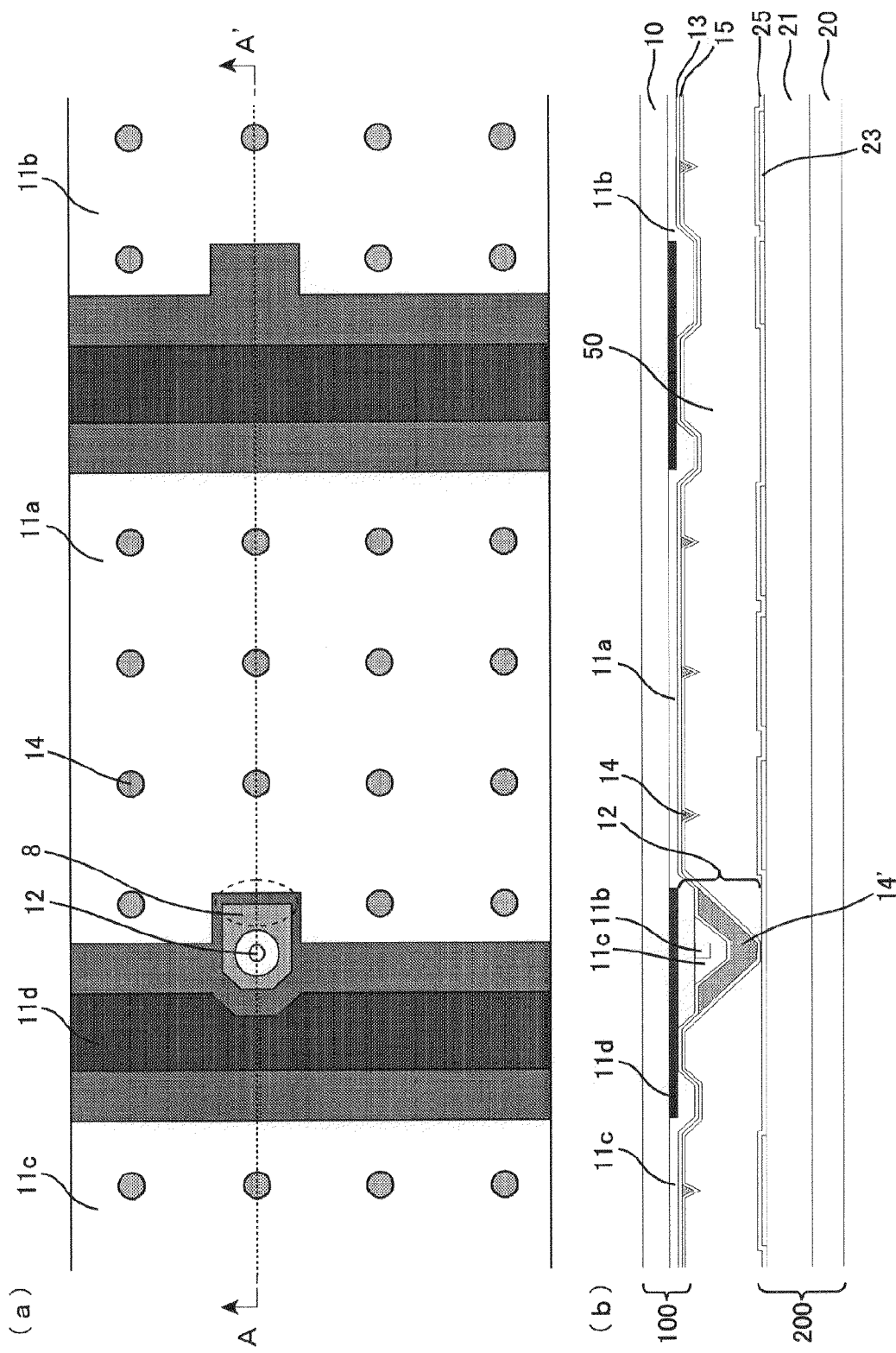
FIG. 34 (a) is a schematic plan view showing a constitution of a color filter substrate mounted on a liquid crystal display panel according to Example 34 of the present invention, and FIG. 34 (b) is a schematic section view showing the liquid crystal display panel taken along line A-A' in FIG. 34 (a).
Figure 35:
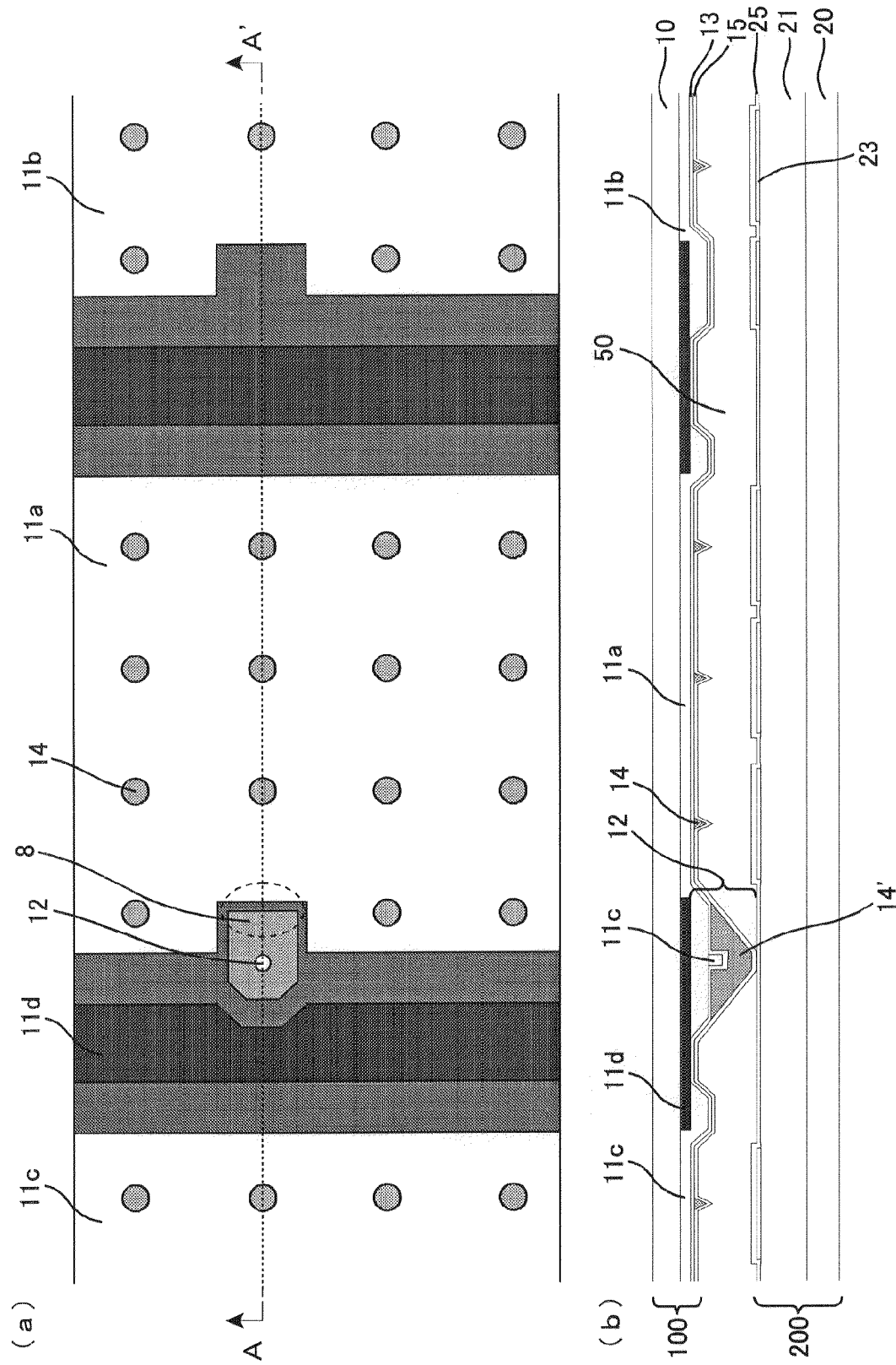
FIG. 35 (a) is a schematic plan view showing a constitution of a color filter substrate mounted on a liquid crystal display panel according to Example 35 of the present invention, and FIG. 35 (b) is a schematic section view showing the liquid crystal display panel taken along line A-A' in FIG. 35 (a).

FIGS. 18(*a*), 19 (*a*), and 20(*a*) are schematic plan views showing constitutions of color filter (CF) substrates mounted on liquid crystal display panels according to Examples 18 to 20 of the present invention, and FIGS. 18 (*b*), 19 (*b*), and 20 (*b*) are schematic section views showing the liquid crystal display panels taken along lines A-A' in FIGS. 18 to 20 (*a*)s.

The liquid crystal display panels according to Examples 18 to 29 respectively have the same configurations as those according to Examples 5 to 7, except that the planar specific structure 8 comprising a linear part or an angular part at a part of the protrusion material layers 14' and 14" in the stacked PS 12 is formed.

The same operation effects as those in Examples 5 to 8 can be provided also in the liquid crystal display panels of Examples 18 to 20.

Examples 21 to 35

FIGS. 21 to 35 (*a*)s are schematic plan views showing constitutions of color filter (CF) substrates mounted on liquid crystal display panels according to Examples 21 to 35 of the present invention, and FIGS. 21 to 35 (*b*)s are schematic section views respectively showing the liquid crystal display panels taken along lines A-A' in FIGS. 21 to 35 (*a*)s.

The liquid crystal display panels according to Examples 21 to 35 respectively have the same configurations as those of the liquid crystal display panels according to Examples 1 to 3, 5 to 7, 9 to 11, 13 to 15, and 18 to 20, except that a main part (a stacked part which serves as a spacer except for the specific structure 8) of the protrusion material layer 14' in a stacked PS 12 has a planar shape of octagon. In addition, the octagon is not preferable as the specific structure, since it is recognized as a substantially circular shape by an image recognition device.

The same operation effects as those in Examples 1 to 3, 5 to 7, 9 to 11, 13 to 15, and 18 to 20, respectively can be provided also in the liquid crystal display panels of Examples 21 to 35.

Examples 36 to 38

Figure 36:
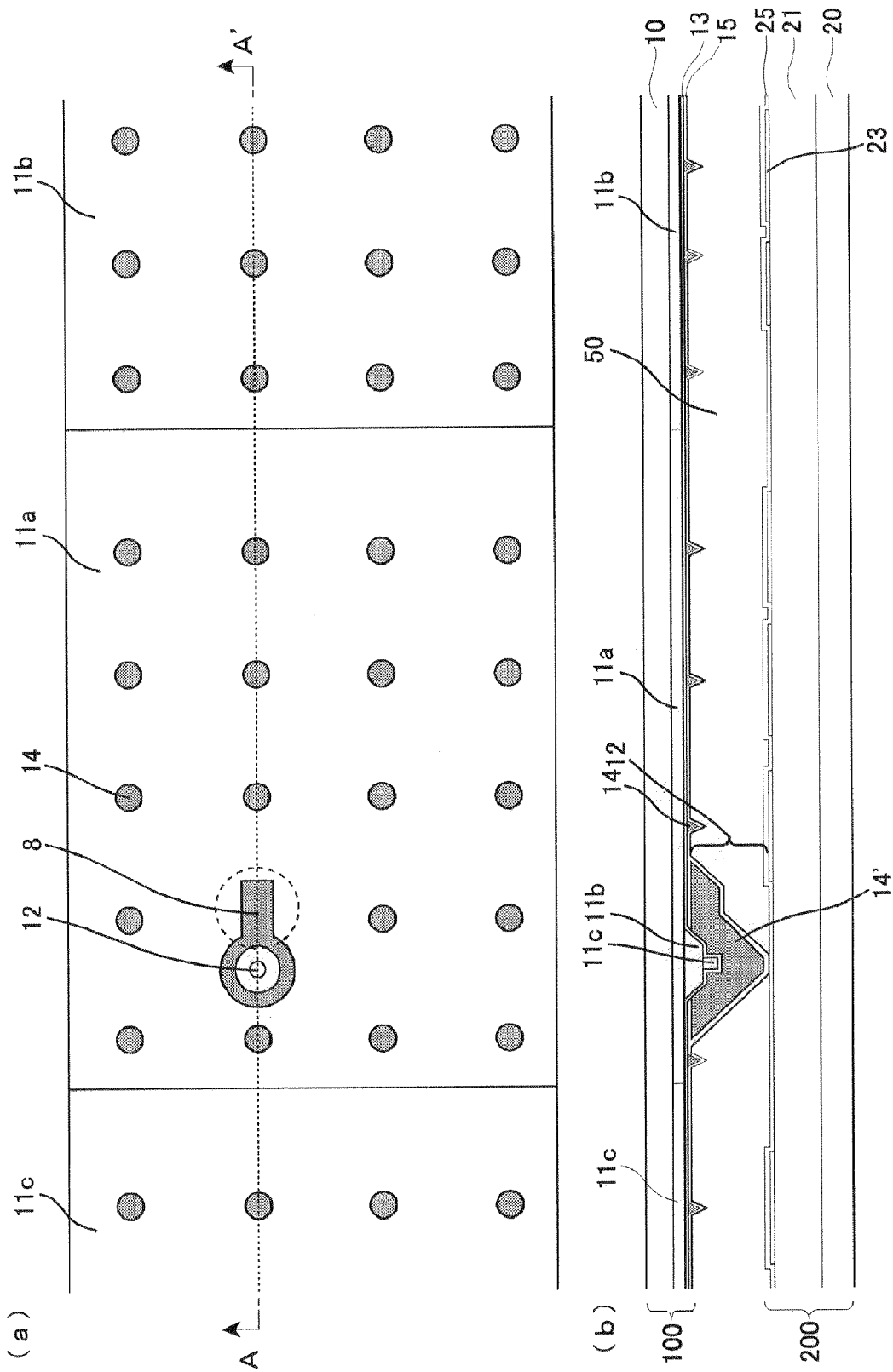
FIG. 36 (a) is a schematic plan view showing a constitution of a color filter substrate mounted on a liquid crystal display panel according to Example 36 of the present invention, and FIG. 36 (b) is a schematic section view showing the liquid crystal display panel taken along line A-A' in FIG. 36 (a).
Figure 37:
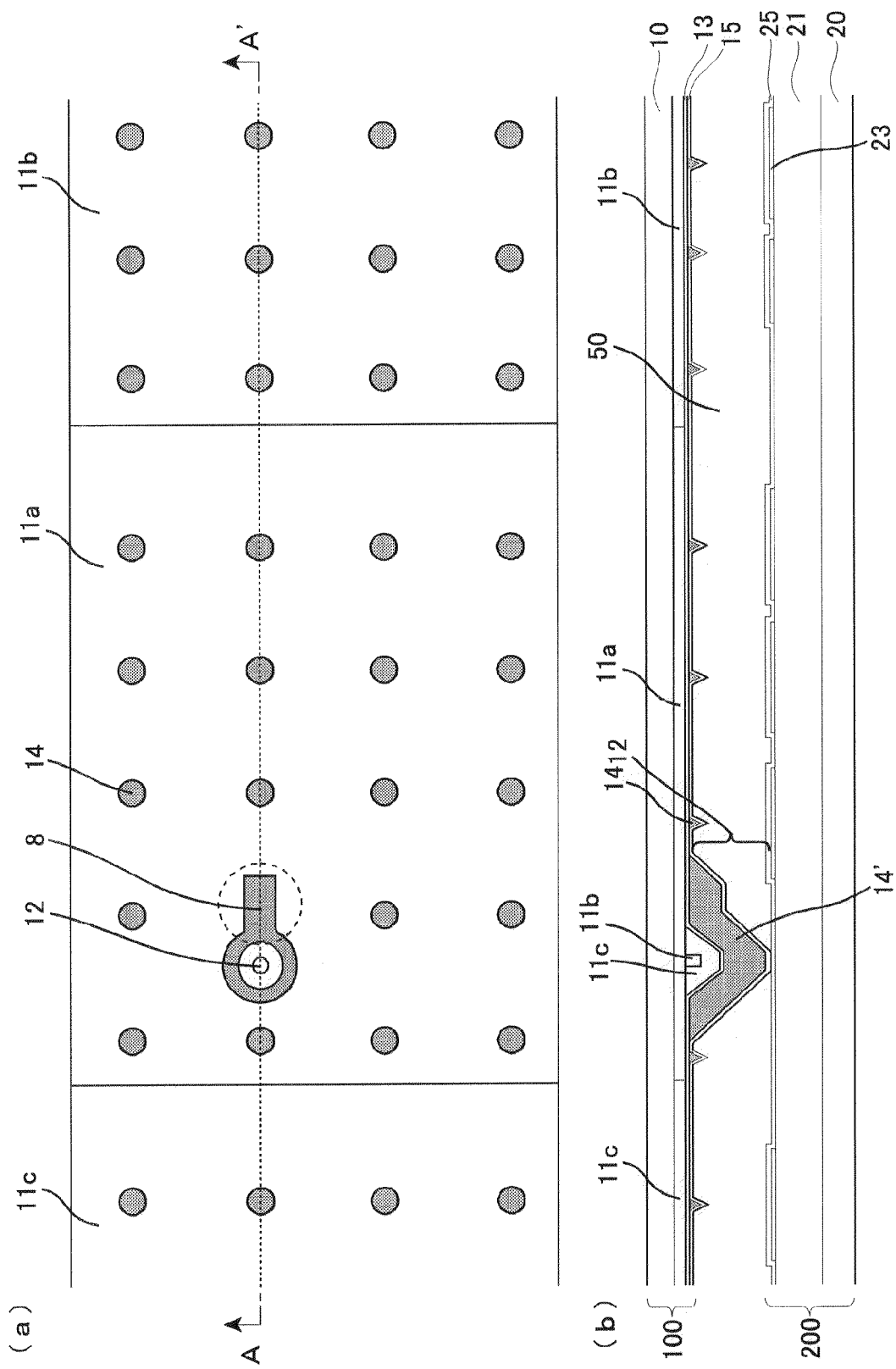
FIG. 37 (a) is a schematic plan view showing a constitution of a color filter substrate mounted on a liquid crystal display panel according to Example 37 of the present invention, and FIG. 37 (b) is a schematic section view showing the liquid crystal display panel taken along line A-A' in FIG. 37 (a).
Figure 38:
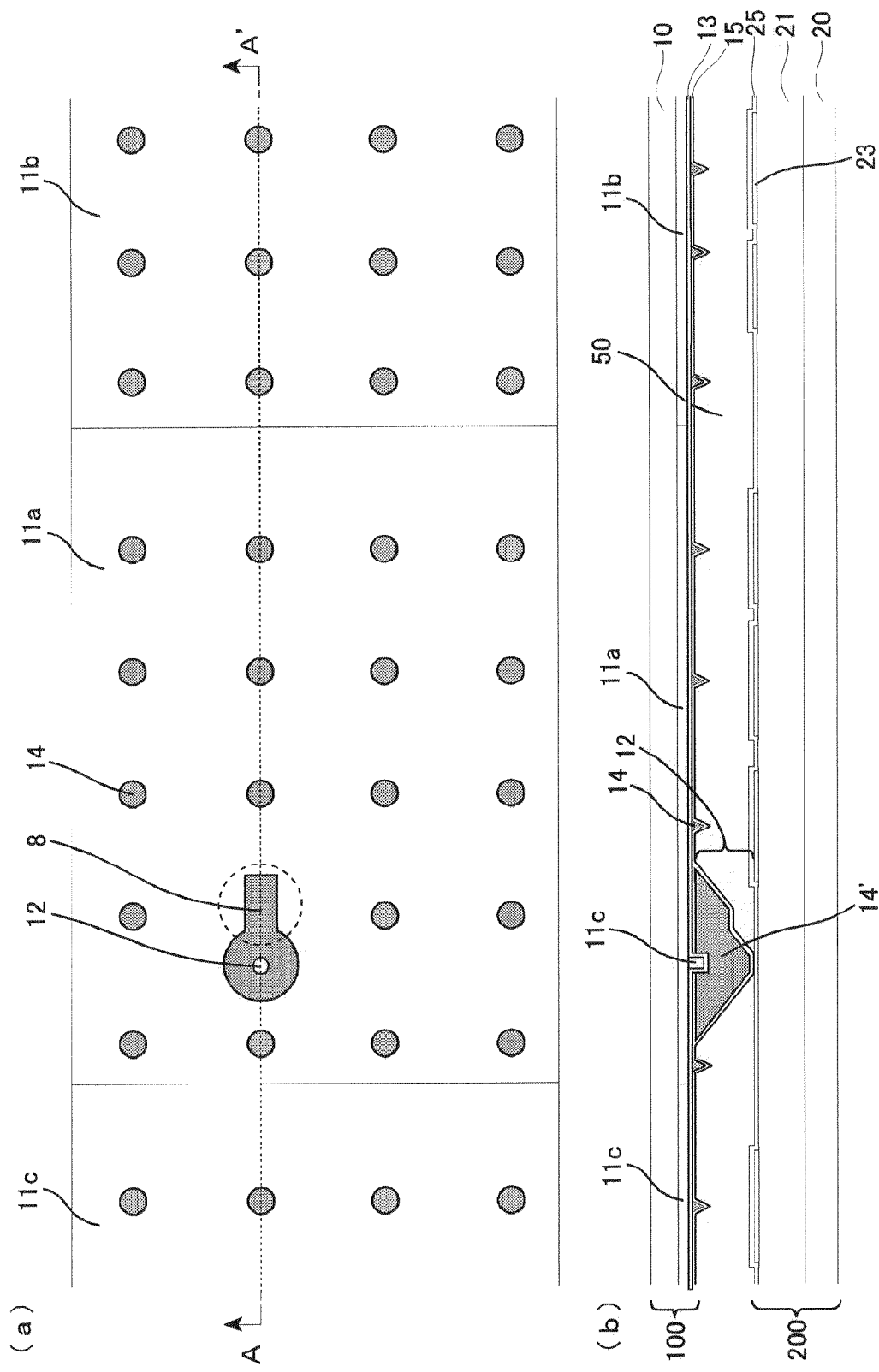
FIG. 38 (*a*) is a schematic plan view showing a constitution of a color filter substrate mounted on a liquid crystal display panel according to Example 38 of the present invention, and FIG. 38 (*b*) is a schematic section view showing the liquid crystal display panel taken along line A-A' in FIG. 38 (*a*).
Figure 46:
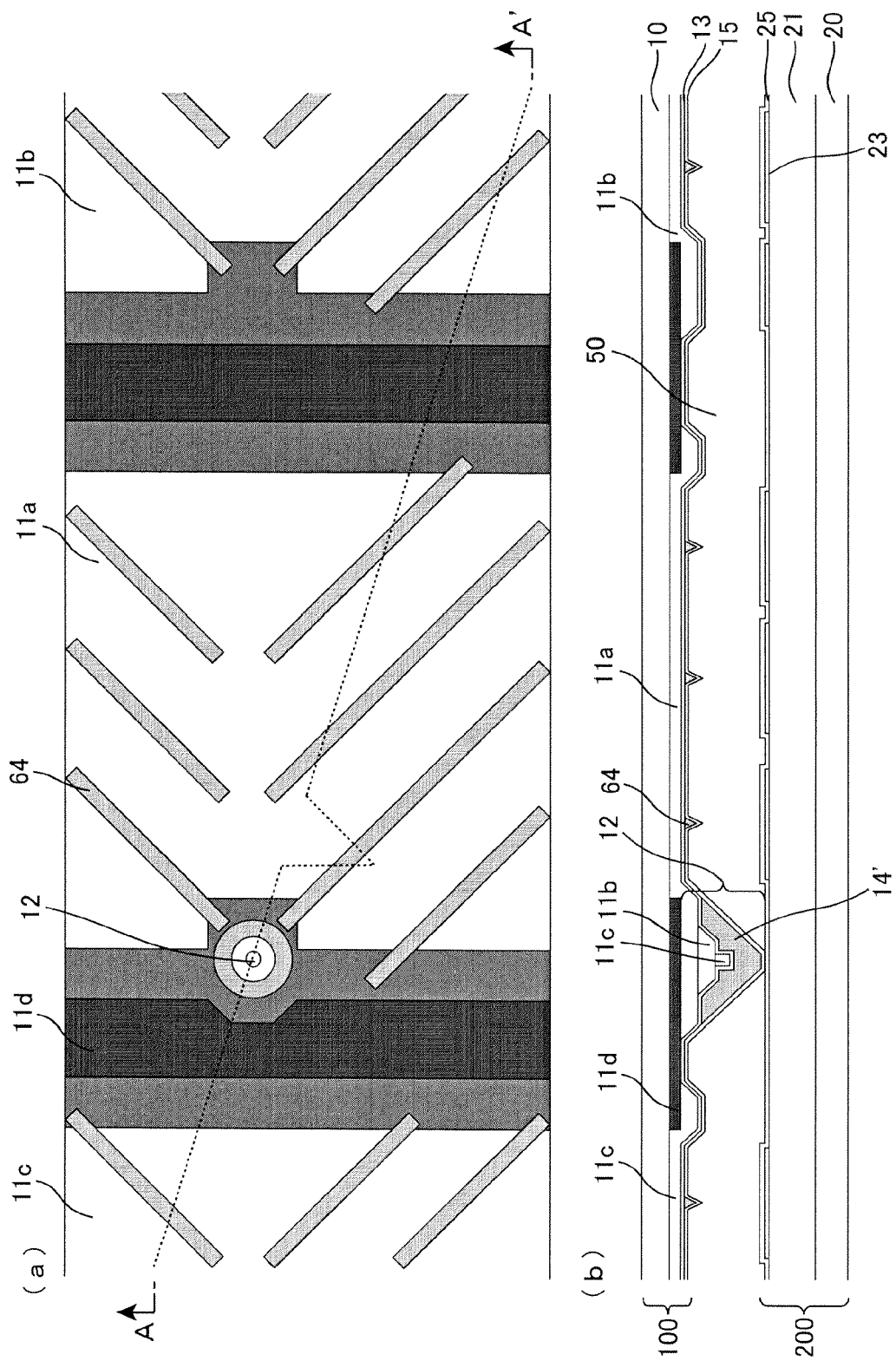
FIG. 46 (*a*) is a schematic plan view showing a constitution of a color filter substrate mounted on a liquid crystal display panel according to Example 46 of the present invention, and FIG. 46 (*b*) is a schematic section view showing the liquid crystal display panel taken along line A-A' in FIG. 46 (*a*).

FIGS. 36 (*a*), 37 (*a*), and 38 (*a*) are schematic plan views showing constitutions of color filter (CF) substrates mounted on liquid crystal display panels according to Examples 36 to 38 of the present invention, and FIGS. 46 (*b*), 47 (*b*), and 48(*b*) are schematic section views respectively showing the liquid crystal display panels taken along lines A-A' in FIGS. 36 to 38 (*a*)s.

The liquid crystal display panels according to Examples 36 to 38 respectively have the same configuration as those according to Examples 1 to 3, except that the BM layer 11*d* is not provided.

The same operation effects as those in Examples 1 to 3 can be provided also in the liquid crystal display panels of Examples 36 to 38.

Example 39

Figure 39:
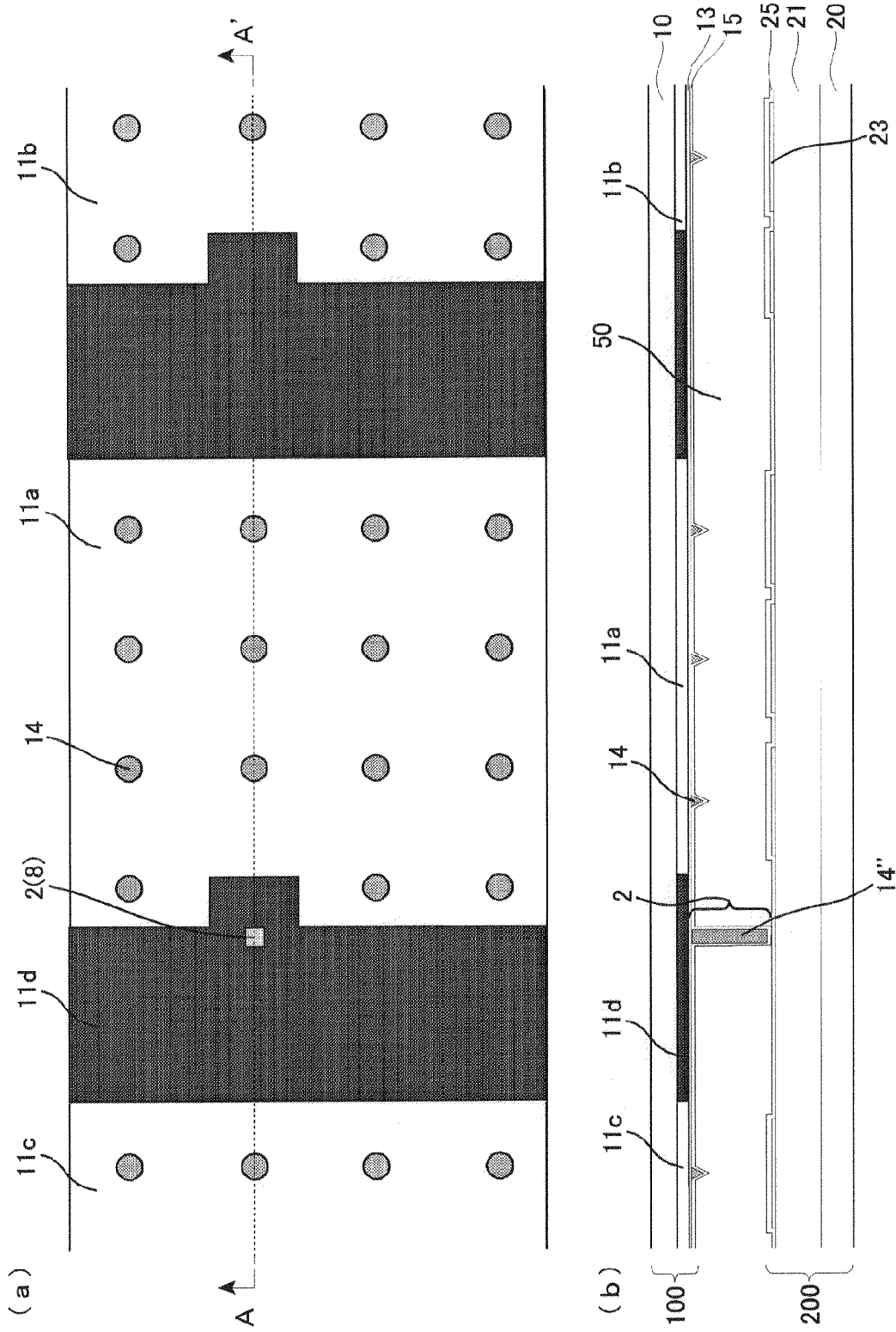
FIG. 39 (*a*) is a schematic plan view showing a constitution of a color filter substrate mounted on a liquid crystal display panel according to Example 39 of the present invention, and FIG. 39 (*b*) is a schematic section view showing the liquid crystal display panel taken along line A-A' in FIG. 39 (*a*).

FIG. 39 (*a*) is a schematic plan view showing a constitution of a color filter (CF) substrate mounted on a liquid crystal display panel according to Example 39 of the present invention, and FIG. 39 (*b*) is a schematic section view showing the liquid crystal display panel taken along a line A-A' in FIG. 39(*a*).

According to the liquid crystal display panel of Example 39, the single layer photo spacer 2 itself has a specific structure 8, since the single layer photo spacer 2 formed on the BM layer 11*d* has a planar shape of quadrangle.

The same operation effect as that in Example 1 can be provided also in the liquid crystal display panel of Example 39.

In addition, the single layer photo spacer 2 may have a configuration in which the BM layer 11*d* serving as a base layer and an outline of the single layer photo spacer 2 overlap with each other as viewed in plane. Furthermore, the planar shape of the single layer photo spacer 2 is not limited to the quadrangle and it may be any shape.

Example 40

Figure 40:
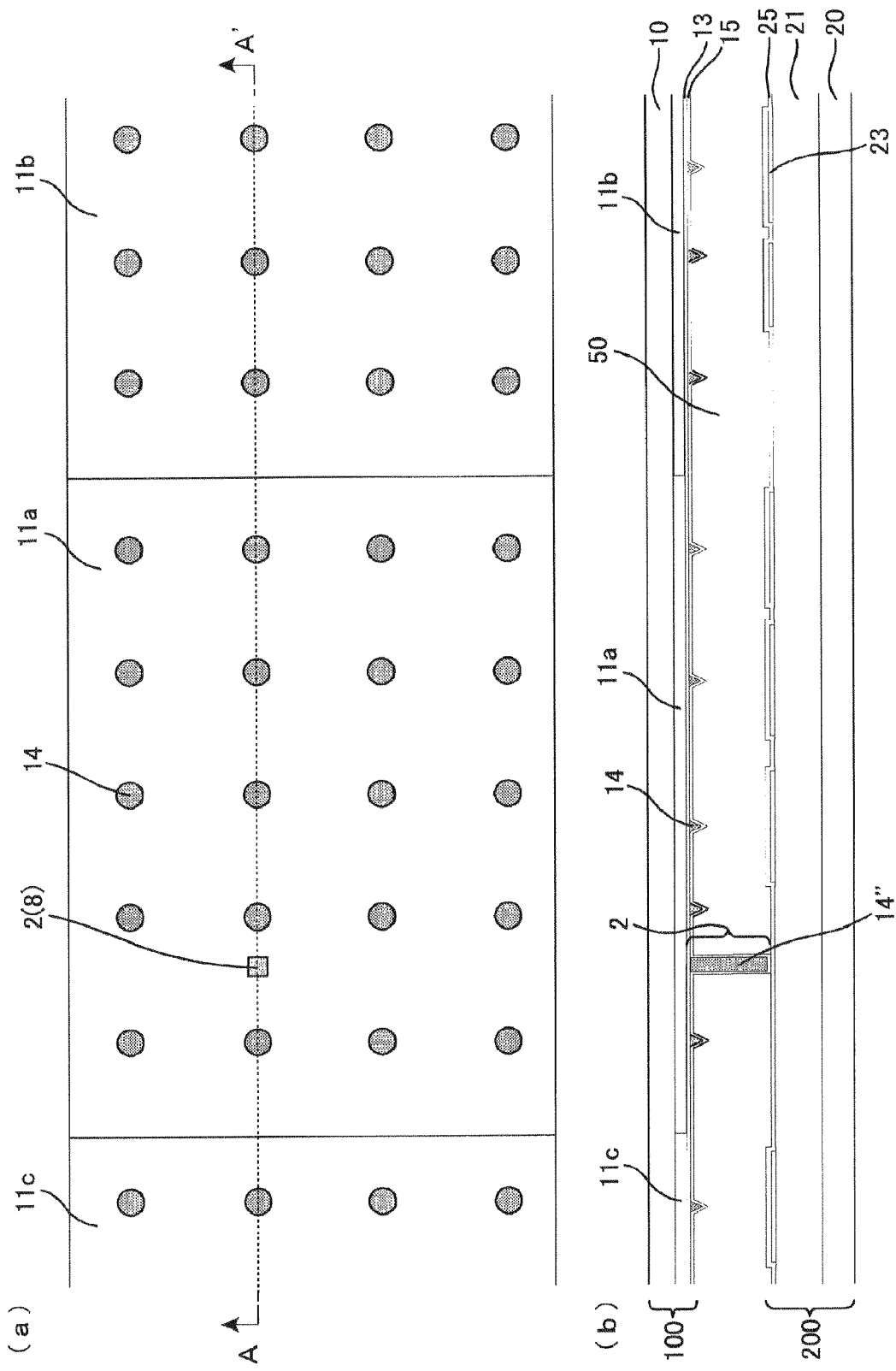
FIG. 40 (*a*) is a schematic plan view showing a constitution of a color filter substrate mounted on a liquid crystal display panel according to Example 40 of the present invention, and FIG. 40 (*b*) is a schematic section view showing the liquid crystal display panel taken along line A-A' in FIG. 40 (*a*).

FIG. 40 (*a*) is a schematic plan view showing a constitution of a color filter (CF) substrate mounted on a liquid crystal display panel according to Example 40 of the present invention, and FIG. 40 (*b*) is a schematic section view showing the liquid crystal display panel taken along a line A-A' in FIG. 40 (*a*).

The liquid crystal display panel according to Example 40 has the same constitution as that of the liquid crystal display panel according to Example 39 except that the single layer photo spacer 2 having the specific structure 8 is not formed on the BM layer 11*d*.

The same operation effect as that in Example 1 can be provided also in the liquid crystal display panel of Example 40.

Examples 41 and 42

Figure 41:
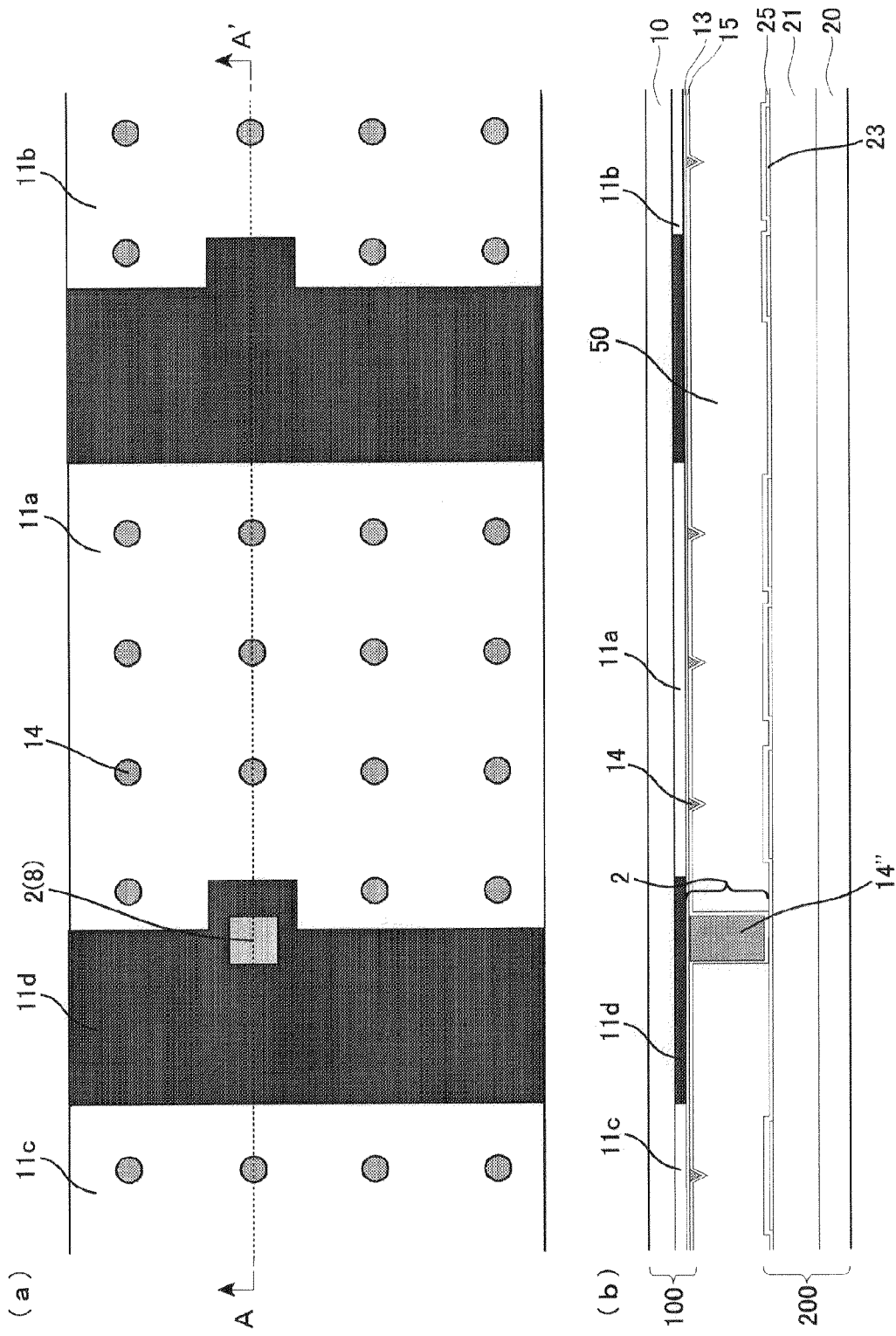
FIG. 41 (*a*) is a schematic plan view showing a constitution of a color filter substrate mounted on a liquid crystal display panel according to Example 41 of the present invention, and FIG. 41 (*b*) is a schematic section view showing the liquid crystal display panel taken along line A-A' in FIG. 41 (*a*).
Figure 42:
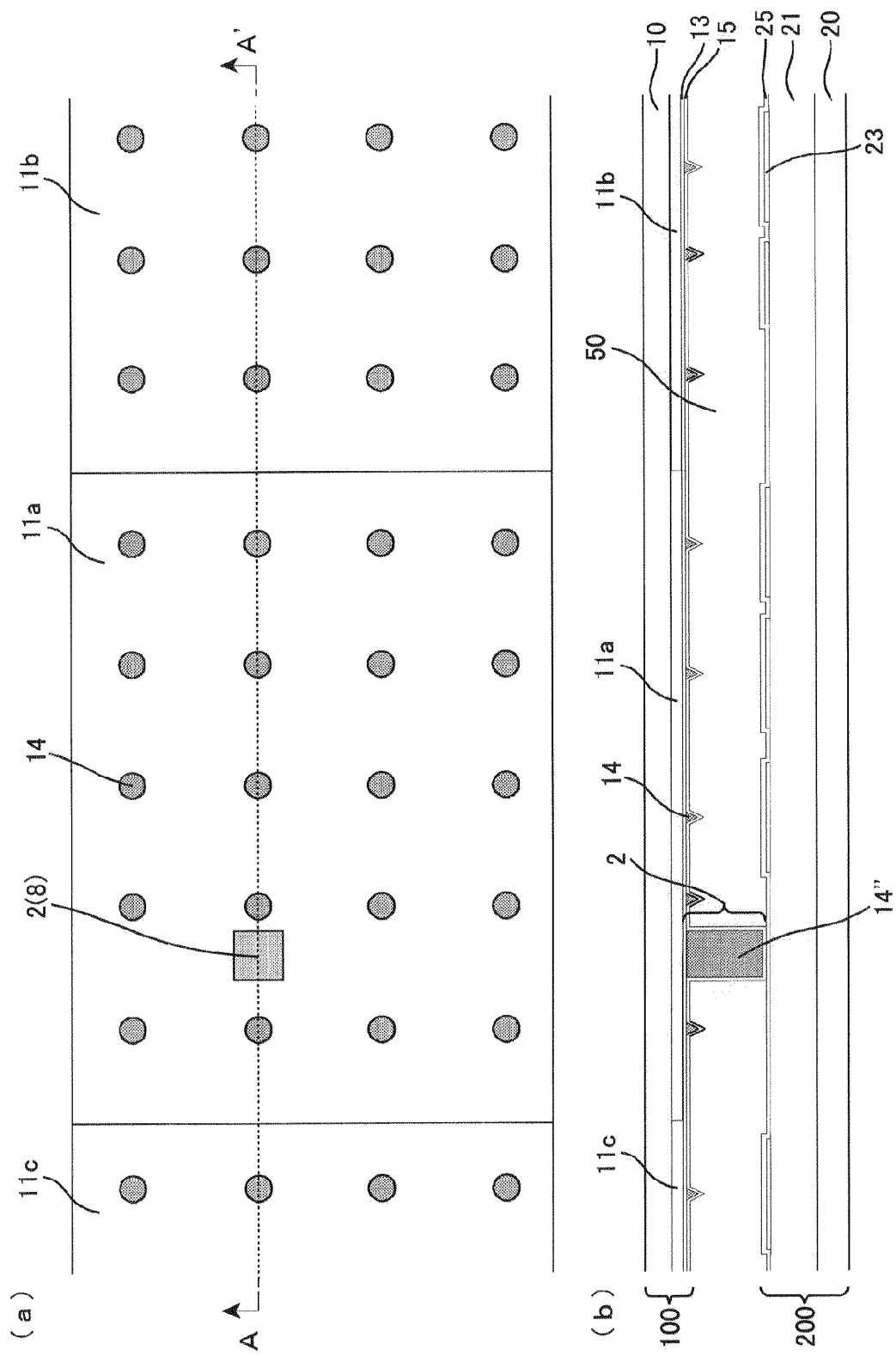
FIG. 42 (*a*) is a schematic plan view showing a constitution of a color filter substrate mounted on a liquid crystal display panel according to Example 42 of the present invention, and FIG. 42 (*b*) is a schematic section view showing the liquid crystal display panel taken along line A-A' in FIG. 42 (*a*).

FIGS. 41(*a*) and 42(*a*) are schematic plan views respectively showing constitutions of color filter (CF) substrates mounted on liquid crystal display panels according to Examples 41 and 42 of the present invention, and FIGS. 41(*b*) and 42(*b*) are schematic section views respectively showing the liquid crystal display panels taken along lines A-A' in FIGS. 41(*a*) and 42(*a*).

The liquid crystal display panel according to Examples 41 and 42 respectively have the same constitution as those of the liquid crystal display panels according to Examples 39 and 40, except that a planar area of the single layer photo spacer 2 is 1.5 times or more than that of the protrusion for controlling an alignment 14.

The same operation effect as that in Example 1 can be provided also in the liquid crystal display panels of Examples 41 and 42.

Examples 43 to 45

Figure 43:
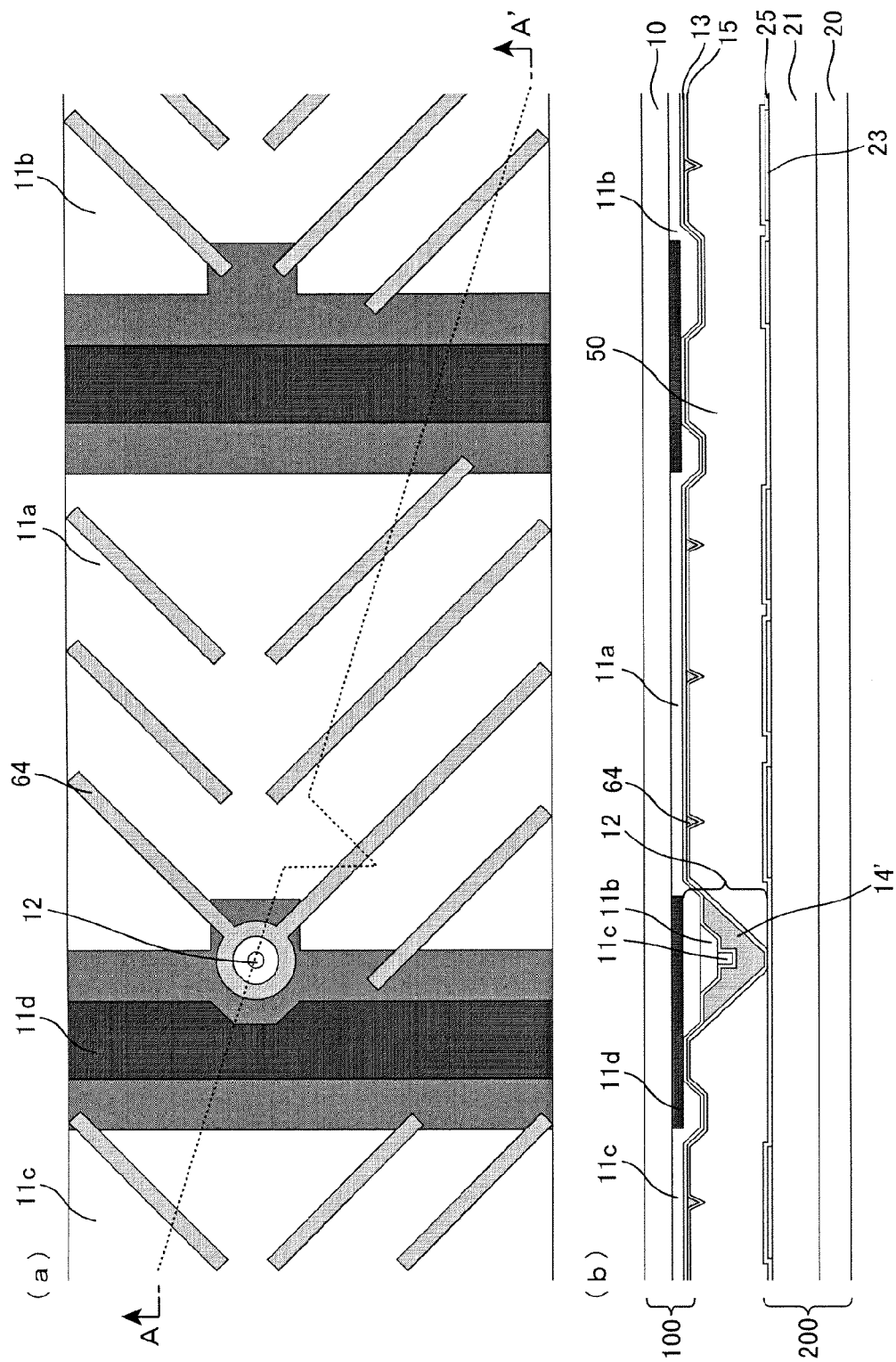
FIG. 43 (*a*) is a schematic plan view showing a constitution of a color filter substrate mounted on a liquid crystal display panel according to Example 43 of the present invention, and FIG. 43 (*b*) is a schematic section view showing the liquid crystal display panel taken along line A-A' in FIG. 43 (*a*).
Figure 44:
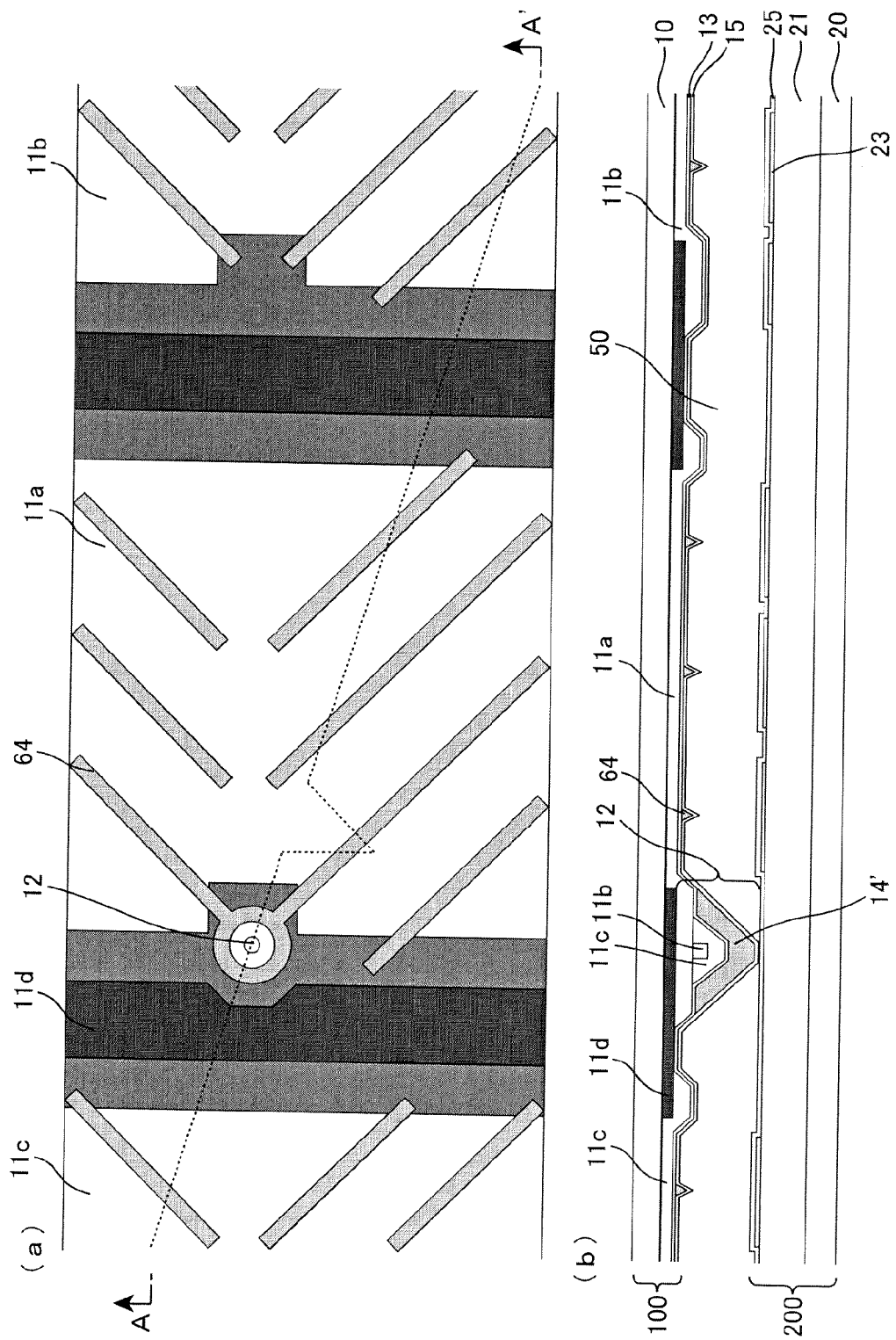
FIG. 44 (*a*) is a schematic plan view showing a constitution of a color filter substrate mounted on a liquid crystal display panel according to Example 44 of the present invention, and FIG. 44 (*b*) is a schematic section view showing the liquid crystal display panel taken along line A-A' in FIG. 44 (*a*).
Figure 45:
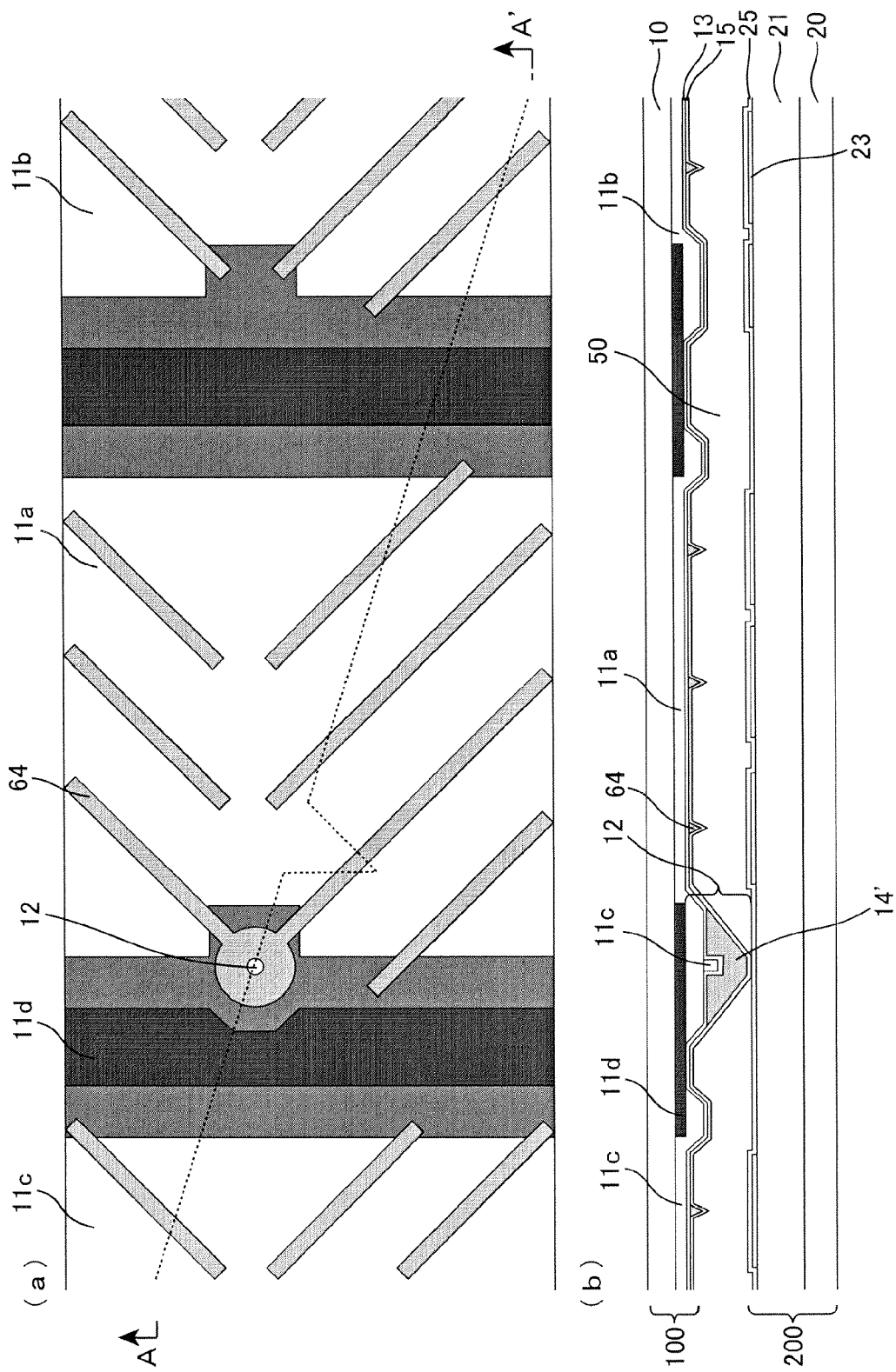
FIG. 45(*a*) is a schematic plan view showing a constitution of a color filter substrate mounted on a liquid crystal display panel according to Example 45 of the present invention, and FIG. 45 (*b*) is a schematic section view showing the liquid crystal display panel taken along line A-A' in FIG. 45 (*a*).

FIGS. 43 (*a*), 44 (*a*), and 45 (*a*) are schematic plan views showing constitutions of color filter (CF) substrates mounted on liquid crystal display panels according to Examples 43 to 45 of the present invention, and FIGS. 43 (*b*), 44 (*b*), and 45 (*b*) are schematic section views respectively showing the liquid crystal display panels taken along lines A-A' in FIGS. 43 to 45 (*a*)s.

The liquid crystal display panels according to Examples 43 to 45 respectively have the same constitutions as those of the liquid crystal display panels according to Examples 1 to 3, except that a protrusion for controlling an alignment 64 has a rib (linear) shape, and the circular protrusion material layer 14', which is the uppermost layer of the stacked PS 12, and the protrusion for controlling an alignment 64 are integrally formed.

According to the liquid crystal display panels in Examples 43 to 45, a height of the stacked PS 12 can be automatically measured with a height measuring device, since an intersecting part of an outline of the protrusion for controlling an alignment 64 and an outline of the BM layer 11*d* can be recognized by an image recognition device as a positioning pattern.

Examples 46 to 48

Figure 47:
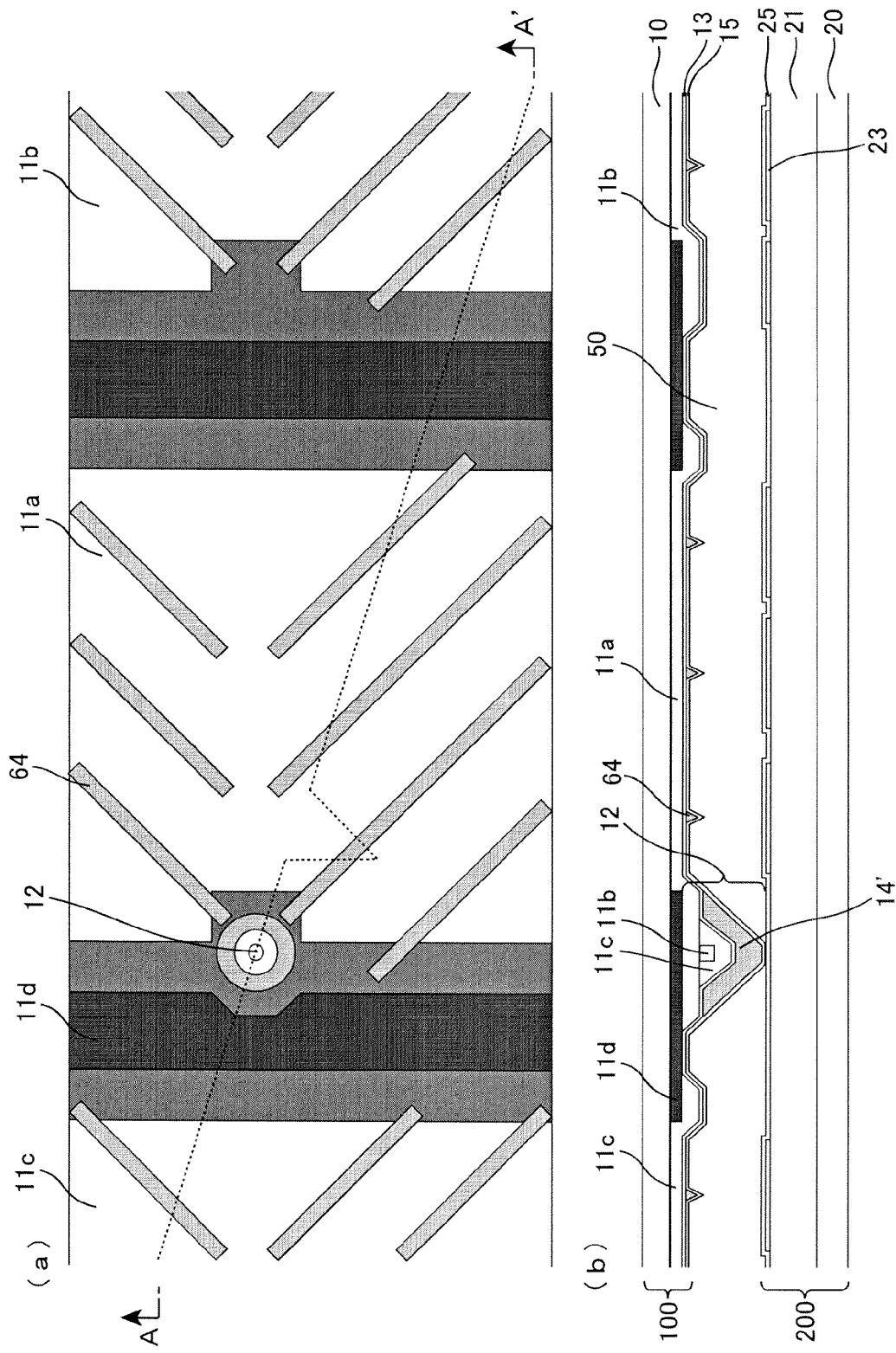
FIG. 47 (*a*) is a schematic plan view showing a constitution of a color filter substrate mounted on a liquid crystal display panel according to Example 47 of the present invention, and FIG. 47 (*b*) is a schematic section view showing the liquid crystal display panel taken along line A-A' in FIG. 47 (*a*).
Figure 48:
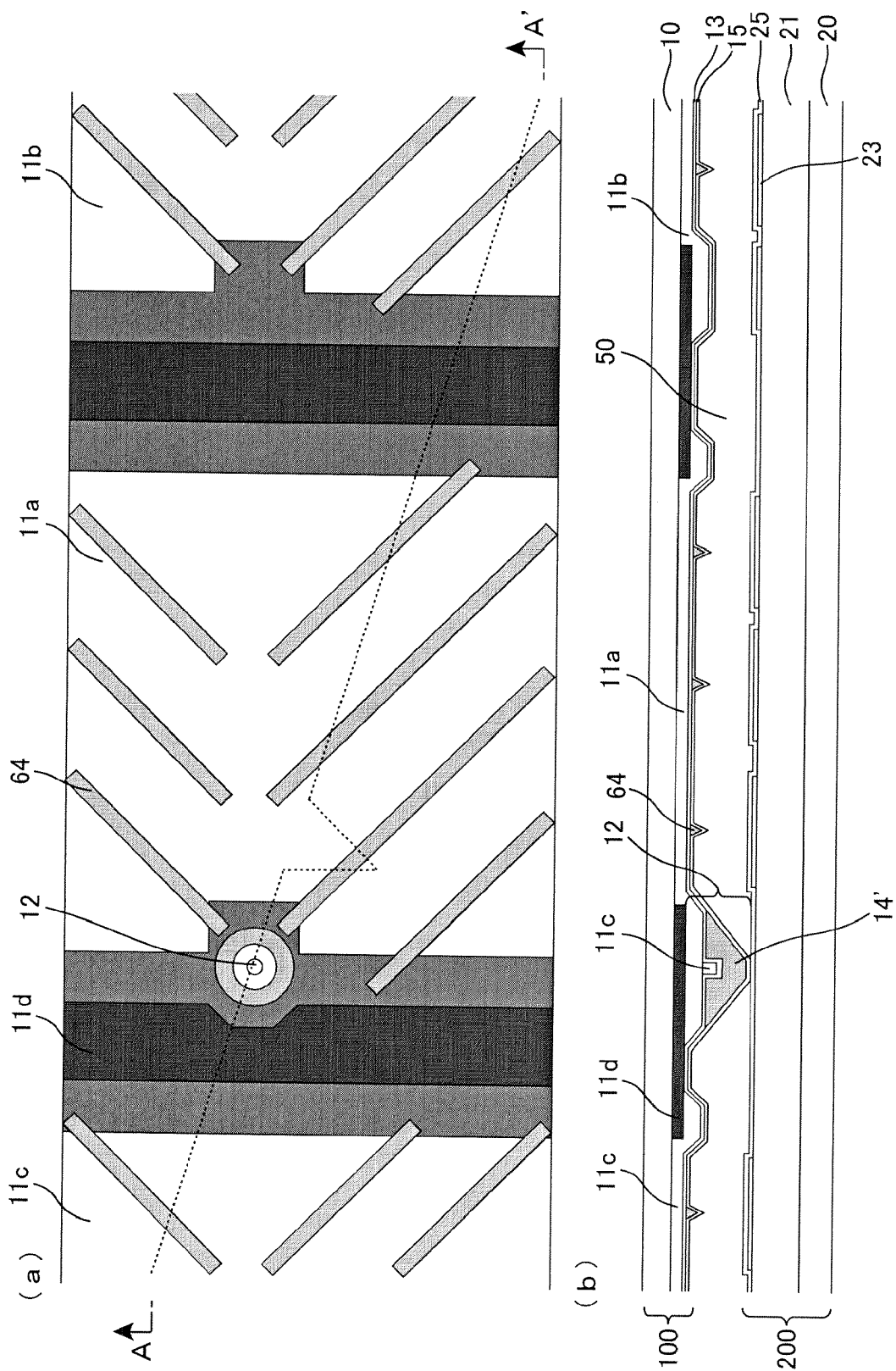
FIG. 48 (*a*) is a schematic plan view showing a constitution of a color filter substrate mounted on a liquid crystal display panel according to Example 48 of the present invention, and FIG. 48 (*b*) is a schematic section view showing the liquid crystal display panel taken along line A-A' in FIG. 48 (*a*).
Figure 49:
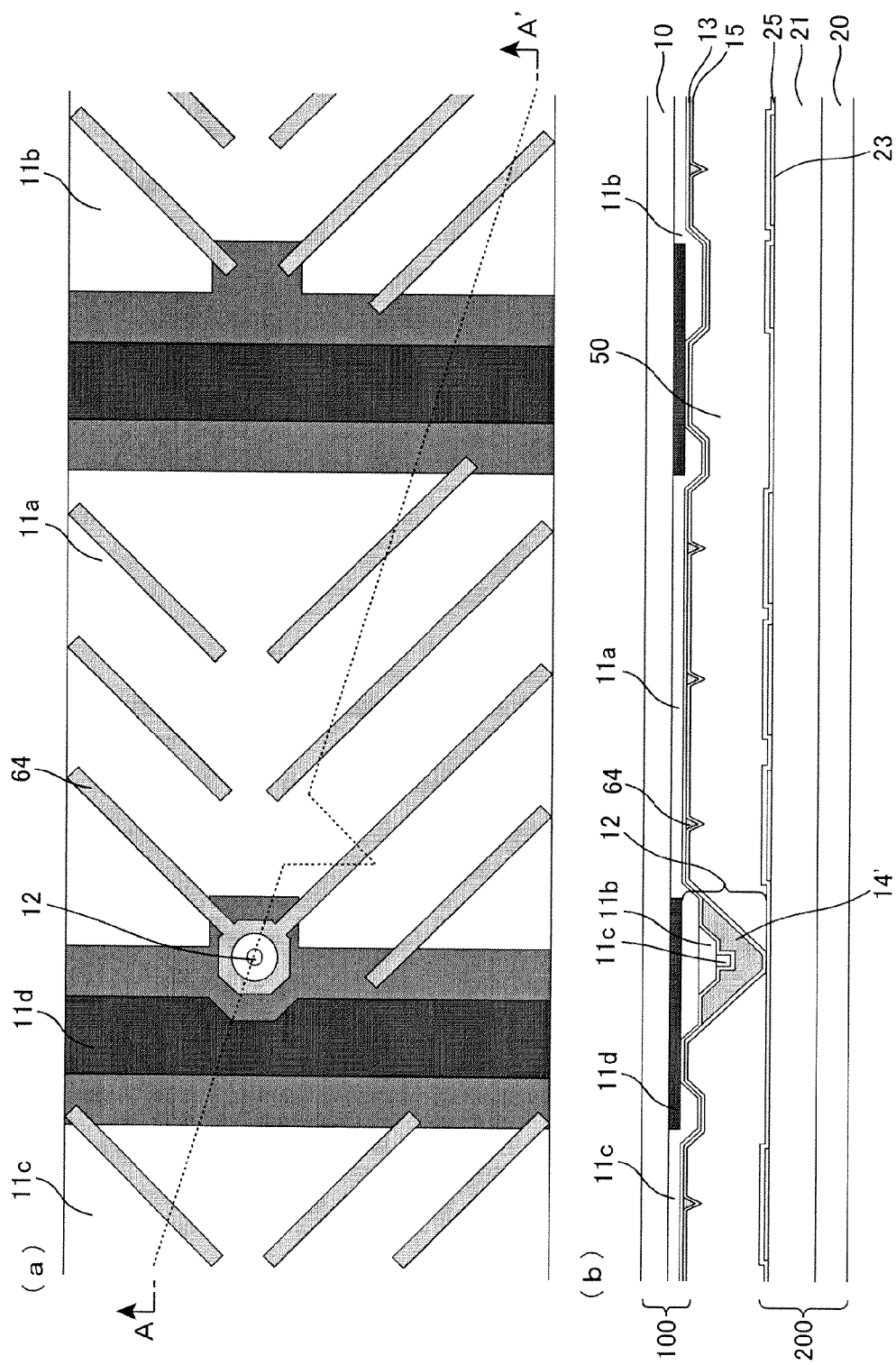
FIG. 49 (*a*) is a schematic plan view showing a constitution of a color filter substrate mounted on a liquid crystal display panel according to Example 49 of the present invention, and FIG. 49 (*b*) is a schematic section view showing the liquid crystal display panel taken along line A-A' in FIG. 49 (*a*).
Figure 50:
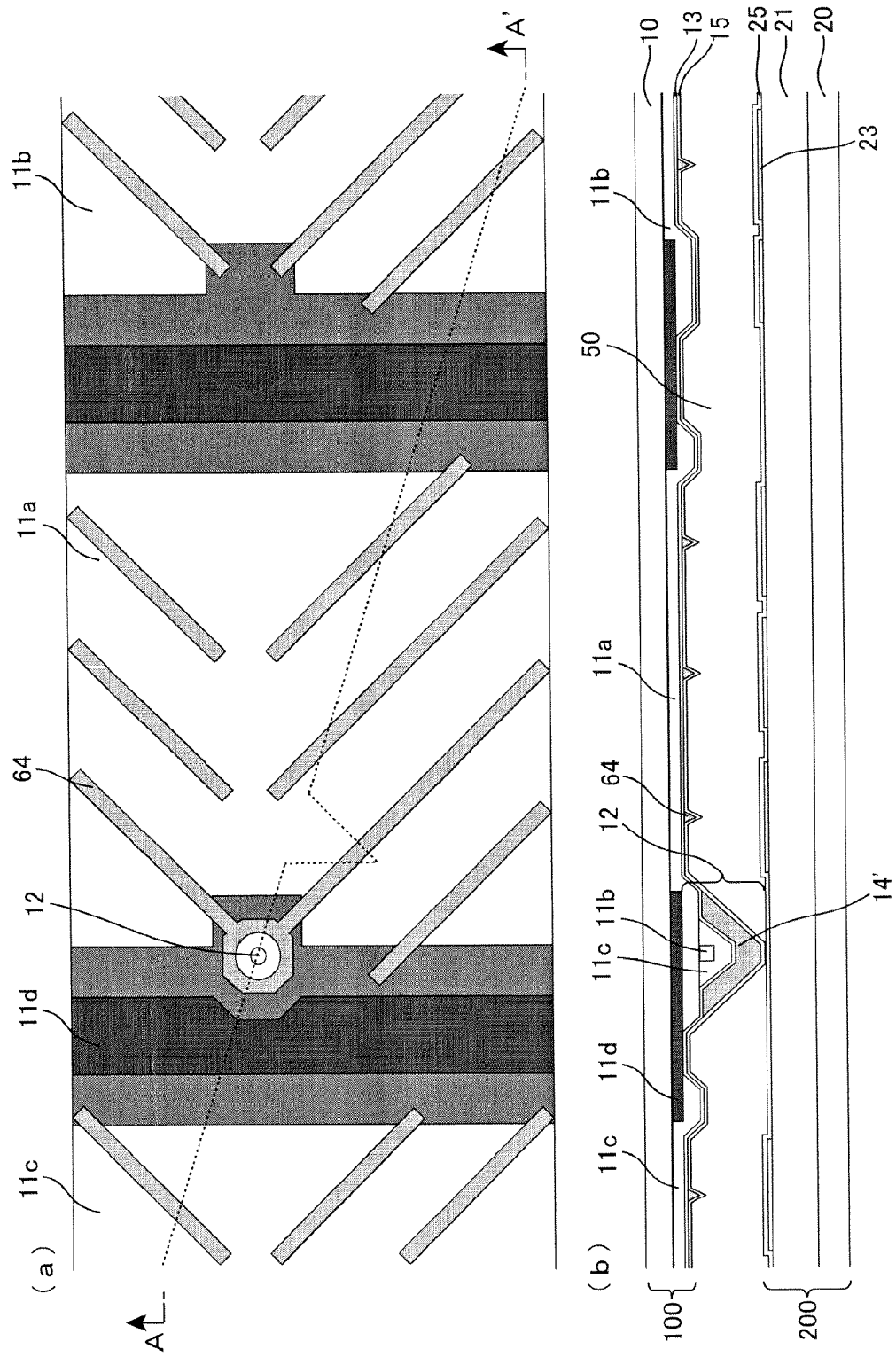
FIG. 50 (*a*) is a schematic plan view showing a constitution of a color filter substrate mounted on a liquid crystal display panel according to Example 50 of the present invention, and FIG. 50 (*b*) is a schematic section view showing the liquid crystal display panel taken along line A-A' in FIG. 50 (*a*).
Figure 51:
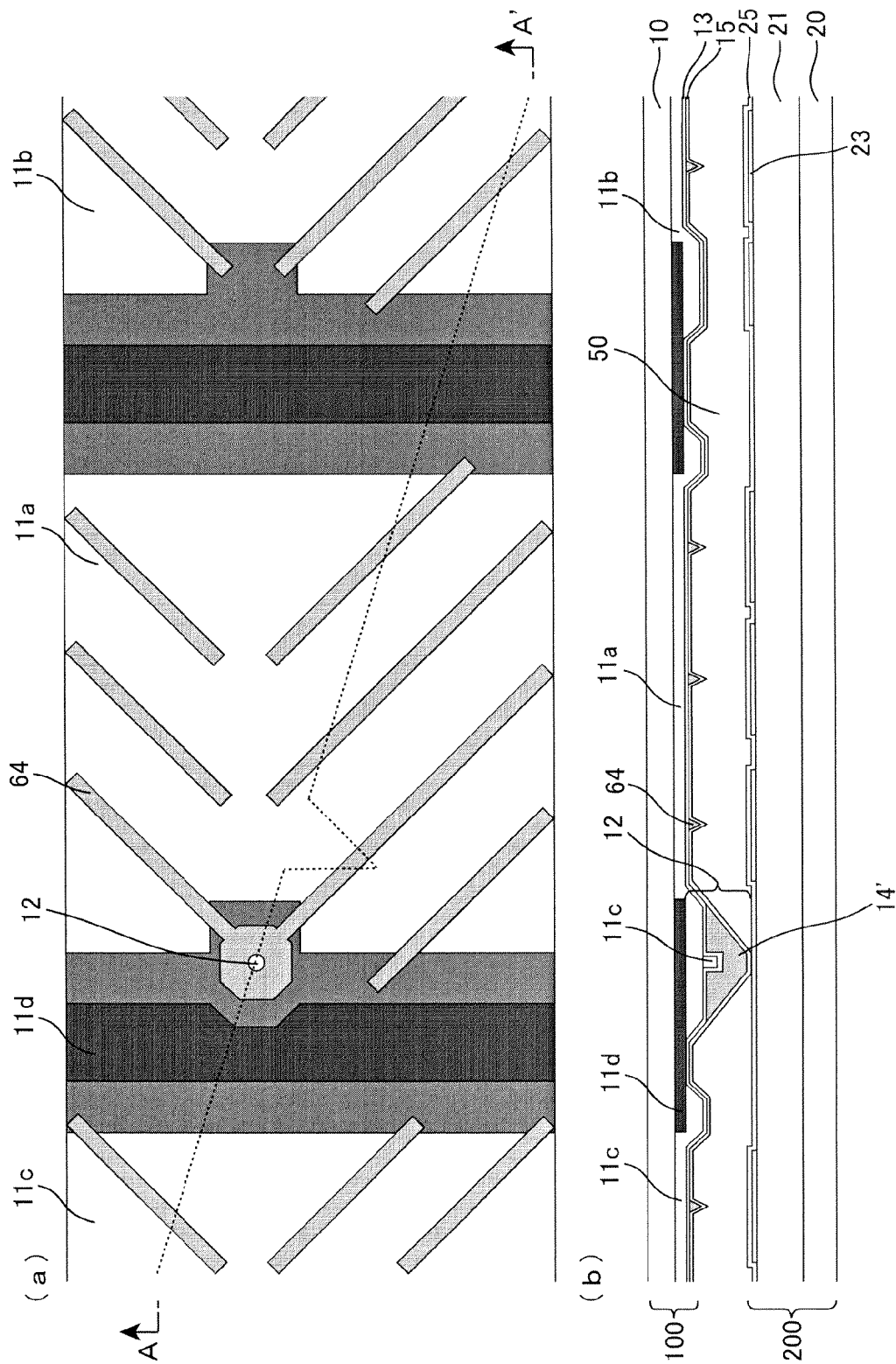
FIG. 51 (*a*) is a schematic plan view showing a constitution of a color filter substrate mounted on a liquid crystal display panel according to Example 51 of the present invention, and FIG. 51 (*b*) is a schematic section view showing the liquid crystal display panel taken along line A-A' in FIG. 51 (*a*).
Figure 52:
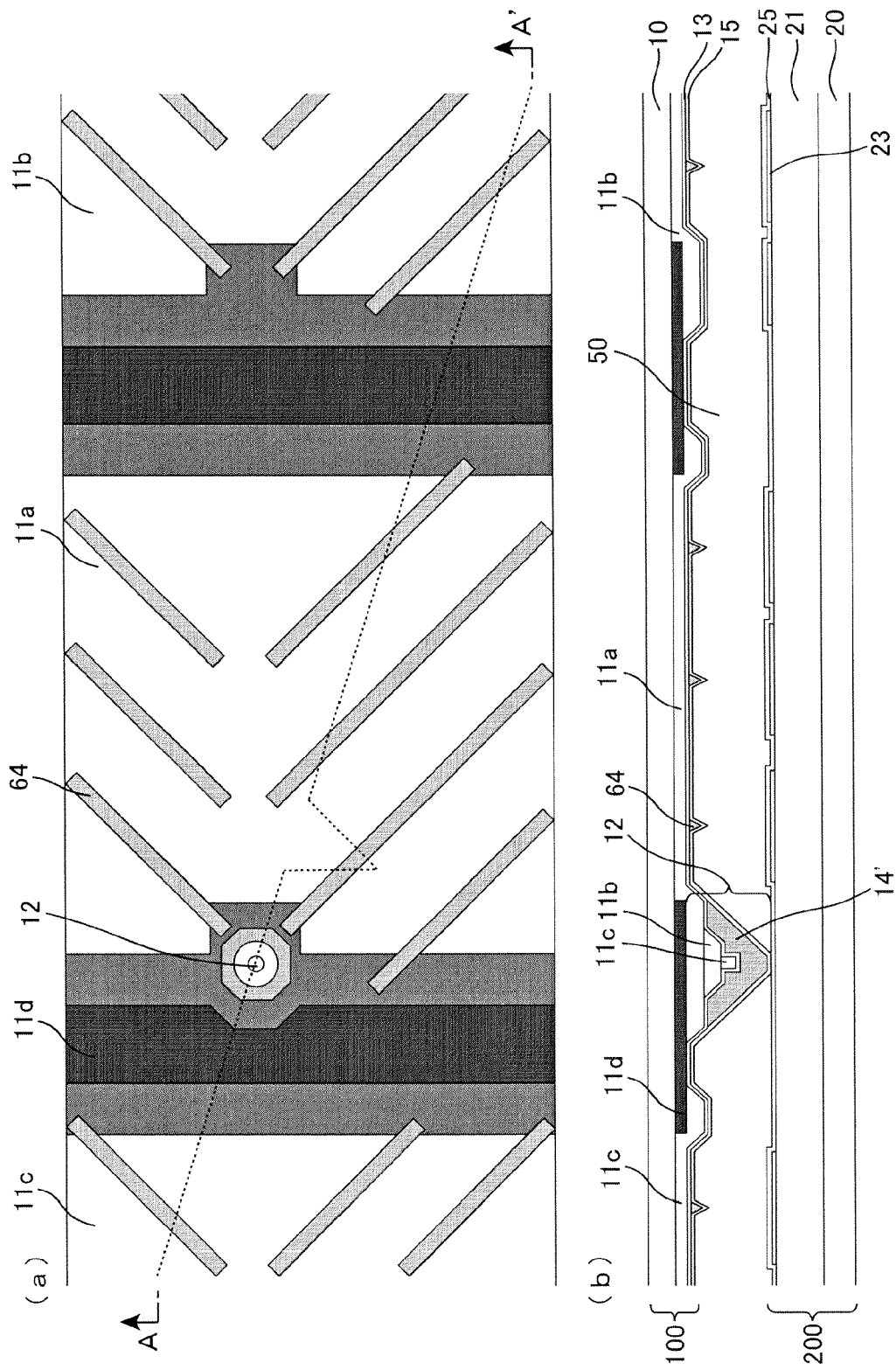
FIG. 52 (*a*) is a schematic plan view showing a constitution of a color filter substrate mounted on a liquid crystal display panel according to Example 52 of the present invention, and FIG. 52 (*b*) is a schematic section view showing the liquid crystal display panel taken along line A-A' in FIG. 52 (*a*).
Figure 53:
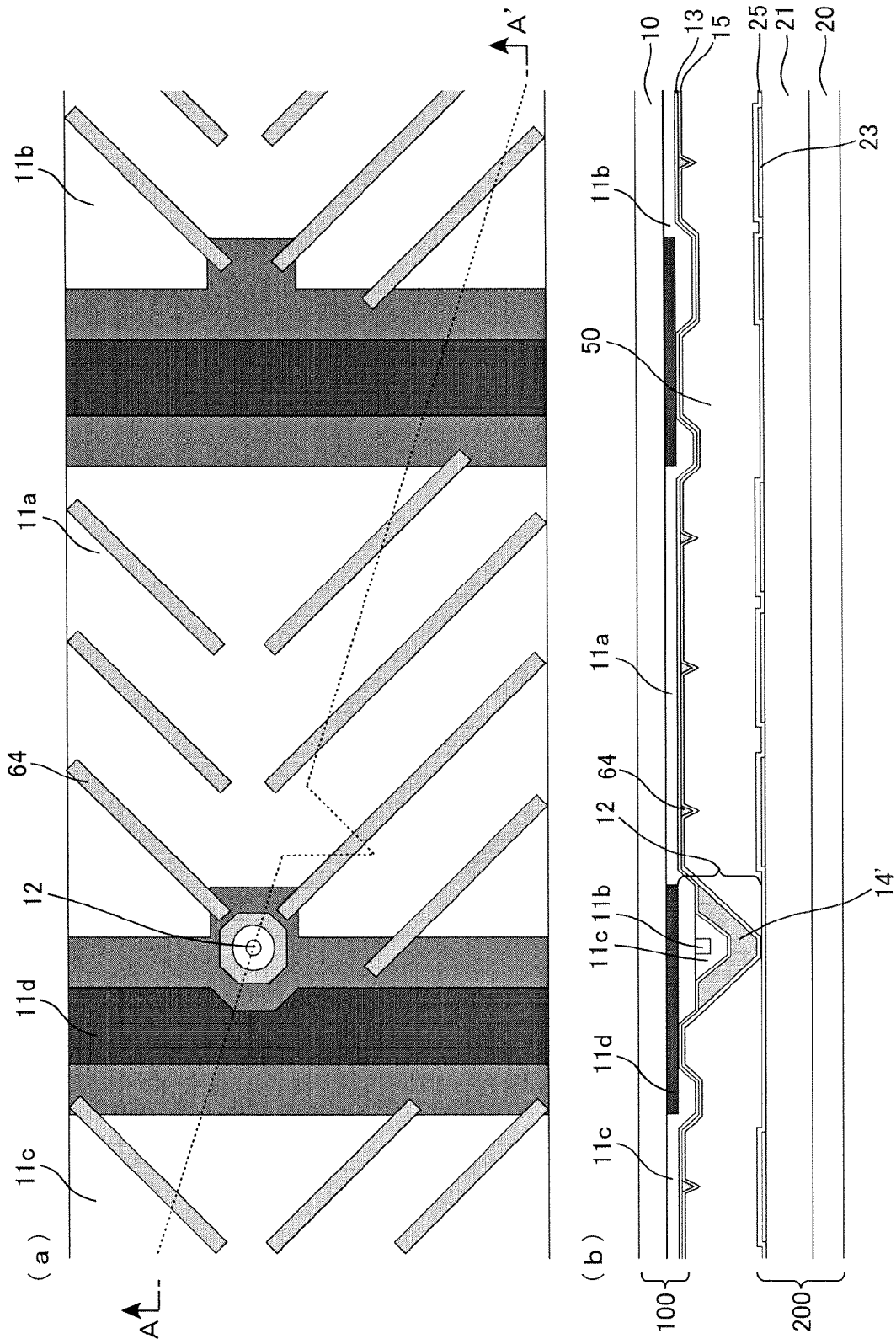
FIG. 53 (*a*) is a schematic plan view showing a constitution of a color filter substrate mounted on a liquid crystal display panel according to Example 53 of the present invention, and FIG. 53 (*b*) is a schematic section view showing the liquid crystal display panel taken along line A-A' in FIG. 53 (*a*).
Figure 54:
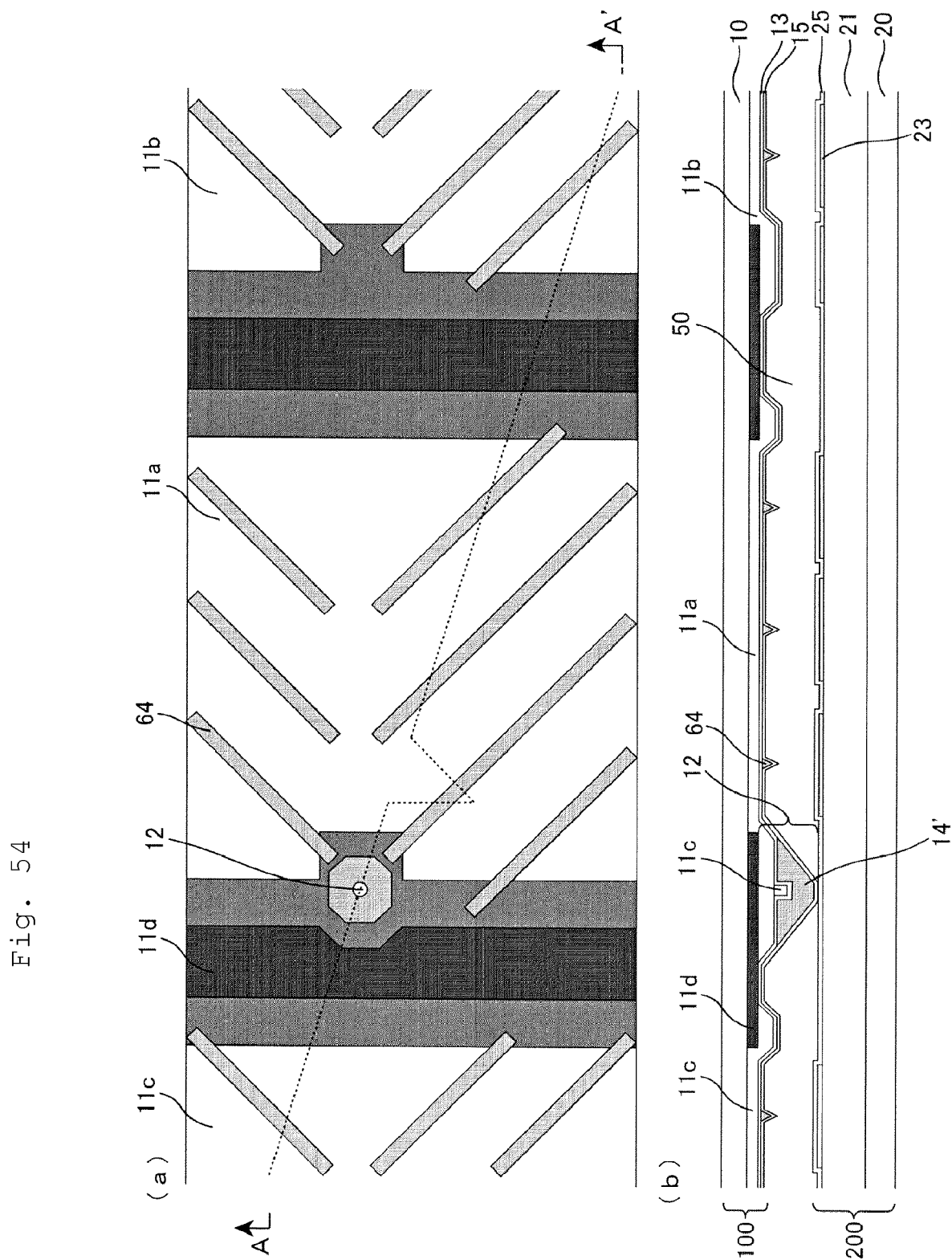
FIG. 54 (*a*) is a schematic plan view showing a constitution of a color filter substrate mounted on a liquid crystal display panel according to Example 54 of the present invention, and FIG. 54 (*b*) is a schematic section view showing the liquid crystal display panel taken along line A-A' in FIG. 54 (*a*).

FIGS. 46(*a*), 47 (*a*), and 48(*a*) are schematic plan views showing constitutions of color filter (CF) substrates mounted on liquid crystal display panels according to Examples 46 to 48 of the present invention, and FIGS. 46(*b*), 47 (*b*), and 48(*b*) are schematic section views respectively showing the liquid crystal display panels taken along lines A-A' in FIGS. 46 to 48 (*a*)s.

The liquid crystal display panels according to Examples 46 to 48 respectively have the same constitutions as those of the liquid crystal display panels according to Examples 43 to 45, except that the circular protrusion material layer 14', which is the uppermost layer of the stacked PS 12, is not connected to the rib-shaped protrusion for controlling an alignment 64.

Thus, according to the liquid crystal display panels in Examples 46 to 48, a height of the stacked PS 12 can be automatically measured with a height measuring device, since an intersecting part of an outline of the protrusion for controlling an alignment 64 and an outline of the BM layer 11*d*, which is recognized as a specific pattern by an image recognition device, exists.

Examples 49 to 54

FIGS. 49 to 54 (*a*)s are schematic plan views showing constitutions of color filter (CF) substrates mounted on liquid crystal display panels according to Examples 49 to 54 of the present invention, and FIGS. 49 to 54 (*b*)s are schematic section views respectively showing the liquid crystal display panels taken along lines A-A' in FIGS. 49 to 54 (*a*)s.

The liquid crystal display panels according to Examples 49 to 54 respectively have the same constitutions as those of the liquid crystal display panels according to Examples 43 to 48, except that the protrusion material layer 14', which is the uppermost layer of the stacked PS 12, has a planar shape of octagon.

Thus, according to the liquid crystal display panels in Examples 49 to 54, a height of the stacked PS 12 can be automatically measured with a height measuring device since an intersecting part of an outline of the protrusion for controlling an alignment 64 and an outline of the BM layer 11*d*, which is recognized as a specific pattern by an image recognition device, exists. In addition, the planar shape (octagon) of the protrusion material layer 14' is not preferable as a specific pattern since it is recognized as a substantially circular shape by an image recognition device.

Examples 55 to 57

Figure 55:
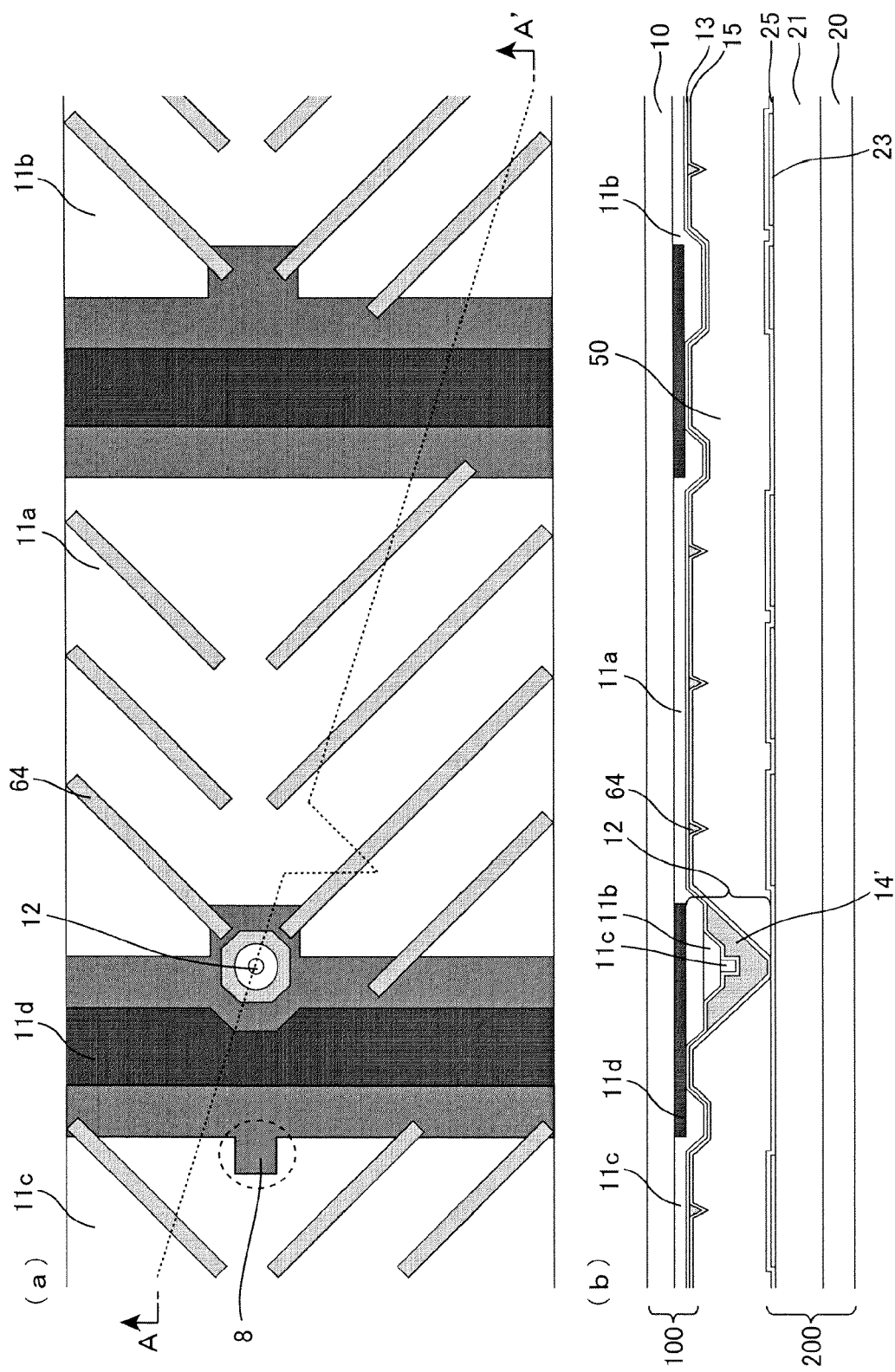
FIG. 55 (*a*) is a schematic plan view showing a constitution of a color filter substrate mounted on a liquid crystal display panel according to Example 55 of the present invention, and FIG. 55 (*b*) is a schematic section view showing the liquid crystal display panel taken along line A-A' in FIG. 55 (*a*).
Figure 56:
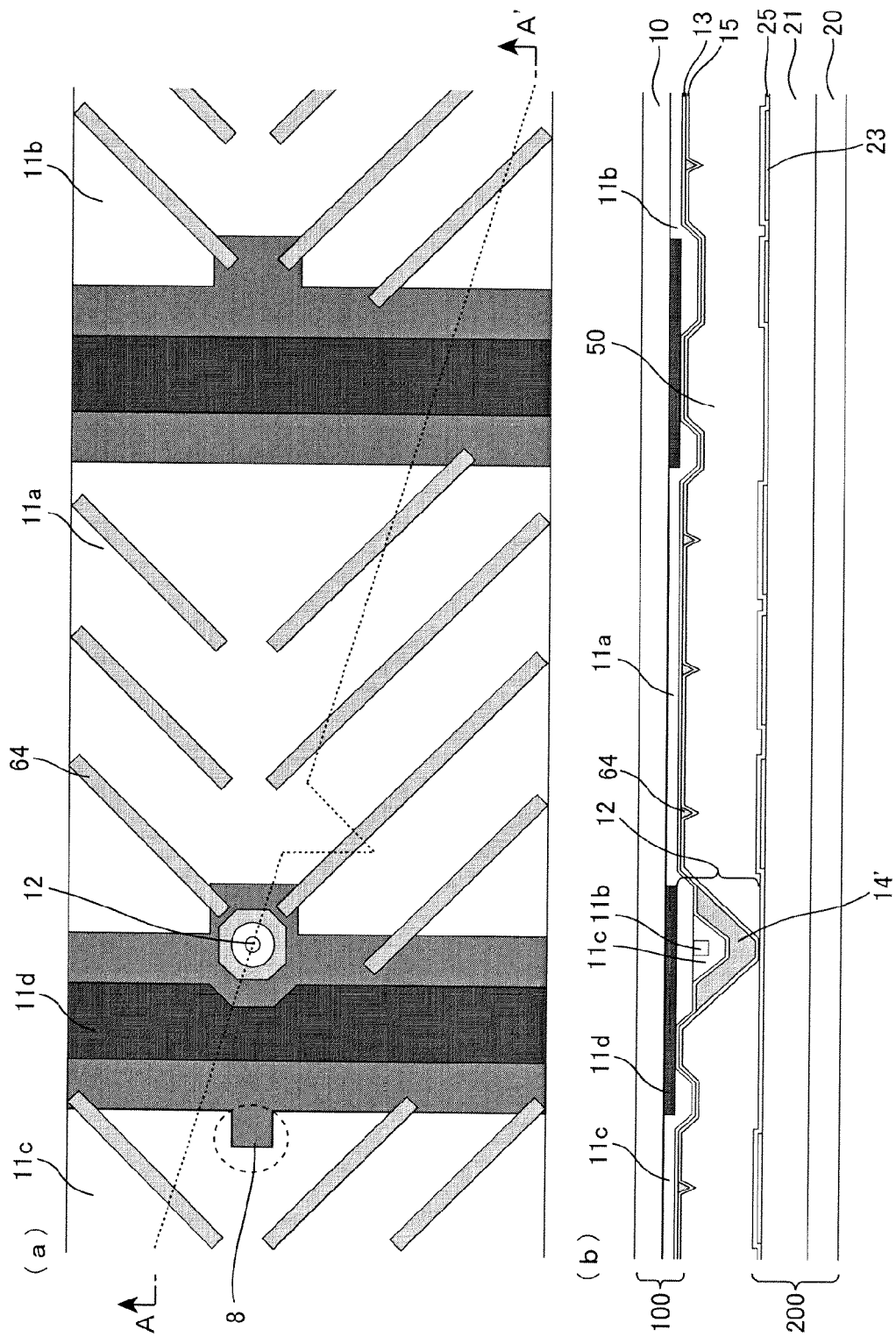
FIG. 56 (*a*) is a schematic plan view showing a constitution of a color filter substrate mounted on a liquid crystal display panel according to Example 56 of the present invention, and FIG. 56 (*b*) is a schematic section view showing the liquid crystal display panel taken along line A-A' in FIG. 56 (*a*).
Figure 57:
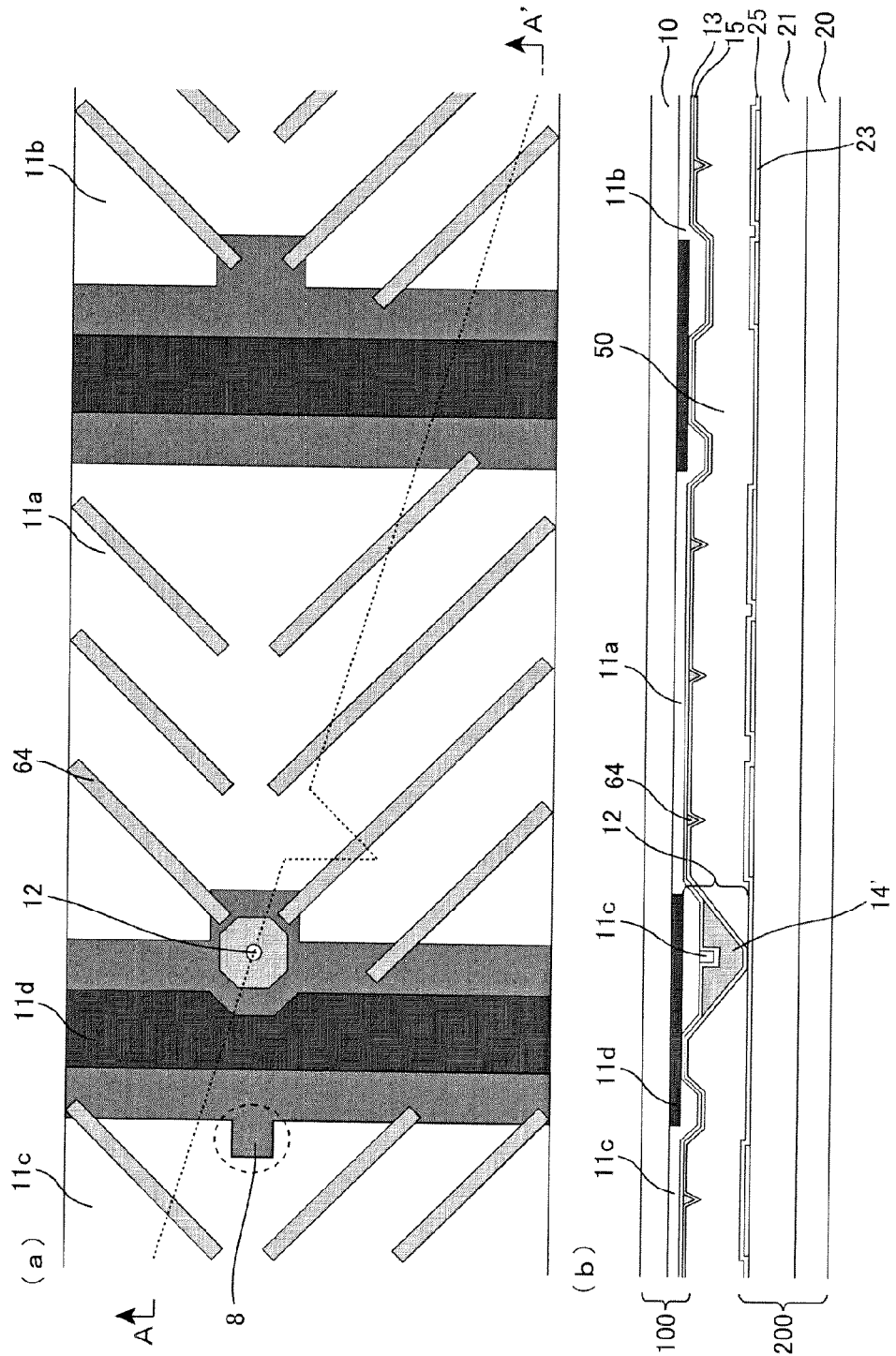
FIG. 57 (*a*) is a schematic plan view showing a constitution of a color filter substrate mounted on a liquid crystal display panel according to Example 57 of the present invention, and FIG. 57 (*b*) is a schematic section view showing the liquid crystal display panel taken along line A-A' in FIG. 57 (*a*).

FIGS. 55 (*a*), 56 (*a*), and 57 (*a*) are schematic plan views showing constitutions of color filter (CF) substrates mounted on liquid crystal display panels according to Examples 55 to 57 of the present invention, and FIGS. 55 (*b*) to 57 (*b*) are schematic section views respectively showing the liquid crystal display panels taken along lines A-A' in FIGS. 55 to 57 (*a*)s.

The liquid crystal display panels according to Examples 55 to 57 respectively have the same constitutions as those of the liquid crystal display panels according to Examples 52 to 54, except that a rectangular protrusion is provided on the BM layer 11*d* as the specific structure 8.

According to the liquid crystal display panels in Examples 55 to 57, a height of the stacked PS 12 can be automatically measured with a height measuring device since the specific structure 8 provided on the BM layer 11*d* can be recognized by an image recognition device as a positioning patter. In addition, an intersecting part of an outline of the rib-shaped protrusion for controlling an alignment 64 and an outline of the BM layer 11*d* can be by an image recognition device as a positioning pattern.

Example 58

Figure 58:
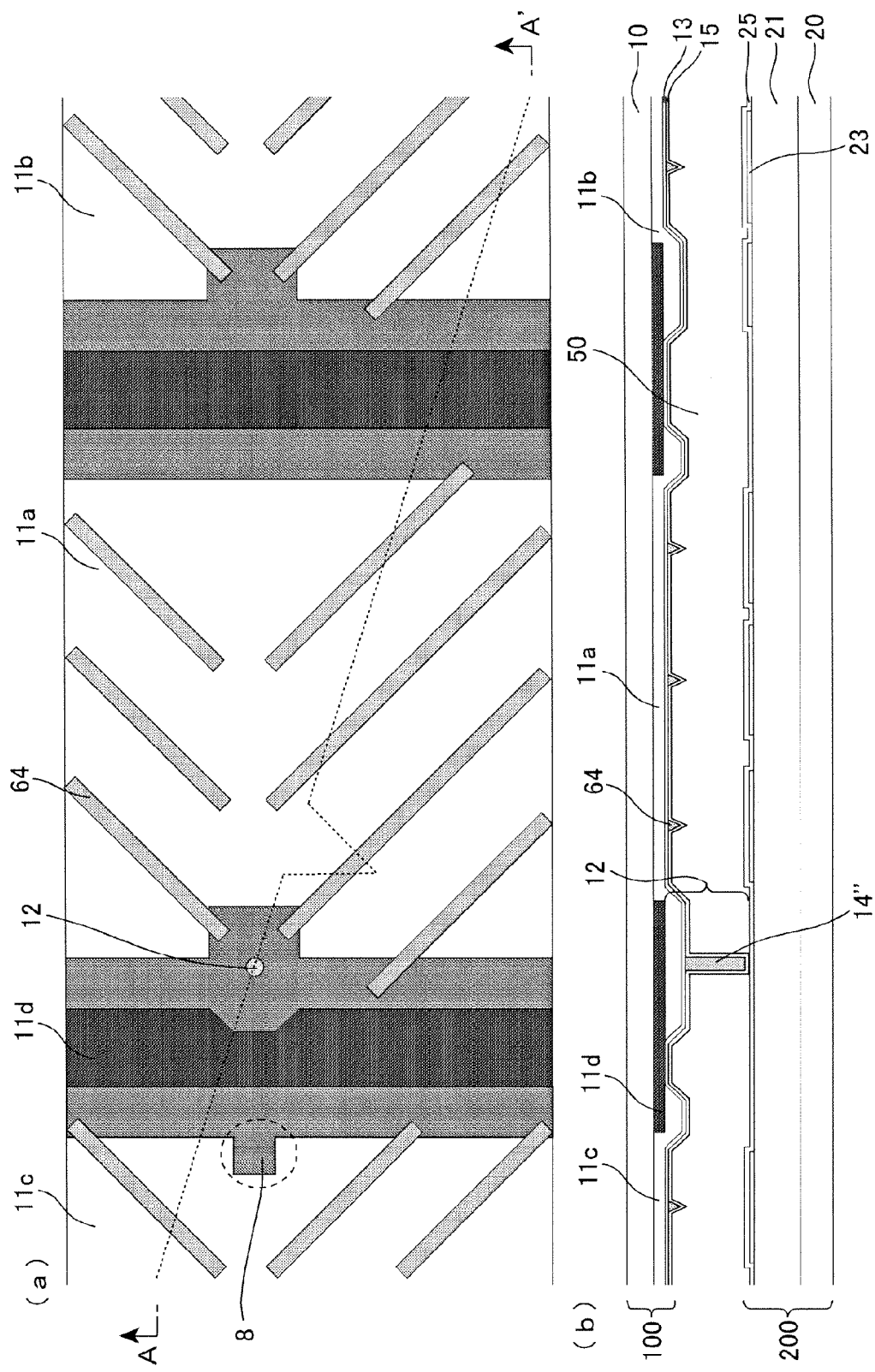
FIG. 58 (*a*) is a schematic plan view showing a constitution of a color filter substrate mounted on a liquid crystal display panel according to Example 58 of the present invention, and FIG. 58 (*b*) is a schematic section view showing the liquid crystal display panel taken along line A-A' in FIG. 58 (*a*).

FIG. 58(*a*) is a schematic plan view showing a constitution of a color filter (CF) substrate mounted on a liquid crystal display panel according to Example 58 of the present invention, and FIG. 58 (*b*) is a schematic section view showing the liquid crystal display panel taken along line A-A' in FIG. 58(*a*).

The liquid crystal display panel according to Example 58 has the same constitution as that of the liquid crystal display panels according to Examples 55 to 57 except that the stacked PS 12 has the same configuration as that of Example 4.

The same operation effect as that in Example 55 can be provided also in the liquid crystal panel of Example 58.

As shown in Examples 55 to 58, when the specific structure 8 is provided on the BM layer 11*d*, the structure of the stacked PS 12 is not particularly limited. Also, the planer shape of the stacked PS 12 is not limited to the octagon shown in Examples 55 to 58 and it may be a circle, an ellipse, a quadrangle and the like.

Examples 59 to 66

Examples 59 to 66 show various shapes of the specific structure 8 formed using a BM layer 11*d*.

Figure 59:
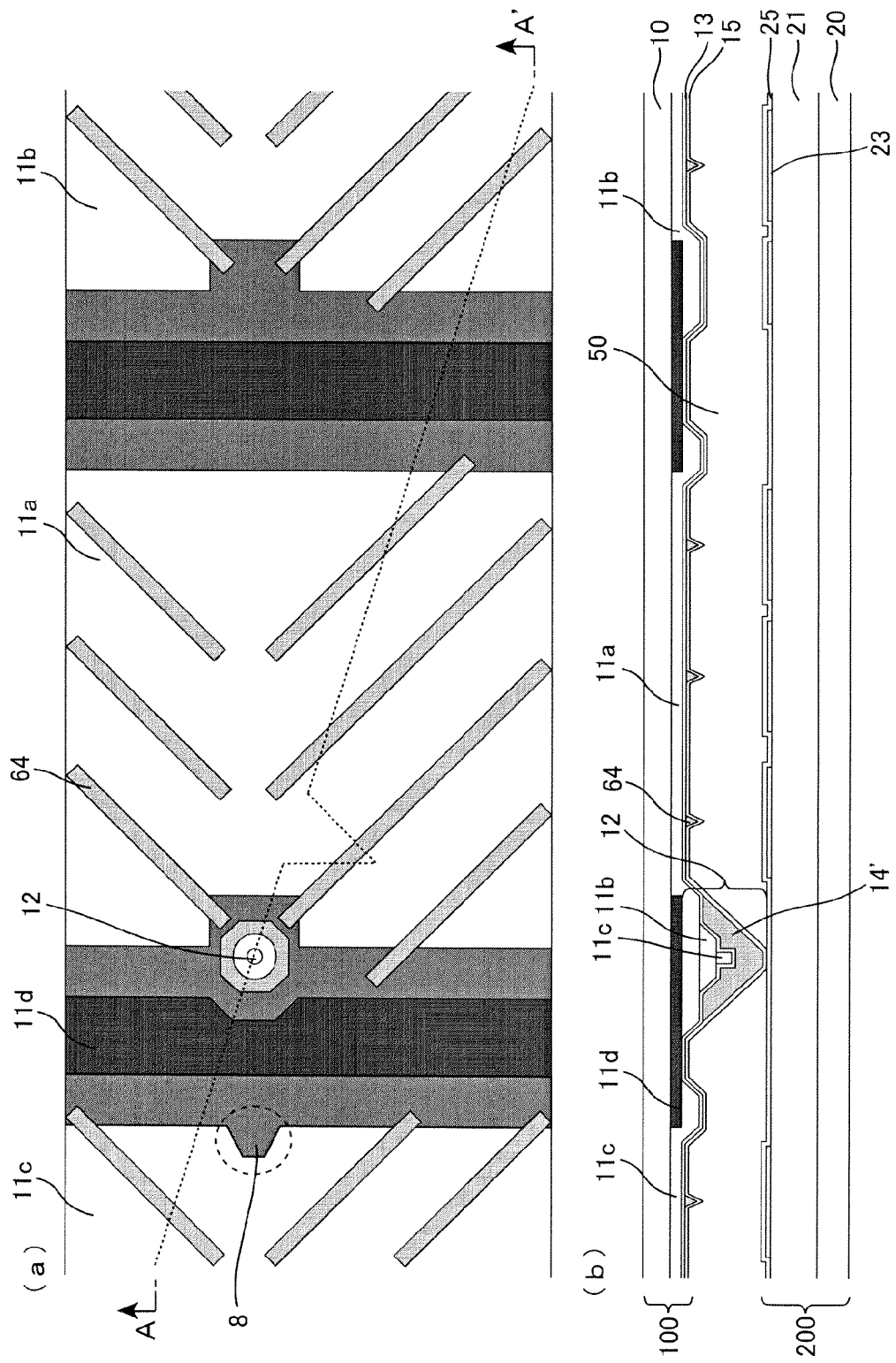
FIG. 59 (*a*) is a schematic plan view showing a constitution of a color filter substrate mounted on a liquid crystal display panel according to Example 59 of the present invention, and FIG. 59 (*b*) is a schematic section view showing the liquid crystal display panel taken along line A-A' in FIG. 59 (*a*).
Figure 60:
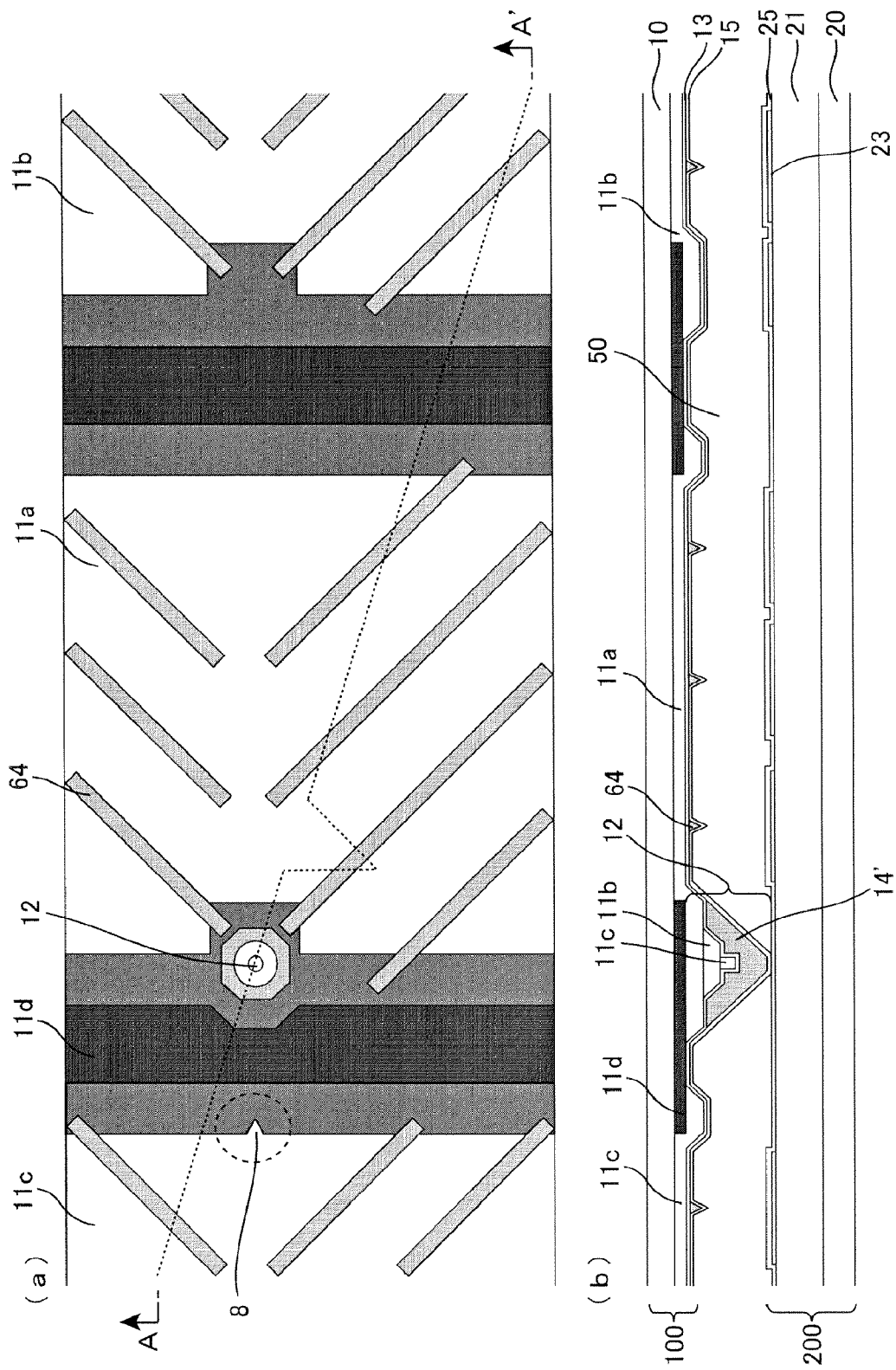
FIG. 60 (*a*) is a schematic plan view showing a constitution of a color filter substrate mounted on a liquid crystal display panel according to Example 60 of the present invention, and FIG. 60 (*b*) is a schematic section view showing the liquid crystal display panel taken along line A-A' in FIG. 60 (*a*).
Figure 61:
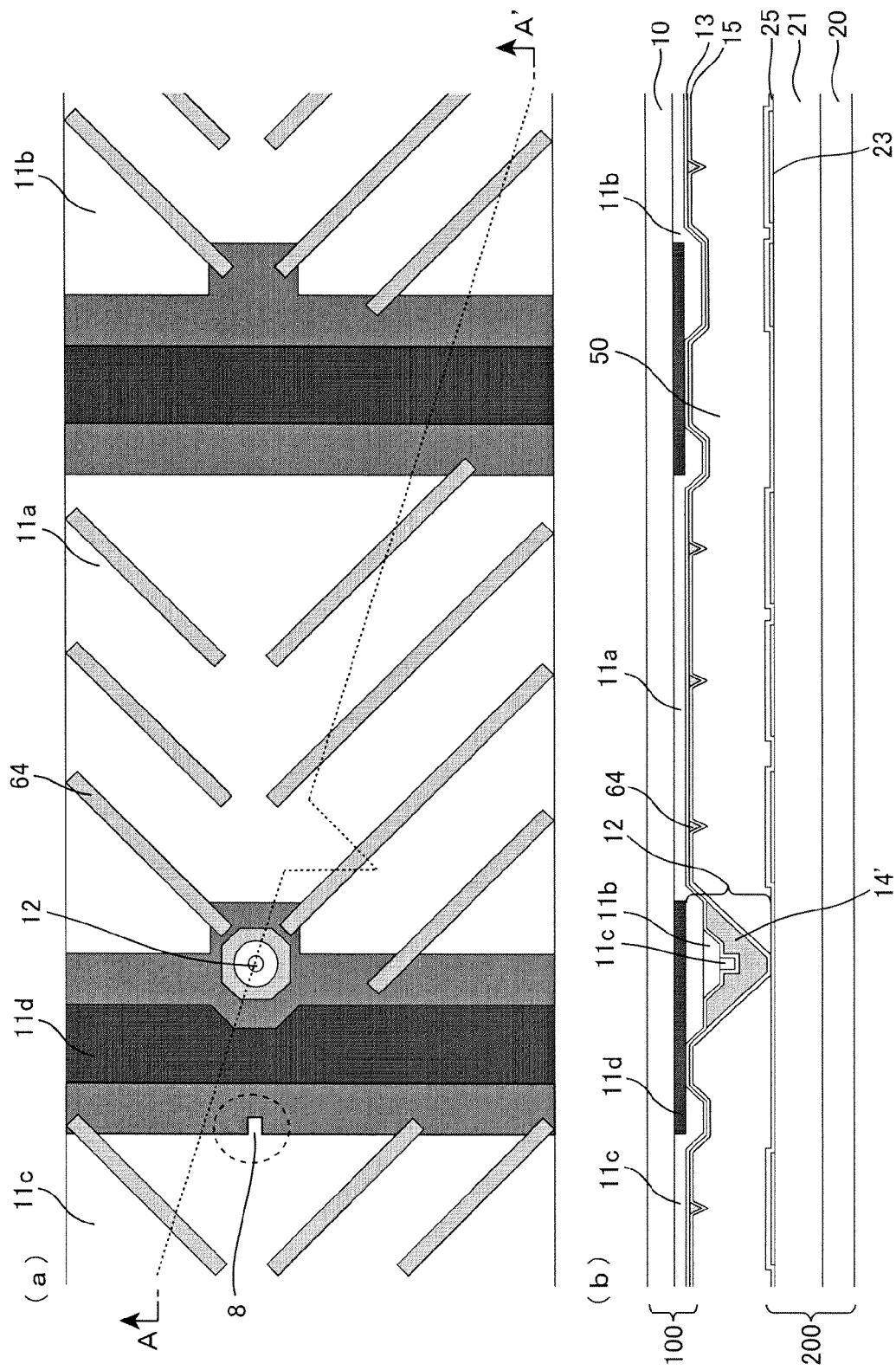
FIG. 61 (*a*) is a schematic plan view showing a constitution of a color filter substrate mounted on a liquid crystal display panel according to Example 61 of the present invention, and FIG. 61 (*b*) is a schematic section view showing the liquid crystal display panel taken along line A-A' in FIG. 61 (*a*).
Figure 62:
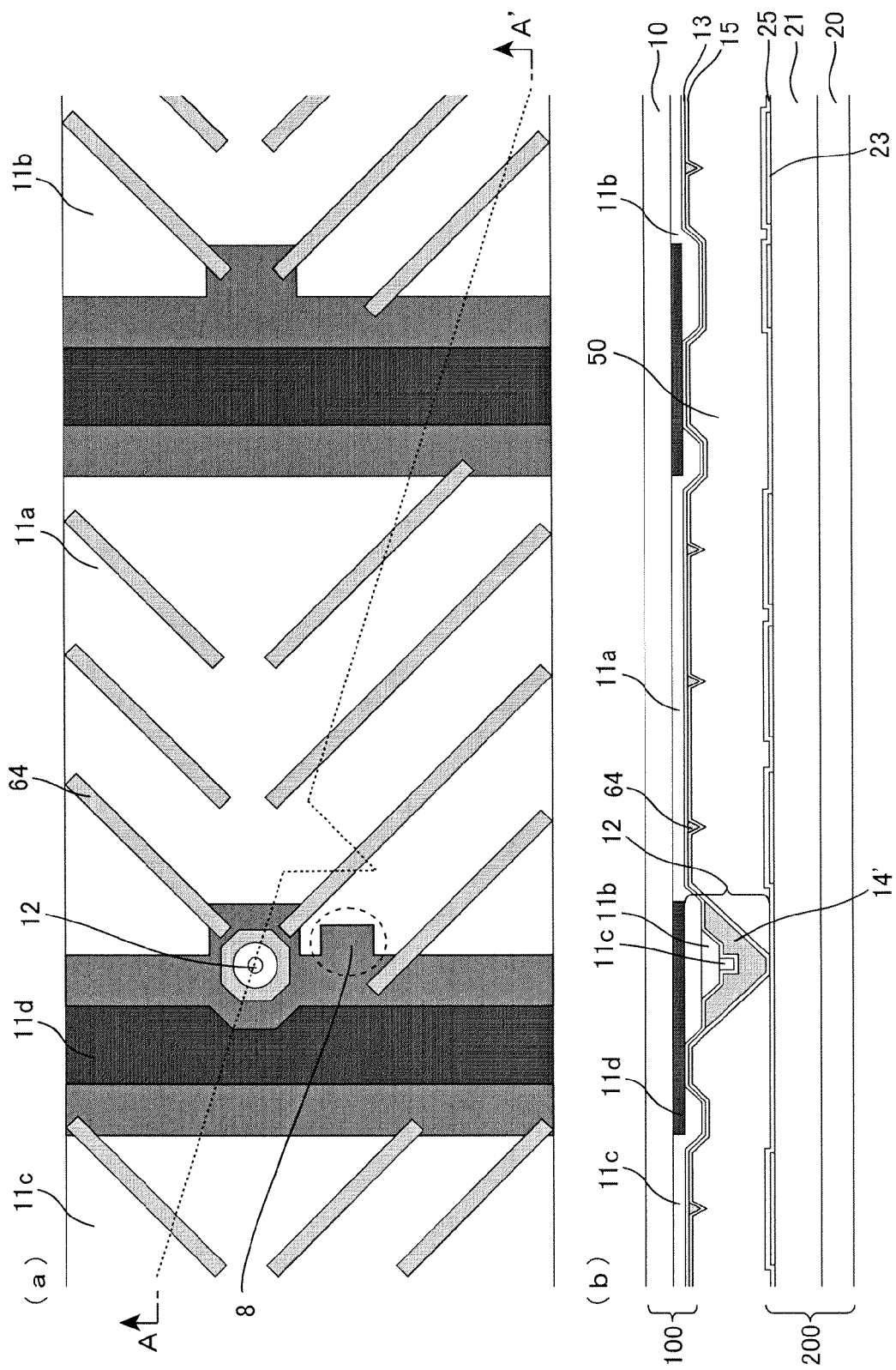
FIG. 62 (*a*) is a schematic plan view showing a constitution of a color filter substrate mounted on a liquid crystal display panel according to Example 62 of the present invention, and FIG. 62 (*b*) is a schematic section view showing the liquid crystal display panel taken along line A-A' in FIG. 62 (*a*).
Figure 63:
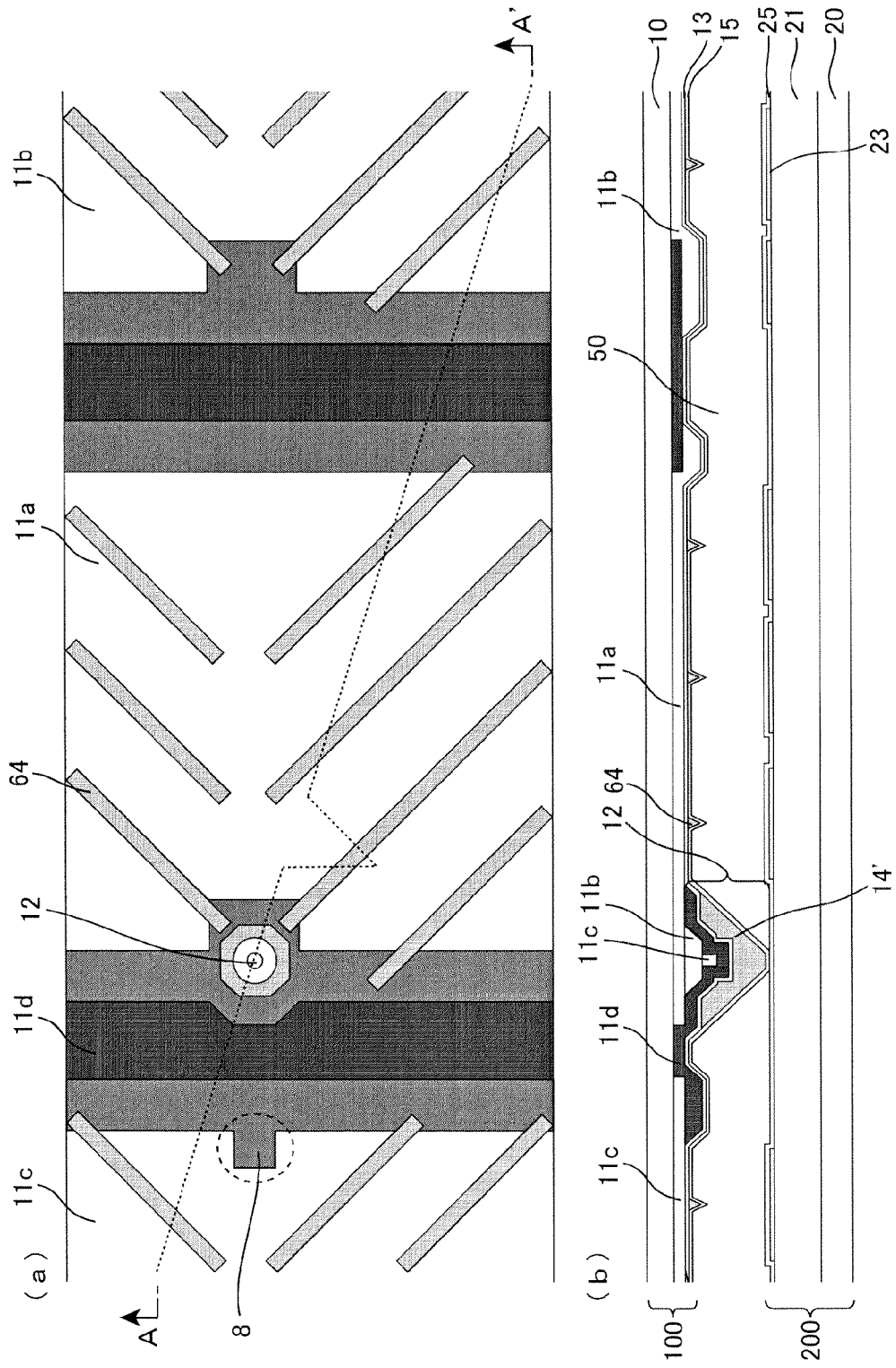
FIG. 63 (*a*) is a schematic plan view showing a constitution of a color filter substrate mounted on a liquid crystal display panel according to Example 63 of the present invention, and FIG. 63 (*b*) is a schematic section view showing the liquid crystal display panel taken along line A-A' in FIG. 63 (*a*).
Figure 64:
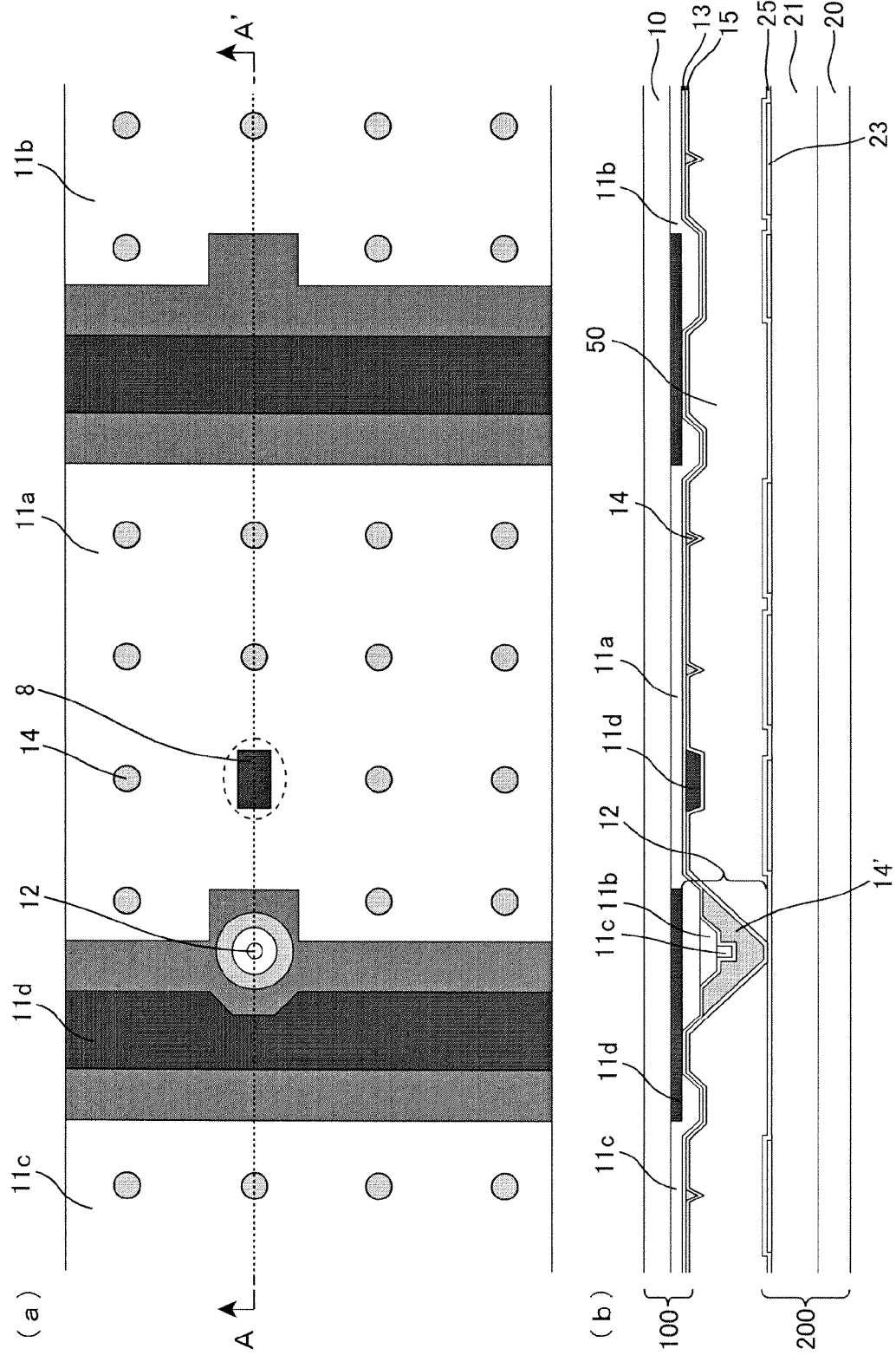
FIG. 64 (*a*) is a schematic plan view showing a constitution of a color filter substrate mounted on a liquid crystal display panel according to Example 64 of the present invention, and FIG. 64 (*b*) is a schematic section view showing the liquid crystal display panel taken along line A-A' in FIG. 64 (*a*).
Figure 65:
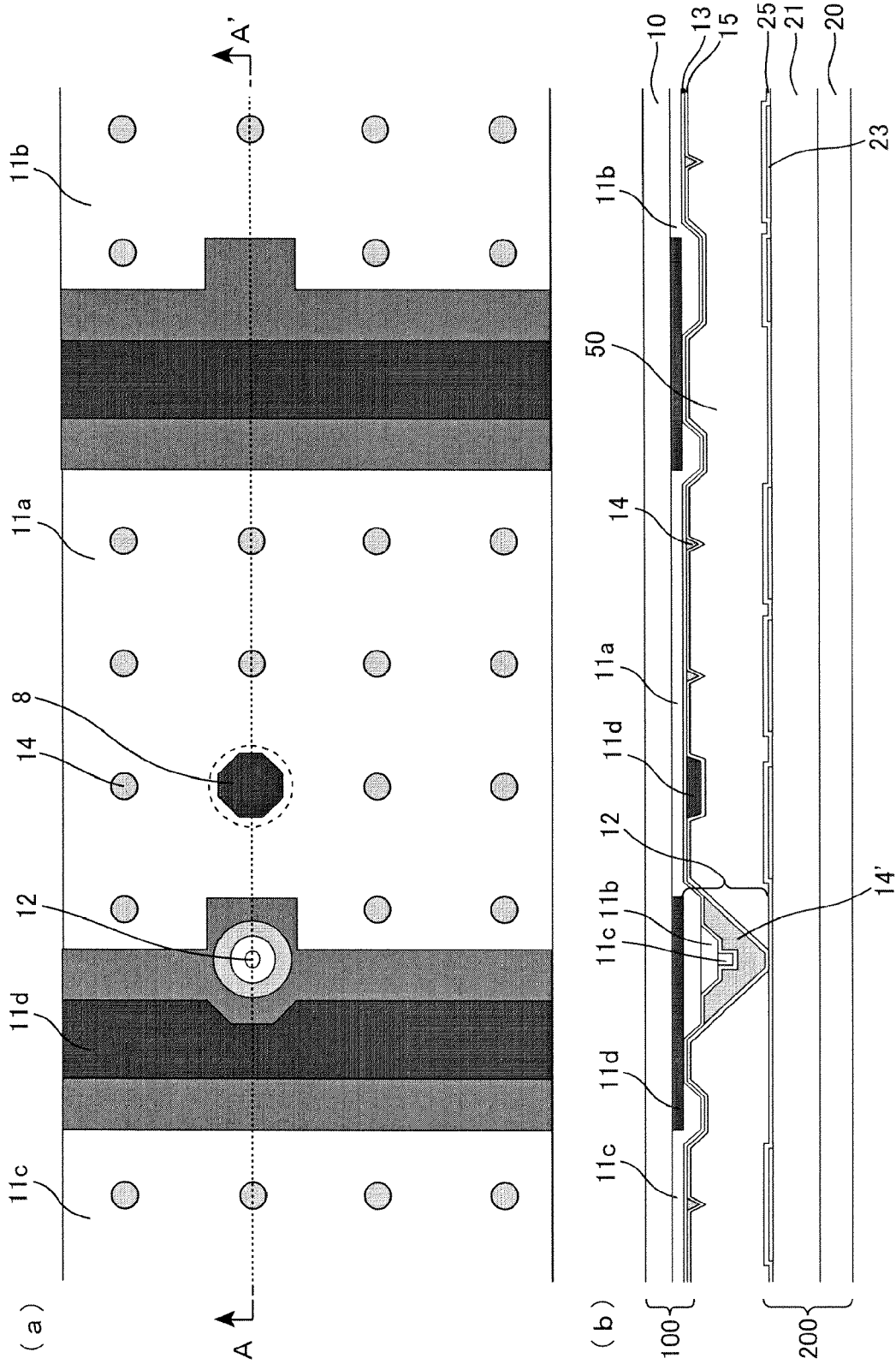
FIG. 65 (*a*) is a schematic plan view showing a constitution of a color filter substrate mounted on a liquid crystal display panel according to Example 65 of the present invention, and FIG. 65 (*b*) is a schematic section view showing the liquid crystal display panel taken along line A-A' in FIG. 65 (*a*).
Figure 66:
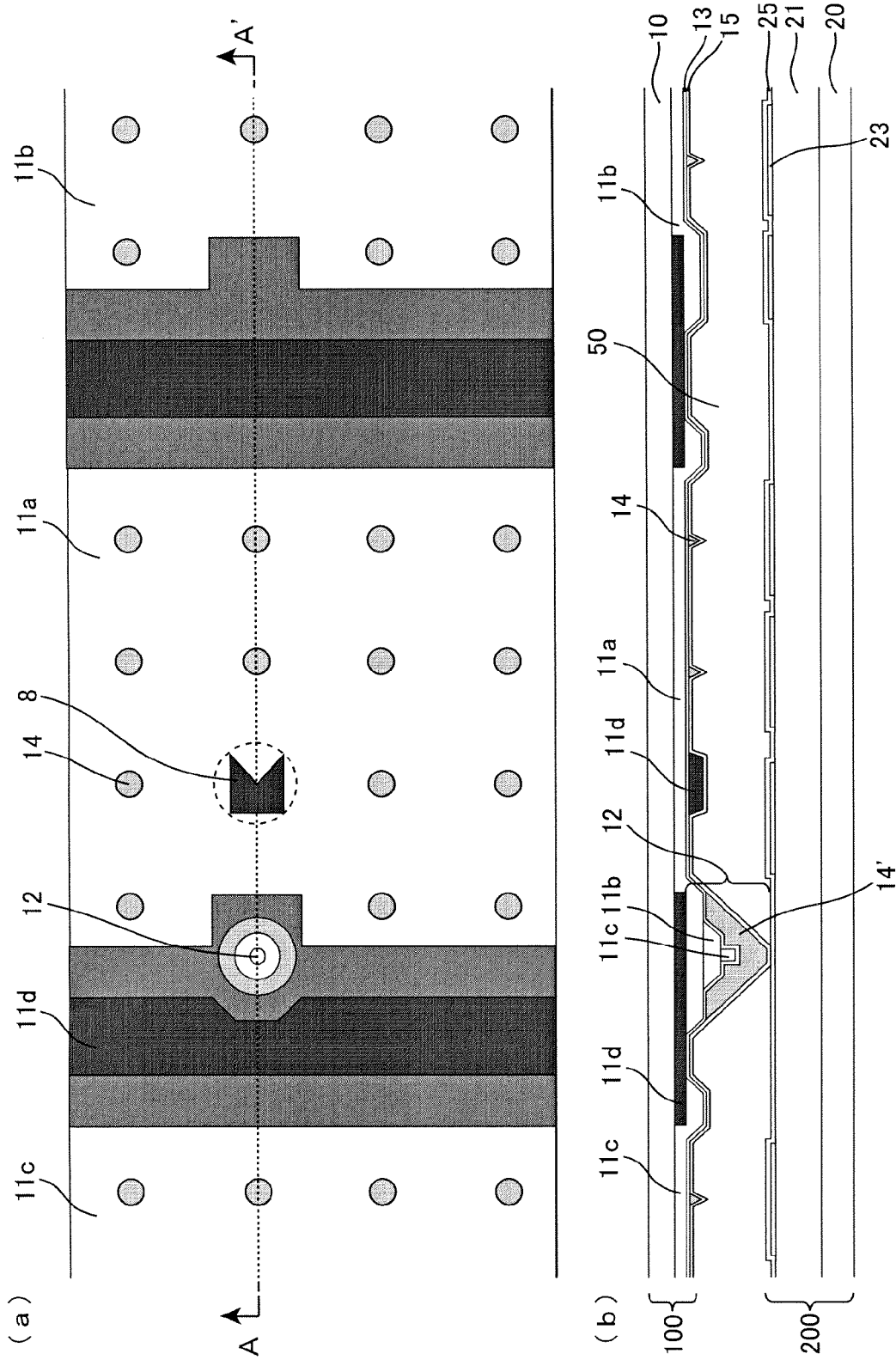
FIG. 66 (*a*) is a schematic plan view showing a constitution of a color filter substrate mounted on a liquid crystal display panel according to Example 66 of the present invention, and FIG. 66 (*b*) is a schematic section view showing the liquid crystal display panel taken along line A-A' in FIG. 66 (*a*).
Figure 67:
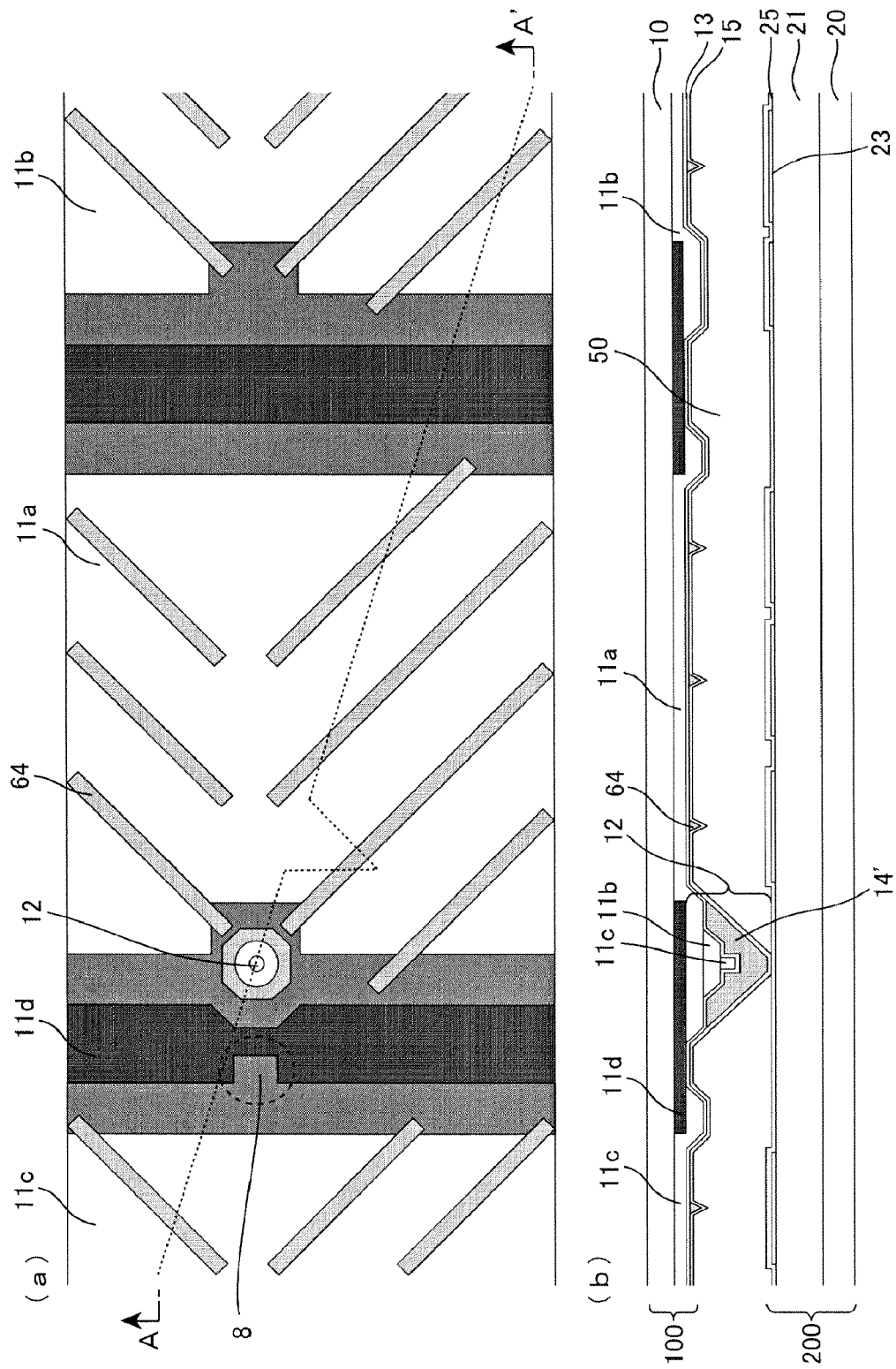
FIG. 67 (*a*) is a schematic plan view showing a constitution of a color filter substrate mounted on a liquid crystal display panel according to Example 67 of the present invention, and FIG. 67 (*b*) is a schematic section view showing the liquid crystal display panel taken along line A-A' in FIG. 67 (*a*).
Figure 68:
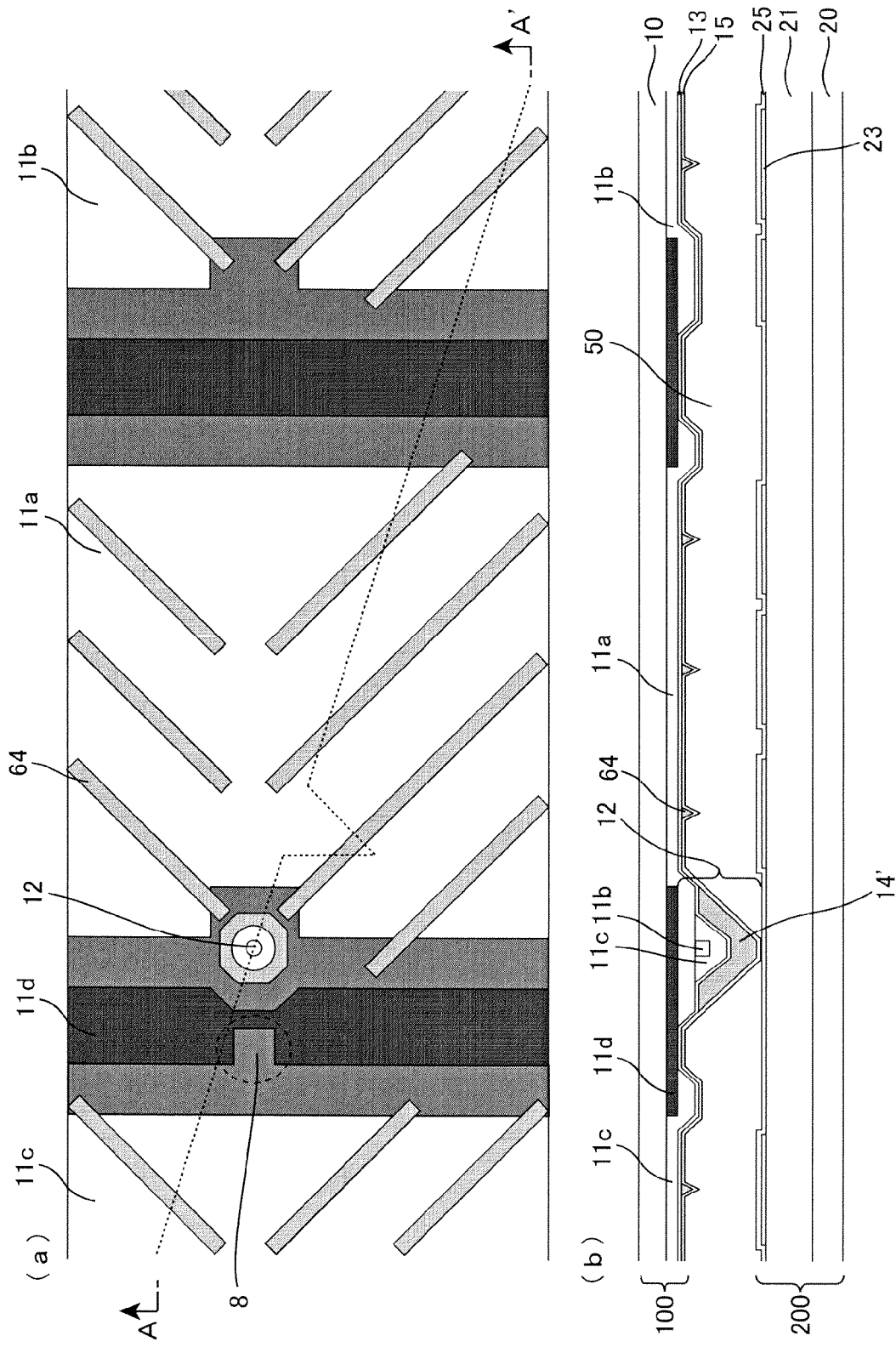
FIG. 68 (*a*) is a schematic plan view showing a constitution of a color filter substrate mounted on a liquid crystal display panel according to Example 68 of the present invention, and FIG. 68 (*b*) is a schematic section view showing the liquid crystal display panel taken along line A-A' in FIG. 68 (*a*).
Figure 69:
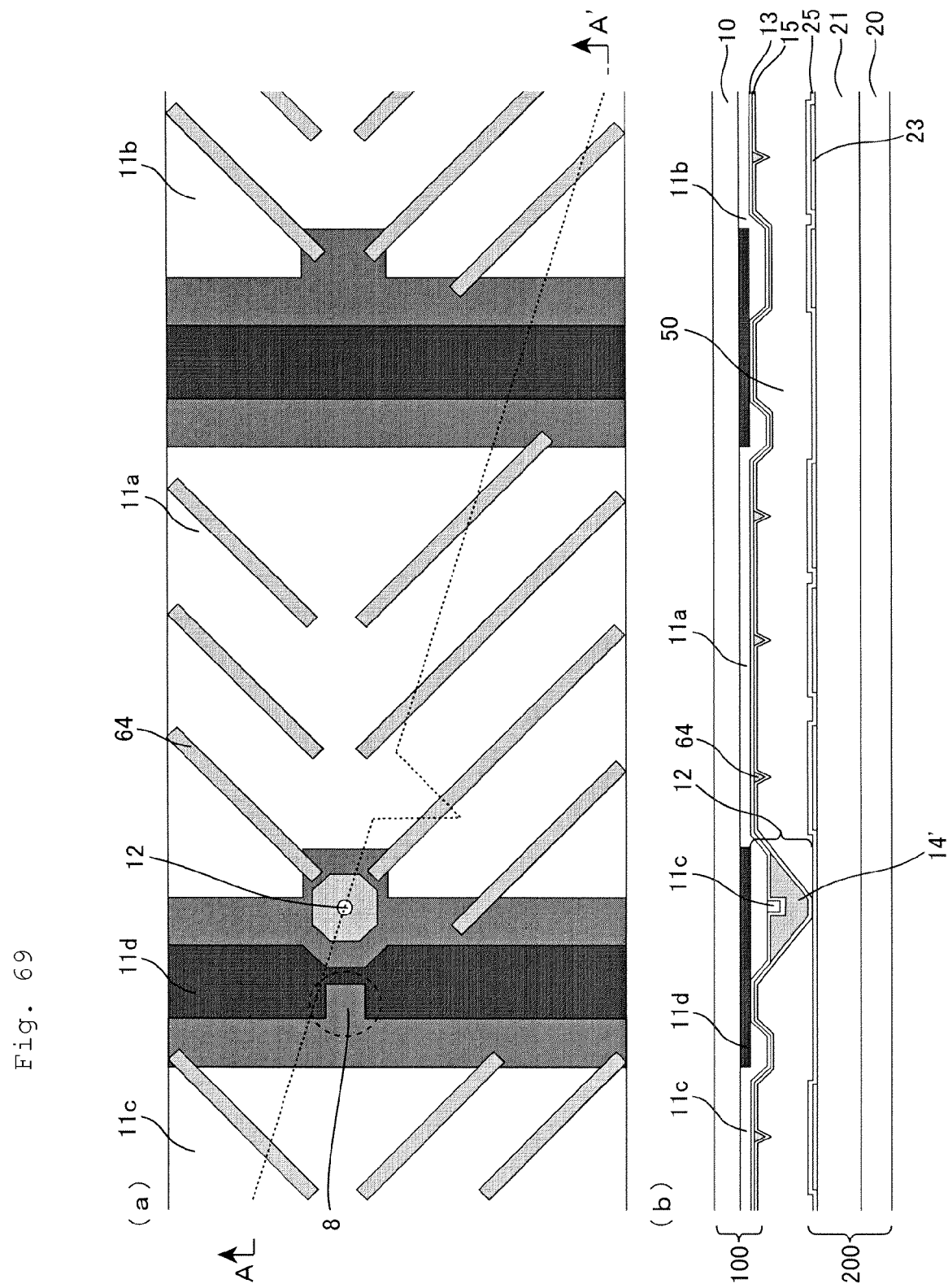
FIG. 69 (*a*) is a schematic plan view showing a constitution of a color filter substrate mounted on a liquid crystal display panel according to Example 69 of the present invention, and FIG. 69 (*b*) is a schematic section view showing the liquid crystal display panel taken along line A-A' in FIG. 69 (*a*).
Figure 70:
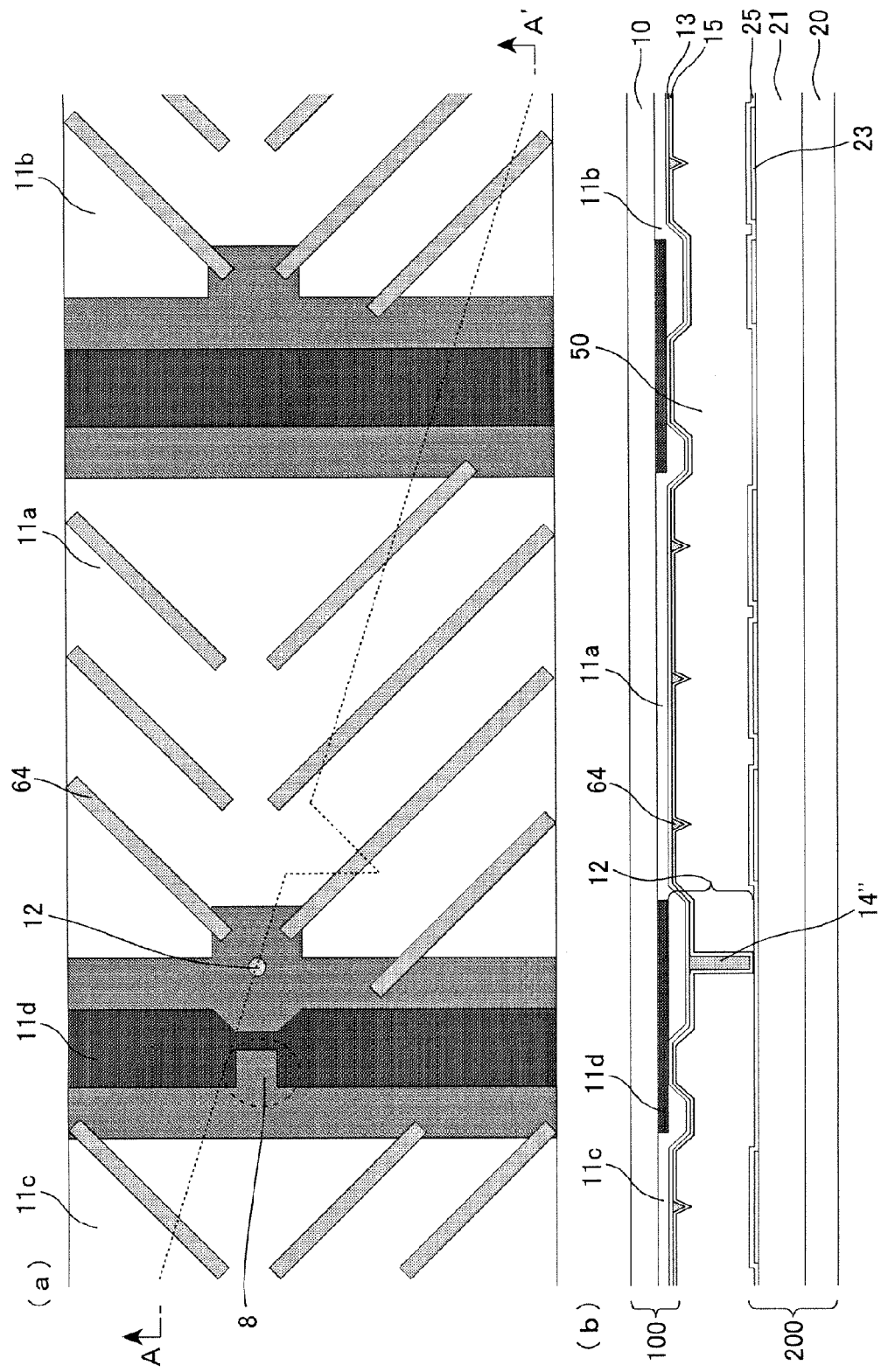
FIG. 70 (*a*) is a schematic plan view showing a constitution of a color filter substrate mounted on a liquid crystal display panel according to Example 70 of the present invention, and FIG. 70 (*b*) is a schematic section view showing the liquid crystal display panel taken along line A-A' in FIG. 70 (*a*).
Figure 71:
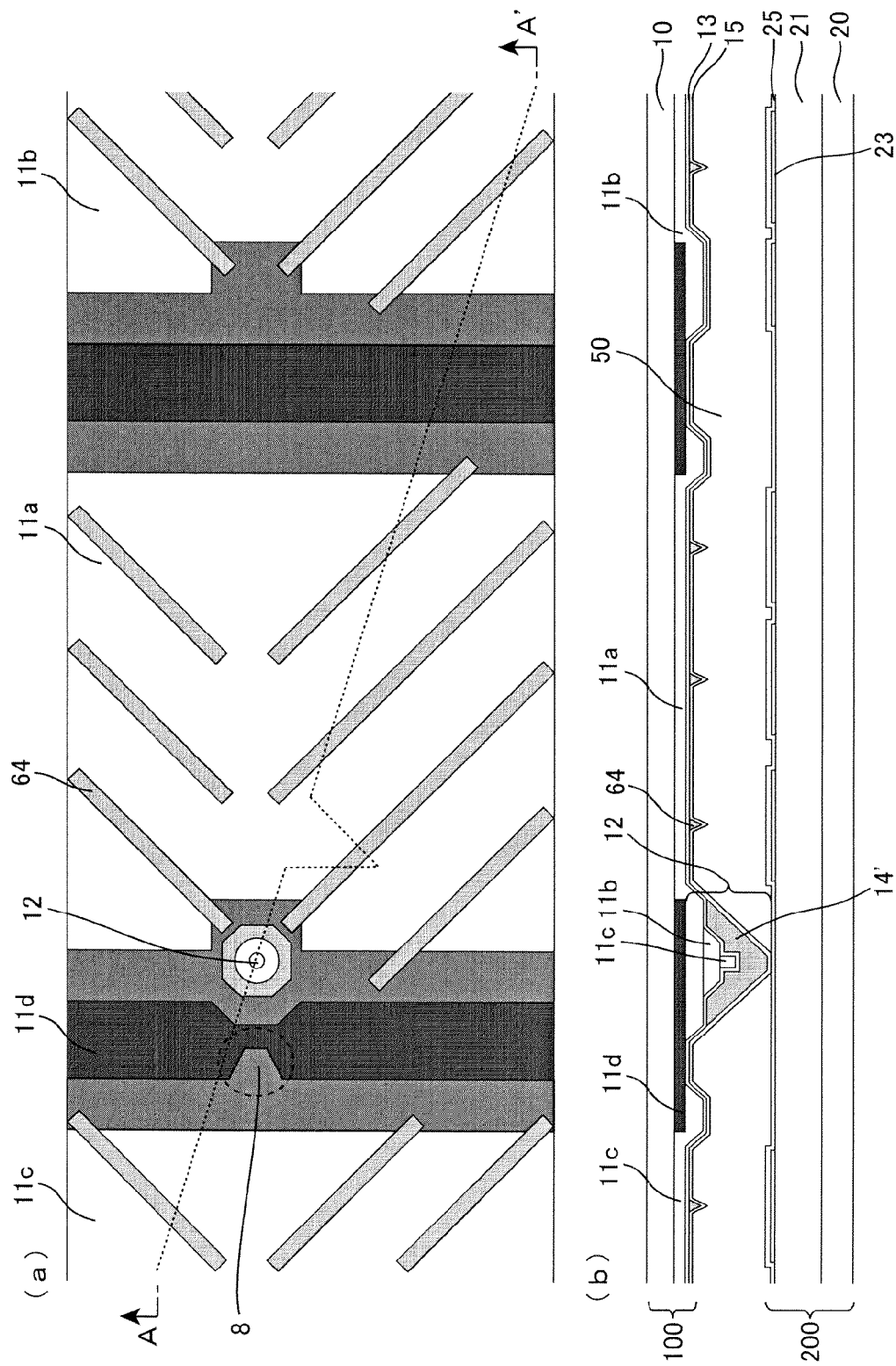
FIG. 71 (*a*) is a schematic plan view showing a constitution of a color filter substrate mounted on a liquid crystal display panel according to Example 71 of the present invention, and FIG. 71 (*b*) is a schematic section view showing the liquid crystal display panel taken along line A-A' in FIG. 71 (*a*).
Figure 72:
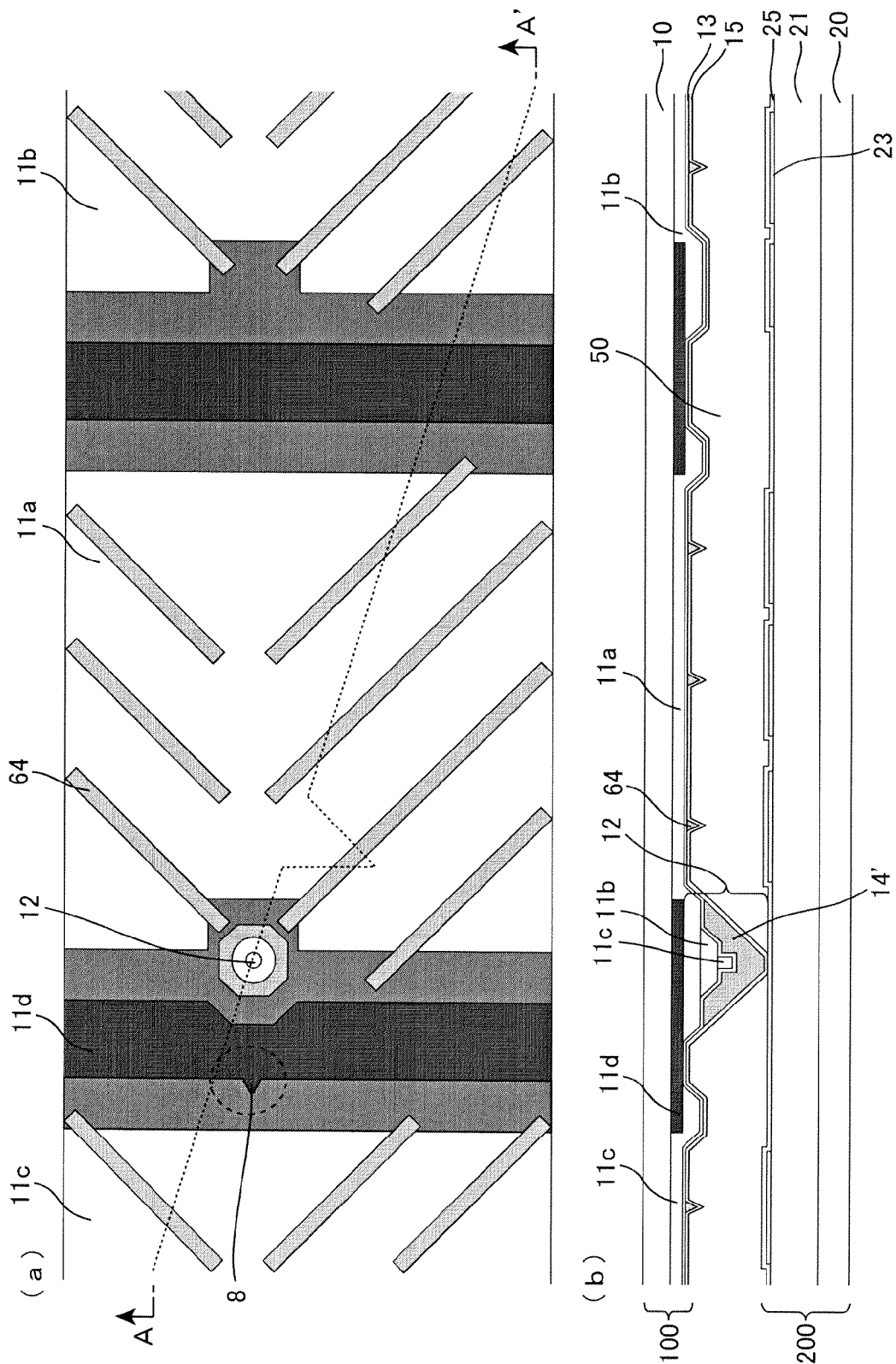
FIG. 72 (*a*) is a schematic plan view showing a constitution of a color filter substrate mounted on a liquid crystal display panel according to Example 72 of the present invention, and FIG. 72 (*b*) is a schematic section view showing the liquid crystal display panel taken along line A-A' in FIG. 72 (*a*).
Figure 73:
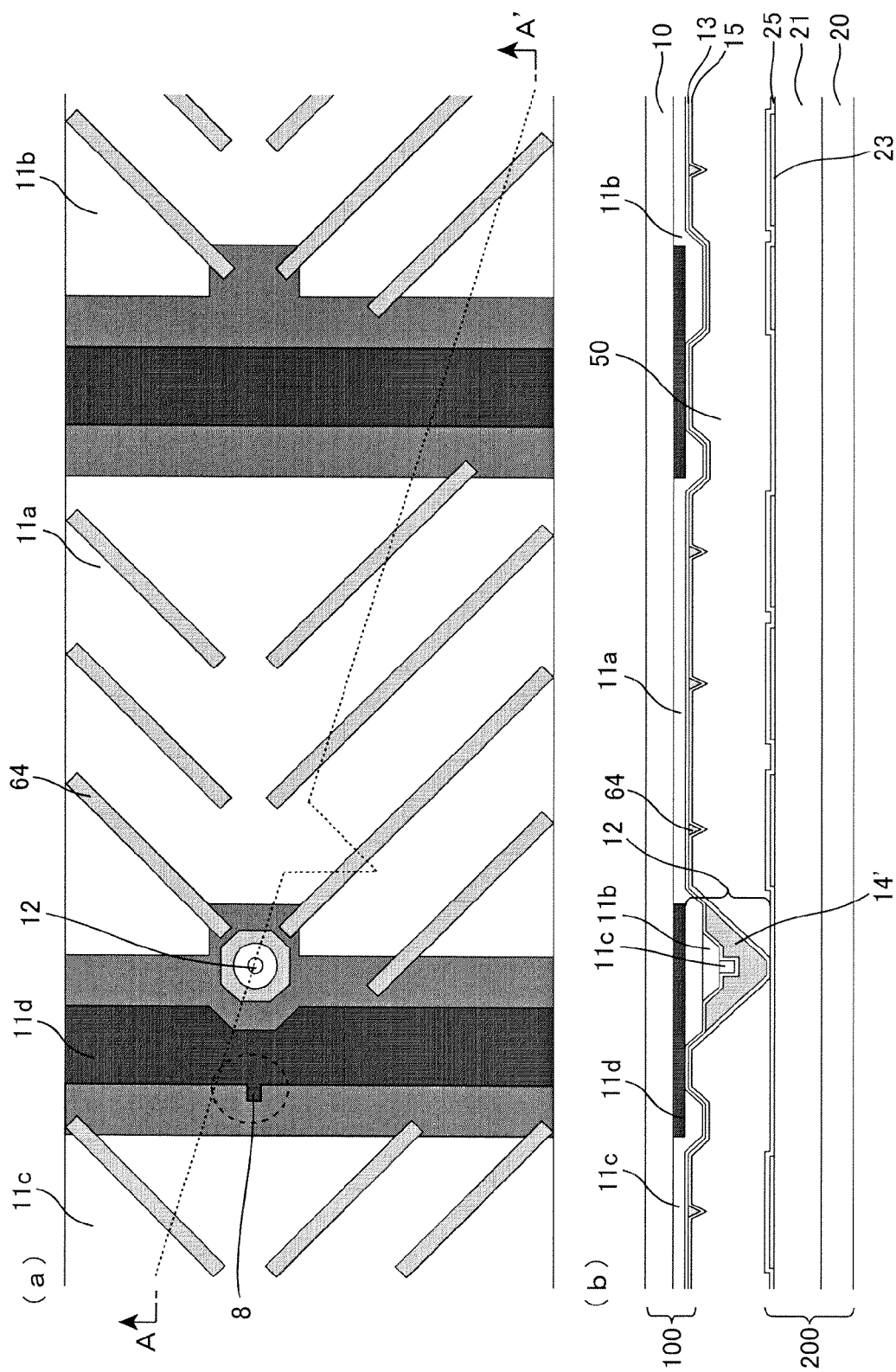
FIG. 73 (*a*) is a schematic plan view showing a constitution of a color filter substrate mounted on a liquid crystal display panel according to Example 73 of the present invention, and FIG. 73 (*b*) is a schematic section view showing the liquid crystal display panel taken along line A-A' in FIG. 73 (*a*).
Figure 74:
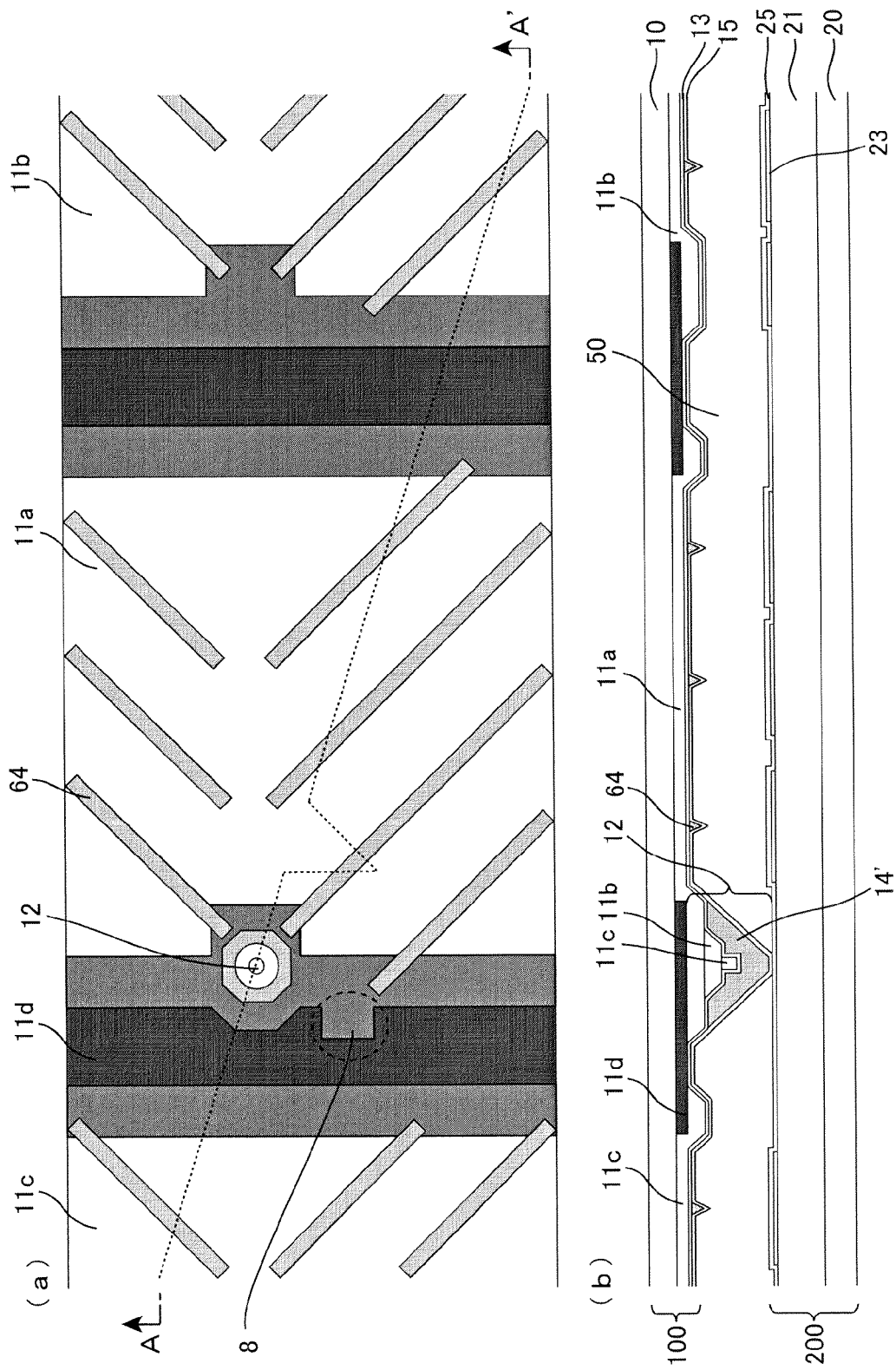
FIG. 74(*a*) is a schematic plan view showing a constitution of a color filter substrate mounted on a liquid crystal display panel according to Example 74 of the present invention, and FIG. 74 (*b*) is a schematic section view showing the liquid crystal display panel taken along line A-A' in FIG. 74 (*a*).
Figure 75:
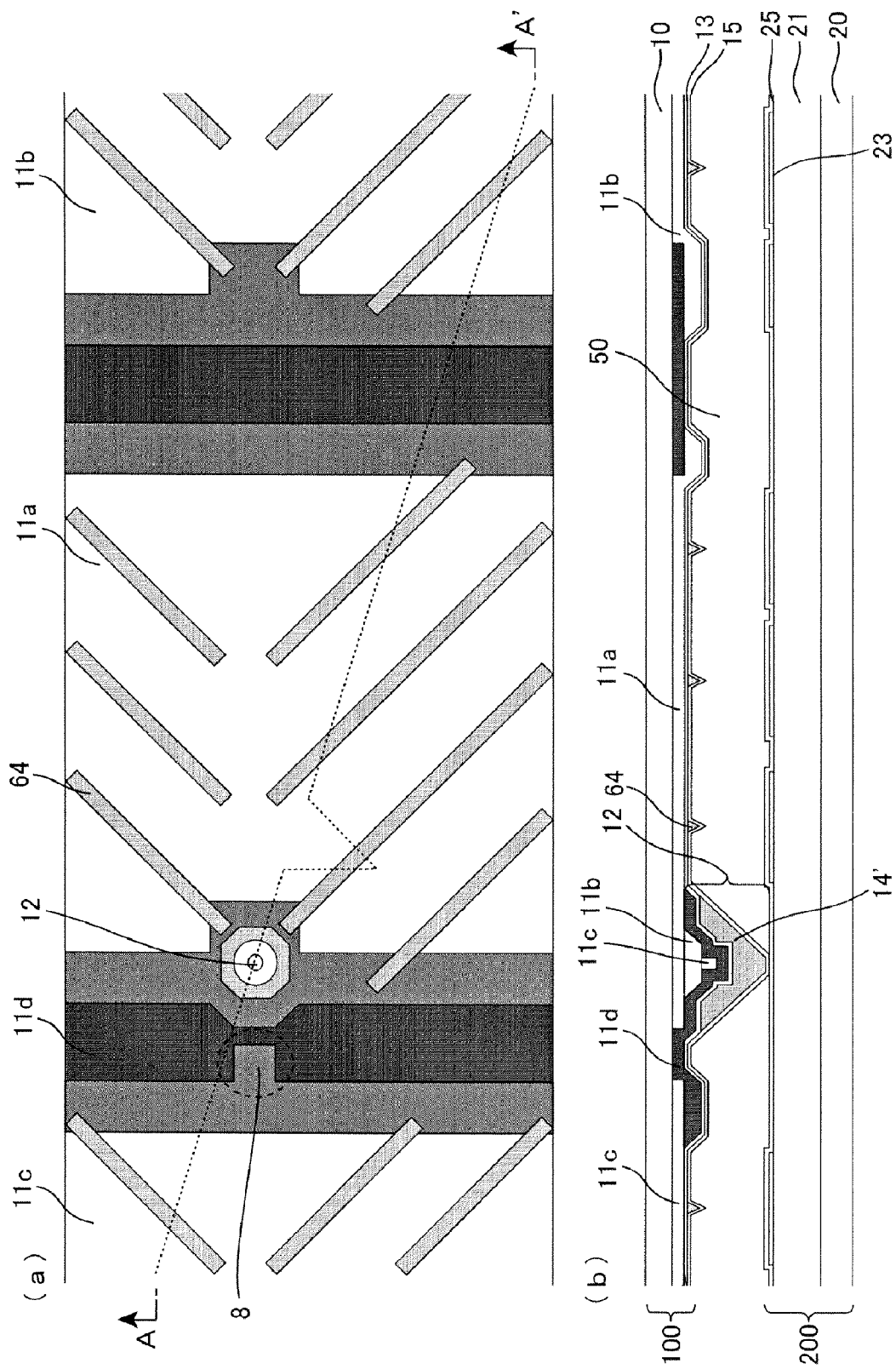
FIG. 75 (*a*) is a schematic plan view showing a constitution of a color filter substrate mounted on a liquid crystal display panel according to Example 75 of the present invention, and FIG. 75 (*b*) is a schematic section view showing the liquid crystal display panel taken along line A-A' in FIG. 75 (*a*).
Figure 76:
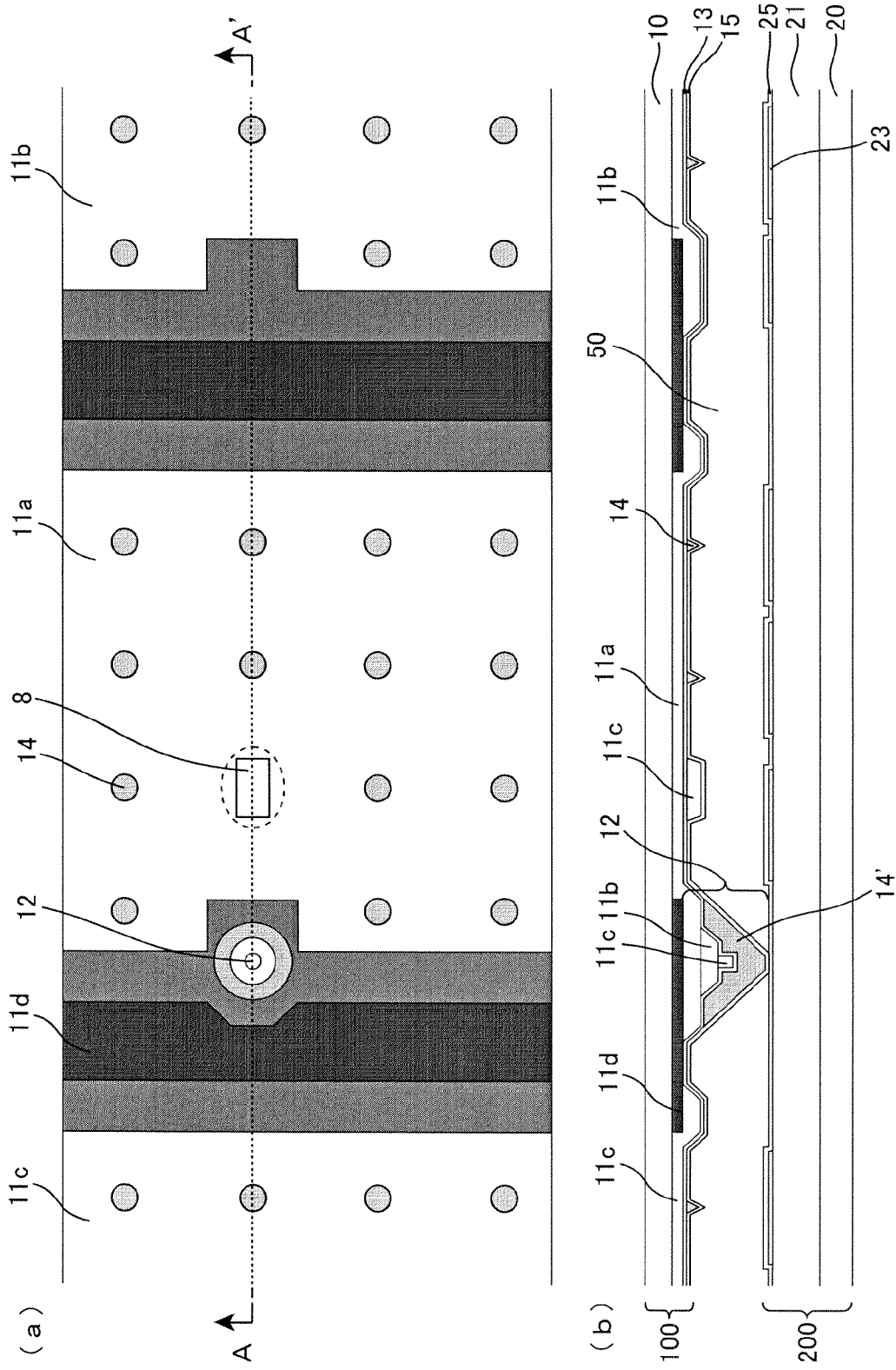
FIG. 76 (*a*) is a schematic plan view showing a constitution of a color filter substrate mounted on a liquid crystal display panel according to Example 76 of the present invention, and FIG. 76 (*b*) is a schematic section view showing the liquid crystal display panel taken along line A-A' in FIG. 76 (*a*).
Figure 77:
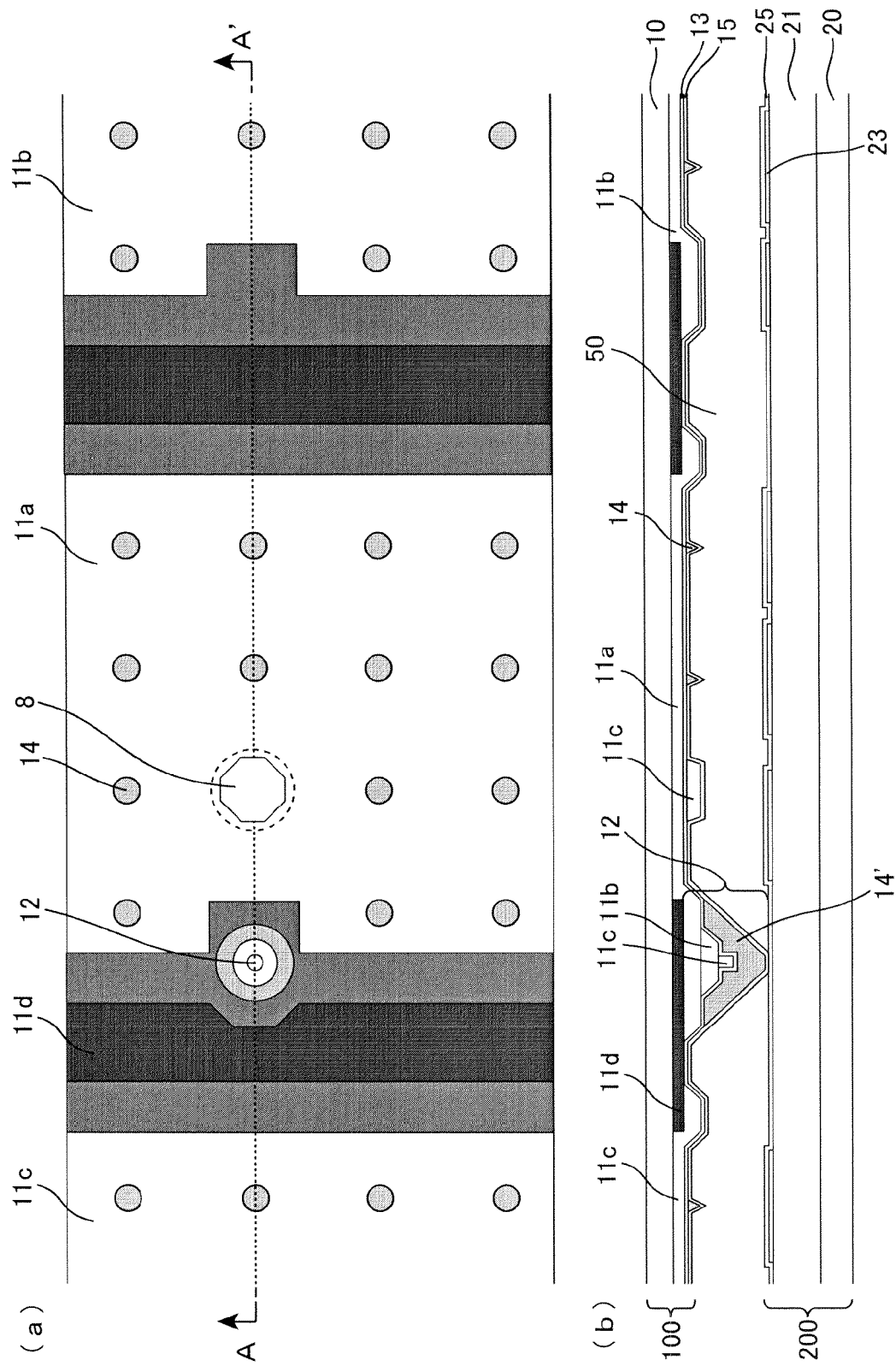
FIG. 77 (*a*) is a schematic plan view showing a constitution of a color filter substrate mounted on a liquid crystal display panel according to Example 77 of the present invention, and FIG. 77 (*b*) is a schematic section view showing the liquid crystal display panel taken along line A-A' in FIG. 77 (*a*).
Figure 78:
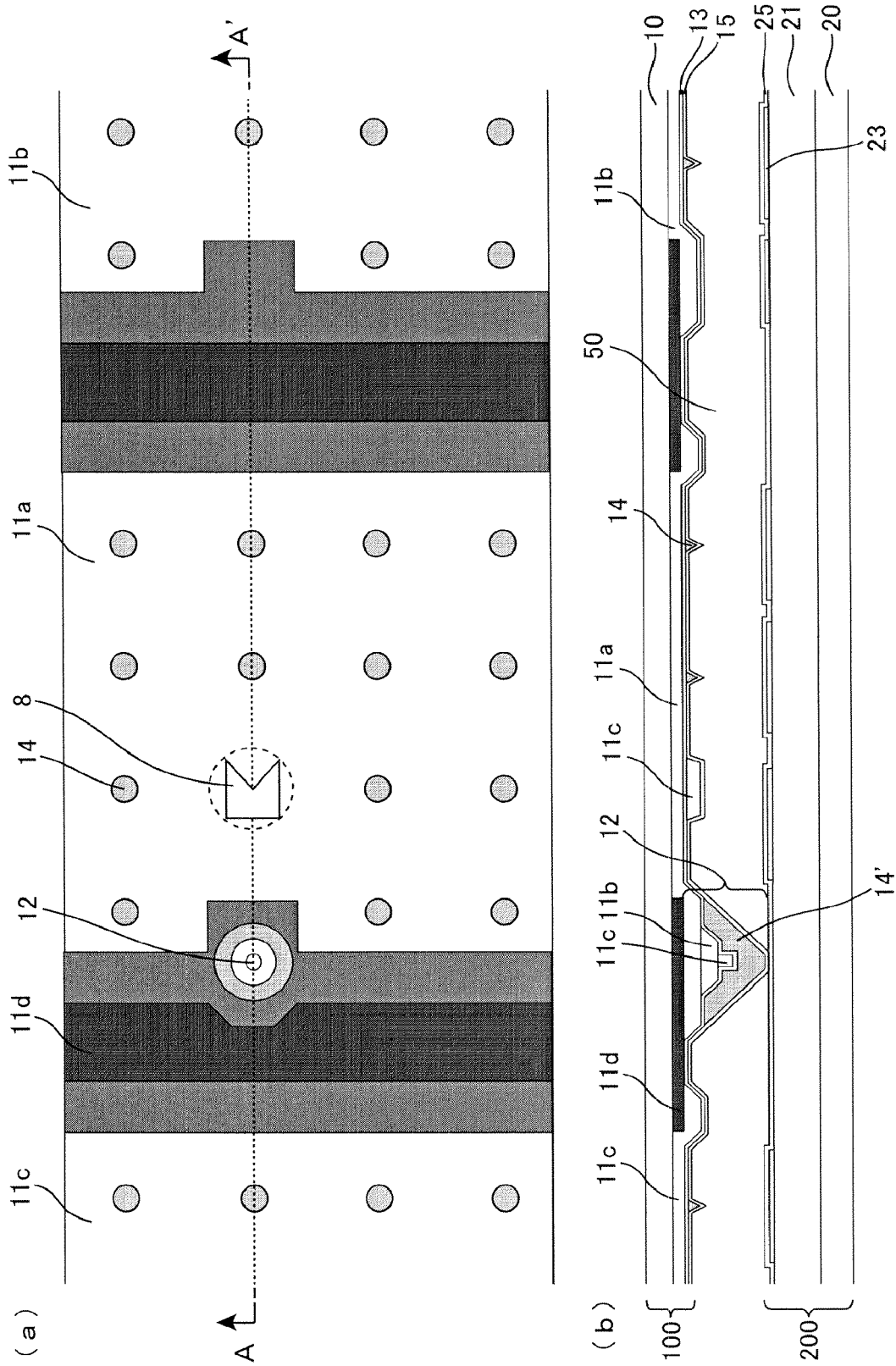
FIG. 78 (*a*) is a schematic plan view showing a constitution of a color filter substrate mounted on a liquid crystal display panel according to Example 78 of the present invention, and FIG. 78 (*b*) is a schematic section view showing the liquid crystal display panel taken along line A-A' in FIG. 78 (*a*).

FIGS. 59 to 66 (*a*)s are schematic plan views showing constitutions of color filter (CF) substrates mounted on liquid crystal display panels according to Examples 59 to 66 of the present invention, and FIGS. 59(*b*) to 66(*b*) are schematic section views respectively showing the liquid crystal display panels taken along lines A-A' in FIGS. 59 to 66 (*a*)s.

The liquid crystal display panel according to Example 59 has the same constitution as that of the liquid crystal display panel according to Example 55 except that the specific structure 8 is a trapezoidal protrusion provided on the BM layer 11*d*. The liquid crystal display panels according to Examples 60 and 61 have the same constitution as that of the liquid crystal display panel according to Example 55 except that the specific structure 8 is a triangular or a rectangular cut part provided on the BM layer 11*d*. The liquid crystal display panel according to Example 62 has the same constitution as that of the liquid crystal display panel according to Example 55 except that the specific structure 8 is provided on the side of the stacked PS 12. The liquid crystal display panel according to Example 63 has the same constitution as that of the liquid crystal display panel according to Example 55 except that the BM layer lid is provided on colored layers 11*a* to 11*c*

(nearer a liquid crystal layer 50). In addition, the liquid crystal display panels according to Examples 64 to 66 have the same constitution as that of the liquid crystal display panel according to Example 55 except that the specific structure 8 is an island part of a rectangle, an octagon or a pentagon having a cut part, provided in the colored layer 11a, the protrusion for controlling an alignment 14 is cone-shaped dot (rivet), and the stacked PS 12 has a planar shape of circle. The same effects as that of Example 55 can be provided also in the liquid crystal display panels of Examples 59 to 66.

Examples 67 to 78

Examples 67 to 78 show various shapes of the specific structure 8 formed using colored layers 11a, 11b and 11c.

FIGS. 67 to 78 (a)s are schematic plan views showing constitutions of color filter (CF) substrates mounted on liquid crystal display panels according to Examples 67 to 78 of the present invention, and FIGS. 67 to 78 (b)s are schematic section views respectively showing the liquid crystal display panels taken along lines A-A' in FIGS. 67 to 78 (a)s.

The liquid crystal display panels according to Examples 67 to 78 have the same constitutions as those of the liquid crystal display panels according to Examples 55 to 66 except that the specific structure 8 is provided using the colored layers 11a, 11b and 11c instead of using the BM layer 11d. Thus, according to the present invention, the specific structure 8 having the same constitution may be formed using the colored layers 11a, 11b and 11c instead of using the BM layer 11d. The specific structure 8 is formed using the colored layer 11c in FIGS. 67 to 73 (Examples 67 to 73) and FIGS. 75 to 78 (Examples 75 to 78), but the specific structure 8 is formed using the colored layer 11a in FIG. 74 (Example 74), since it is provided on the side of the stacked PS 12, According to the liquid crystal display panels according to Examples 67 to 78, a height of the stacked PS 12 can be automatically measured with a height measuring device, since the specific structure 8 formed using the colored layers 11a, 11b and 11c can be recognized by an image recognition device as a positioning pattern. In addition, an intersecting part of an outline of the rib-shaped protrusion for controlling an alignment 64 and an outline of the BM layer 11d can be also recognized by an image recognition device as a positioning pattern.

Example 79

Example 79 shows a configuration in which a BM layer is not arranged as a base of the stacked PS and a rectangular specific structure is formed using the BM layer.

Figure 79:
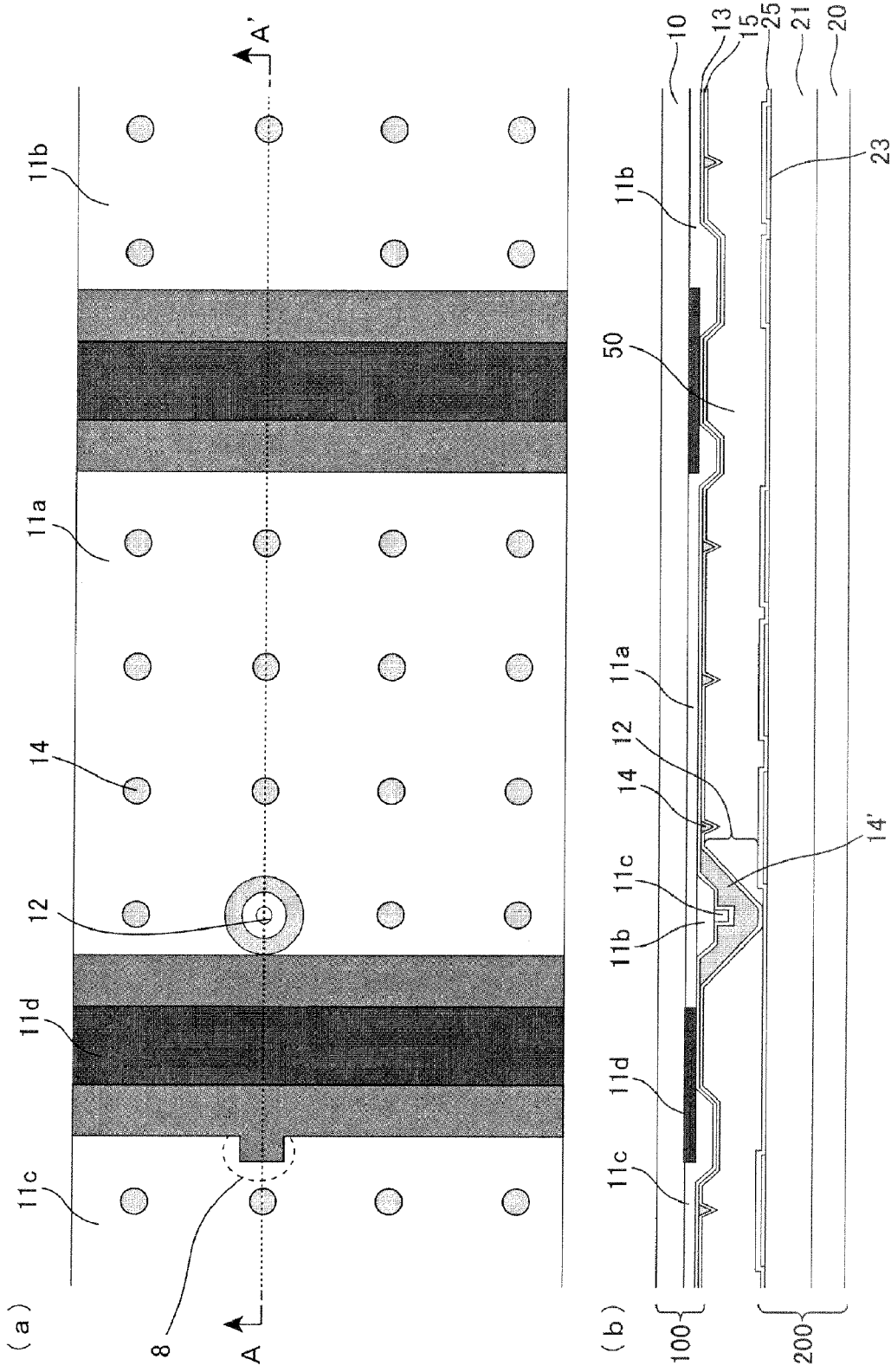
FIG. 79 (*a*) is a schematic plan view showing a constitution of a color filter substrate mounted on a liquid crystal display panel according to Example 79 of the present invention, and FIG. 79 (*b*) is a schematic section view showing the liquid crystal display panel taken along line A-A' in FIG. 79 (*a*).

FIG. 79 (a) is a schematic plan view showing a constitution of a color filter (CF) substrate mounted on a liquid crystal display panel according to Example 79 of the present invention, and FIG. 79 (b) is a schematic section view showing the liquid crystal display panel taken along line A-A' in FIG. 79 (a).

As shown in FIG. 79 (b), the liquid crystal display panel according to Example 79 has a structure in which a liquid crystal layer 50 is sandwiched between the color filter (CF) substrate 100 and the switching element array substrate 200.

The CF substrate 100 has a structure in which the insulating transparent supporting substrate 10, the colored layers comprising the first colored layer 11a, the second colored layer 11b, and the third colored layer 11c formed in a display area on the transparent supporting substrate 10, the black matrix (BM) layer 11d formed in a non-display area on the transparent supporting substrate 10, the ITO transparent opposed electrode 13 formed on the colored layers and the BM layer 11d, a plurality of dot-shaped (rivet-shaped) protrusions for controlling an alignment 14 in form of cones formed in the display area on the ITO transparent opposed electrode 13, and the polyimide alignment layer 15 formed so as to cover an entire substrate surface are stacked. On the other hand, the switching element array substrate 200 has a structure in which the array-side pattern 21 comprising a switching element circuit layer, an interlayer insulation film and the like, the pixel electrode 23 formed in shape of an island, and the polyimide alignment layer 25 are sequentially stacked on the insulating transparent supporting substrate 20. In addition, the polyimide alignment layers 15 and 25 on the CF substrate 100 and the switching element array substrate 200 respectively are formed separately after a series of substrate manufacturing processes. The switching element is not particularly limited and it may be a thin film transistor (TFT) using amorphous silicon, a TFT using polysilicon, a TFT using a continuous grain silicon (CGS), a thin film diode (TFD) such as MIM (Metal Insulator Metal) and the like.

According to the liquid crystal display device in Example 79, a thickness (cell gap) of the liquid crystal layer 50 is maintained by the stacked PS (columnar spacer) 12 formed on the CF substrate 100.

According to Example 79, the stacked PS 12 has a structure in which the first colored layer 11a, the second colored layer 11b, the third colored layer 11c and the protrusion material layer 14' formed of the same material as that of the dot-shaped protrusion for controlling an alignment 14 are sequentially stacked from the side of the transparent supporting substrate 10. According to the first colored layer 11a, a part constituting the stacked PS 12 and a part constituting the display area are integrated. According to the second colored layer 11b, a part constituting the stacked PS 12 and a part constituting the display area are separated and the part constituting the stacked PS 12 has a circular planar shape and formed on a part of the first colored layer 11a. According to the third colored layer 11c, a part constituting the stacked PS 12 and a part constituting the display area are separated and the part constituting the stacked PS 12 is formed in the center of the second colored layer 11b centrically with the second colored layer 11b. According to the protrusion material layer 14', which is the uppermost layer, has a lower end positioned on the first colored layer 11a, and entirely covers the second colored layer 11b and the third colored layer 11c. And the layer 14' has a top of a flat cone shape (its tip end is cut) and having a planar shape of circle. In addition, the rectangular specific structure 8 is provided on the black matrix (BM) layer 11d on the side opposite to the stacked PS 12 as shown by dotted line in the drawing.

According to the CF substrate 100 in the above-described Example 79, a height of the stacked PS 12 can be automatically measured with a height measuring device, since an image recognition device can recognize the entire specific structure 8, a linear part and an angular part of the specific structure 8, an intersecting part of an outline of the specific structure 8 and an outline of the BM layer 11d and the like as a positioning pattern.

In addition, according to the CF substrate 100 in Example 79, disturbance in an alignment of the liquid crystal due to the specific structure 8 hardly affects display quality, since the specific structure 8 is provided in an area overlapping with a light shielding area of the array-side pattern 21 of the switching element array substrate 200 as viewed in plane, and an aperture ratio is not lowered due to the specific structure 8.

In addition, the CF substrate 100 according to Example 79 has characteristics such that (1) it is advantageous in that a cell thickness (thickness of the liquid crystal layer 50) makes thin because the BM layer 11d is not arranged as a base of the stacked PS (columnar spacer), and (2) its structure is more simplified because the specific structure 8 is formed on the side opposite to the stacked PS (columnar spacer) 12 using the BM layer 11d and therefore the specific structure 8 is within a viewing range (measurement area) of the image recognition device, as compared with the case where the specific structure 8 is formed using the colored layers 11a, 11b and 11c.

In addition, according to Example 79, a combination of the colored layers (the first colored layer 11a, the second colored layer 11b and the third colored layer 11c) is not particularly limited, and a combination of a red layer (R), a green layer (G), and a blue layer (B), or a combination of a cyan layer (C), a yellow layer (Y), a magenta layer (M) may be used, or a combination of three colors other than the above-mentioned colors may be used. Furthermore, according to the present invention, the colored layers may comprise four colors or more, and a white layer (W) may be added, for example.

In the CF substrate 100 of Example 79, the stacked PS 12 has a structure in which the first colored layer 11a, the second colored layer 11b and the third colored layer 11c formed of the same material as that of the colored layer in a pixel area, and the protrusion material layer 14' are sequentially stacked from the side of the transparent supporting substrate 10. However, the kind of the colored layer and the order of stacked layers, the number of the stacked layers and the like are not particularly limited in the present invention. That is, the stacked PS 12 may comprise, instead of the first colored layer, a fourth colored layer which is not formed in the pixel area, or may have the second colored layer 11b as the lowermost layer, or may comprise four or more stacked layers.

Similarly, in the CF substrate 100 according to Example 79, the second colored layer 11b and the third colored layer 11c in the part constituting the stacked PS 12 are separated from those in the part constituting the display area. However, the structure of the colored layers constituting the stacked PS 12 is not particularly limited in the present invention, and the part constituting the stacked PS 12 and the part constituting the display area may be integrally provided.

In addition, in the CF substrate 100 according to Example 79, the stacked structure of the colored layers in the stacked PS 12 may be changed, and it may be changed to the stacked PS 12 having the structure shown in FIGS. 2 to 4.

Furthermore, in the CF substrate 100 according to Example 79, the shape of the specific structure 8 may be changed as long as it can be recognized by an image recognition device as a positioning pattern, and it may be changed to the trapezoidal specific structure 8 provided on the BM layer 11d shown in FIG. 59.

Furthermore, the constitution of the CF substrate 100 according to Example 79 may be changed to a constitution in which the BM layer 11d is provided on the colored layers 11a to 11c (on the side of the liquid crystal layer 50).

Example 80

Figure 80:
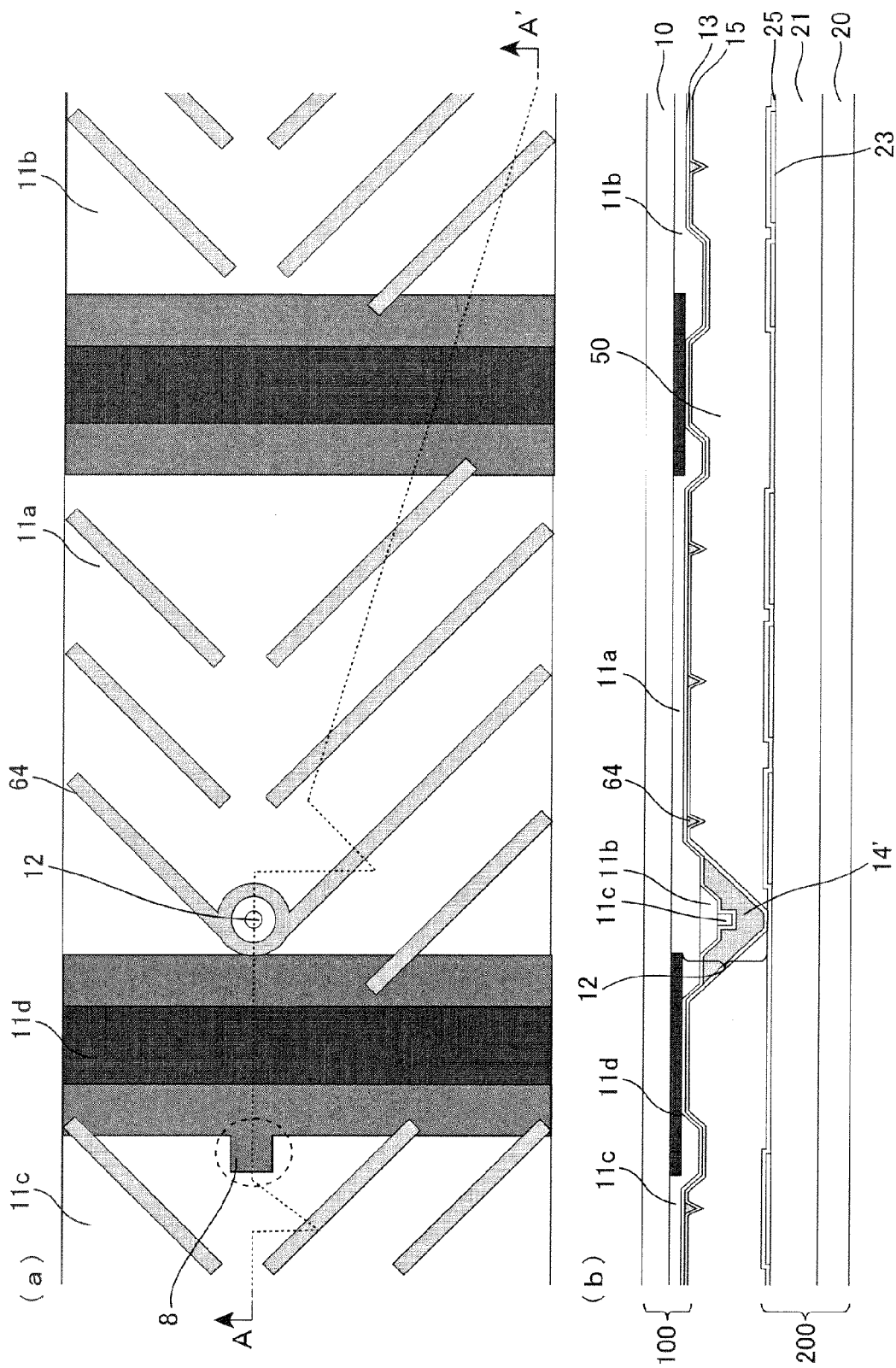
FIG. 80 (*a*) is a schematic plan view showing a constitution of a color filter substrate mounted on a liquid crystal display panel according to Example 80 of the present invention, and FIG. 80 (*b*) is a schematic section view showing the liquid crystal display panel taken along line A-A' in FIG. 80 (*a*).

FIG. 80(a) is a schematic plan view showing a constitution of a color filter (CF) substrate mounted on a liquid crystal display panel according to Example 80 of the present invention, and FIG. 80 (b) is a schematic section view showing the liquid crystal display panel taken along line A-A' in FIG. 80(a).

The liquid crystal display panel according to Example 80 has the same constitution as that of the liquid crystal display panel according to Example 79 except that the protrusion for controlling an alignment 64 is in rib (linear) shape and the circular protrusion material layer 14', which is the uppermost layer of the stacked PS 12, and the protrusion for controlling an alignment 64 are integrally formed.

Also in the CF substrate 100 in this Example 80, a height of the stacked PS 12 can be automatically measured with a height measuring device, since the whole of the specific structure 8 and a linear part and an angular part of the specific structure 8 provided on the BM layer 11d can be recognized by an image recognition device as a positioning pattern.

In addition, the present invention is not limited to the constitution in which the protrusion material layer 14', which is the uppermost layer of the stacked PS 12, and the protrusion for controlling an alignment 64 are integrally formed, the circular protrusion material layer 14' which is the uppermost layer of the stacked PS 12 and the rib-shaped protrusion for controlling an alignment 64 may not be connected.

Comparative Examples 1 to 4

Figure 81:
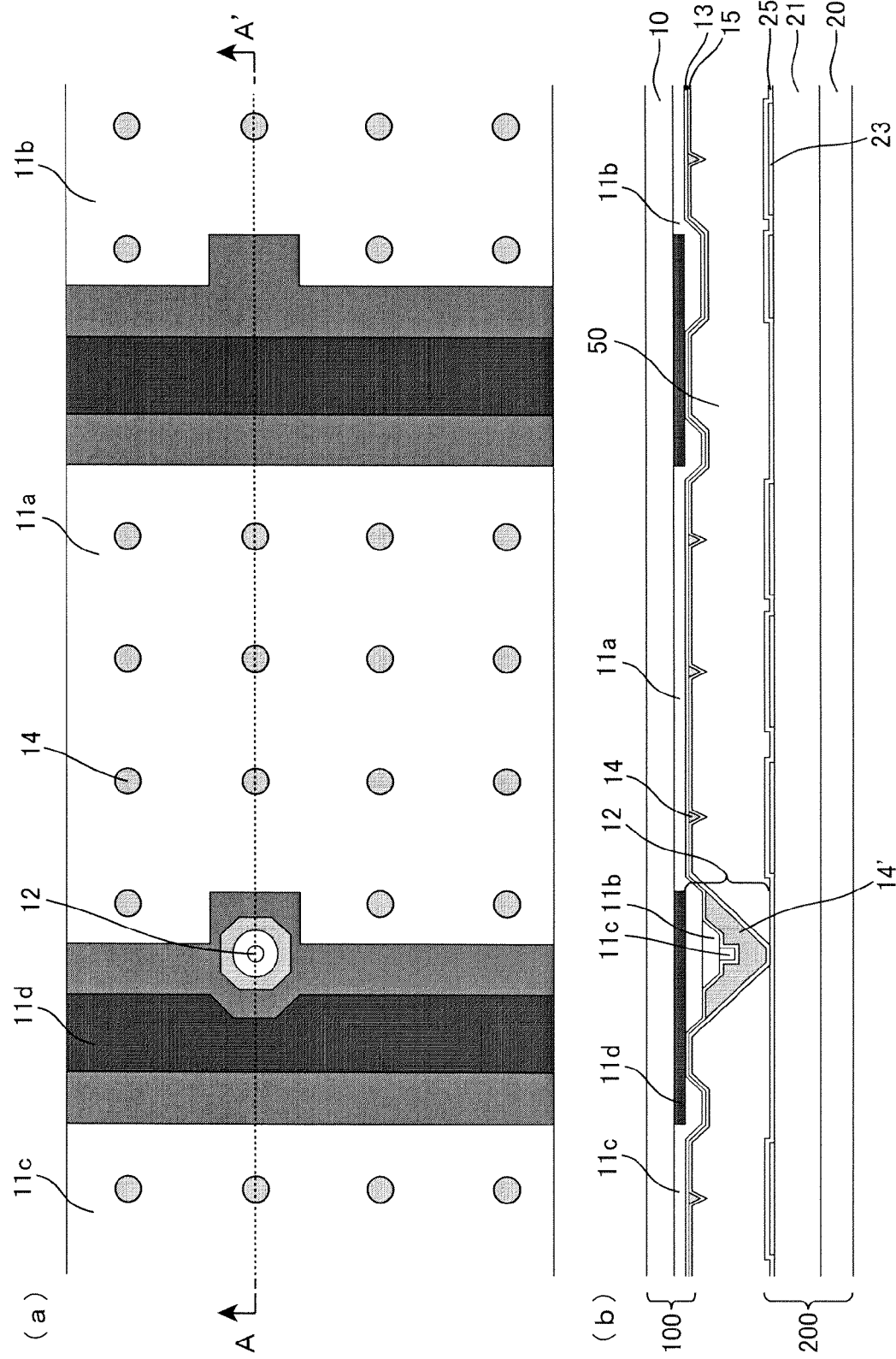
FIG. 81(*a*) is a schematic plan view showing a constitution of a color filter substrate mounted on a liquid crystal display panel according to Comparative Example 1, and FIG. 81 (*b*) is a schematic section view showing the liquid crystal display panel taken along line A-A' in FIG. 81 (*a*).
Figure 82:
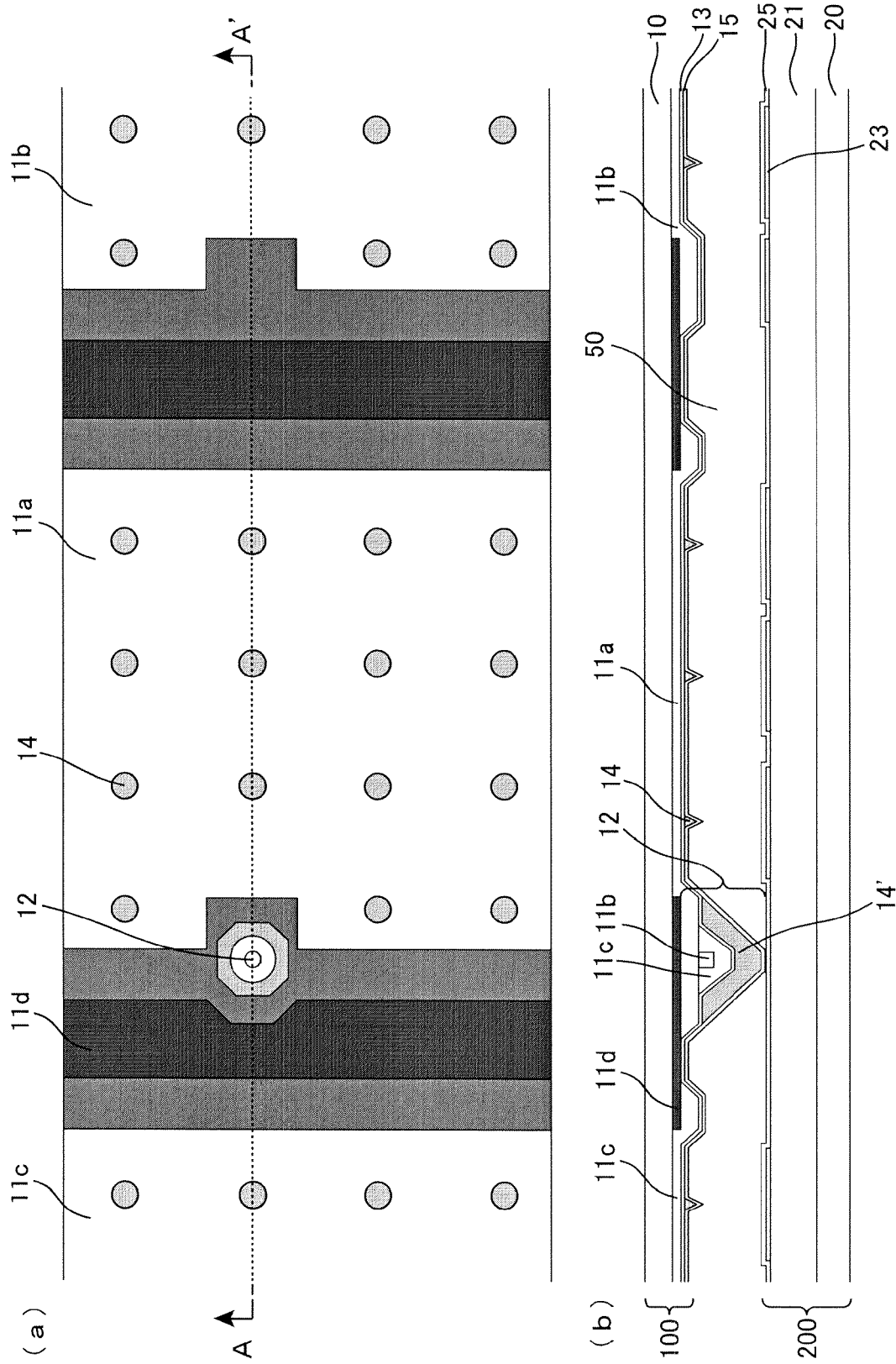
FIG. 82 (*a*) is a schematic plan view showing a constitution of a color filter substrate mounted on a liquid crystal display panel according to Comparative Example 2, and FIG. 82 (*b*) is a schematic section view showing the liquid crystal display panel taken along line A-A' in FIG. 82 (*a*).
Figure 83:
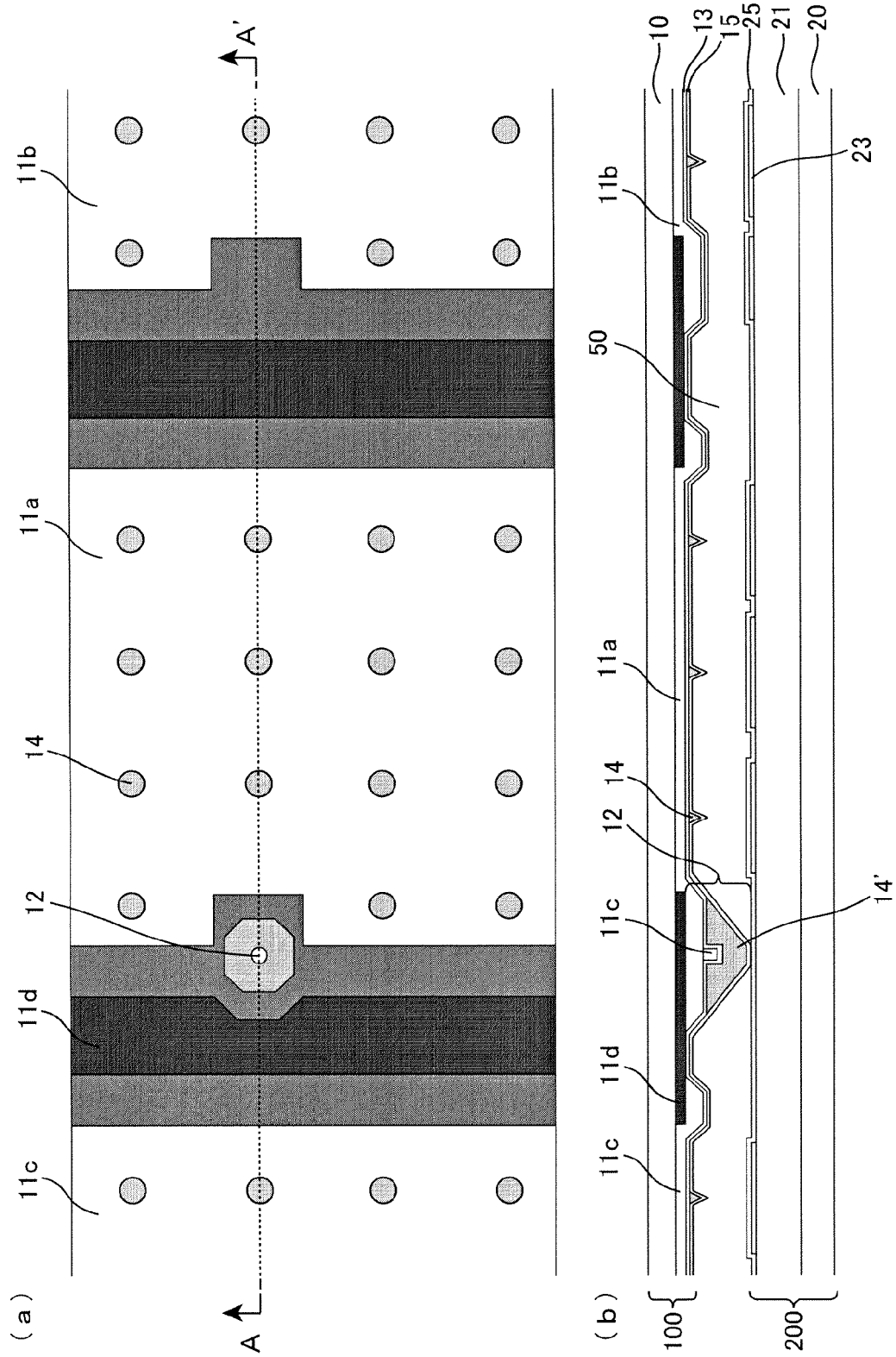
FIG. 83 (*a*) is a schematic plan view showing a constitution of a color filter substrate mounted on a liquid crystal display panel according to Comparative Example 3, and FIG. 83 (*b*) is a schematic section view showing the liquid crystal display panel taken along line A-A' in FIG. 83 (*a*).
Figure 84:
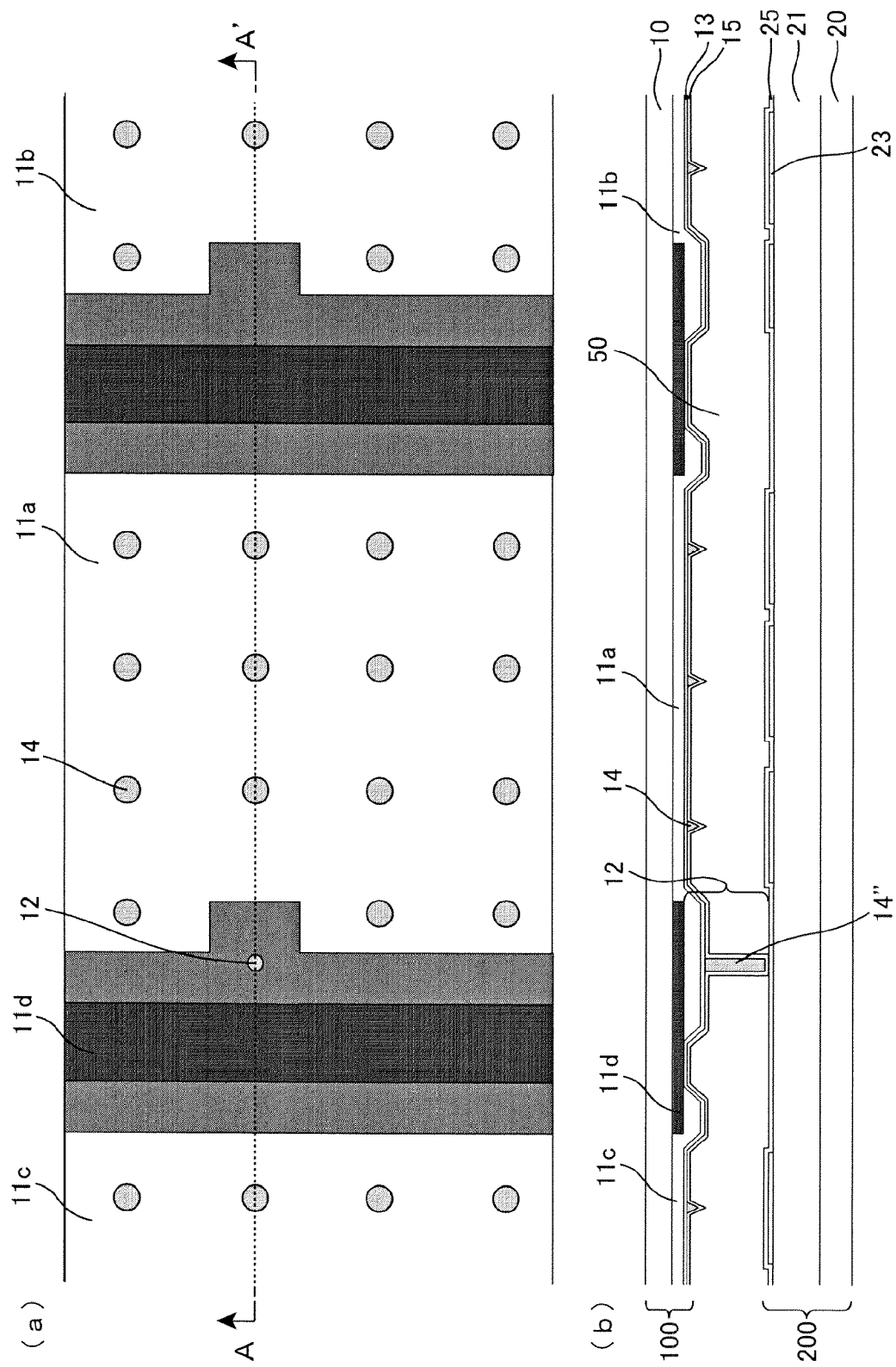
FIG. 84 (*a*) is a schematic plan view showing a constitution of a color filter substrate mounted on a liquid crystal display panel according to Comparative Example 4, and FIG. 84 (*b*) is a schematic section view showing the liquid crystal display panel taken along line A-A' in FIG. 84 (*a*).

FIGS. 81 (a), 82 (a), 83 (a), and 84 (a) are schematic plan views showing constitutions of color filter (CF) substrates mounted on liquid crystal display panels according to Comparative Examples 1 to 4, and FIGS. 81 (b), 82 (b), 83 (b), and 84 (b) are schematic section views respectively showing the liquid crystal display panels taken along lines A-A' in FIGS. 81 to 84 (a)s.

The liquid crystal display panels according to Comparative Examples 1 to 4 respectively have the same constitutions as those of the liquid crystal display panels according to Examples 21 to 23 and 4, except that the specific structure 8 which can be recognized by an image recognition device as a pattern does not exist. A projection part is formed on a BM layer 61d at the foot of the stacked PS 12 in the comparative examples 1 to 4, but it is difficult to recognize the projection part by an image recognition device as a pattern, since the projection part overlaps with the stacked PS 12 as viewed in plane, Therefore, according to the Comparative Examples, a height of the stacked PS 12 cannot be automatically measured with a PS height measuring device, since a structure which is recognized by an image recognition device as a specified pattern does not exist on the substrate.

This Nonprovisional application claims priority (under 35 U.S.C. §119 (a)) on Patent Application No. 2004-263091 filed in Japan on Sep. 9, 2004, Patent Application No. 2005-124330 filed in Japan on Apr. 21, 2005, and Patent Application No. 2005-215044 filed in Japan on Jul. 25, 2005, the entire contents of which are herein incorporated by reference.

What is claimed is:

1. A substrate for liquid crystal display panel comprising a first projection structure and a second projection structure and/or a depression structure,
the substrate for liquid crystal display panel comprising a specific structure at a part of or near the first projection structure,
the specific structure having at least one of a planar shape different from a planar shape of the second projection structure and/or the depression structure and a planar area of ⅔ times or less or 1.5 times or more than a planar area of the second projection structure and/or the depression structure.

2. The substrate for liquid crystal display panel according to claim 1,
wherein the substrate for liquid crystal display panel comprises a columnar spacer as the first projection structure and a dot-shaped protrusion for controlling an alignment as the second projection structure, and the specific structure is provided at a part of or near the columnar spacer.

3. The substrate for liquid crystal display panel according to claim 2,
wherein the columnar spacer has a stacked structure.

4. The substrate for liquid crystal display panel according to claim 2,
wherein a black matrix is not arranged as a base of the columnar spacer.

5. The substrate for liquid crystal display panel according to claim 2,
wherein the planar shape of the dot-shaped protrusion for controlling an alignment is a substantially circular.

6. The substrate for liquid crystal display panel according to claim 1,
wherein the substrate for liquid crystal display panel comprises a specific structure formed of a black matrix near the first projection structure.

7. The substrate for liquid crystal display panel according to claim 1,
wherein the substrate for liquid crystal display panel comprises a specific structure formed of a colored layer near the first projection structure.

8. The substrate for liquid crystal display panel according to claim 1,
wherein the specific structure is provided on a non-display area.

9. The substrate for liquid crystal display panel according to claim 8,
wherein the non-display area is an area overlapping with a black matrix formed in the substrate for liquid crystal display panel as viewed in plane.

10. The substrate for liquid crystal display panel according to claim 8,
wherein the non-display area is an area overlapping with a wiring formed in a substrate facing to the substrate for liquid crystal display panel comprising the specific structure as viewed in plane.

11. The substrate for liquid crystal display panel according to claim 1,
wherein each cell area has the specific structure.

12. The substrate for liquid crystal display panel according to claim 1,
wherein the specific structure is substantially uniformly provided on the substrate surface.

13. The substrate for liquid crystal display panel according to claim 1,
wherein the substrate for liquid crystal display panel is a color filter substrate.

14. A liquid crystal display panel comprising the substrate for liquid crystal display panel according to claim 1.

15. A liquid crystal display device comprising the substrate for liquid crystal display panel according to claim 1.

16. A substrate for liquid crystal display panel comprising a first projection structure and a second projection structure and/or a depression structure,
the first projection structure having a single layer structure and a whole shape of the first projection structure being formed of a specific structure, and
the specific structure having at least one of a planar shape different from a planar shape of the second projection structure and/or the depression structure and a planar area of ⅔ times or less or 1.5 times or more than a planar area of the second projection structure and/or the depression structure.

17. The substrate for liquid crystal display panel according to claim 16,
wherein the substrate for liquid crystal display panel comprises a columnar spacer having a single layer structure as the first projection structure and a dot-shaped protrusion for controlling an alignment as the second projection structure, and the whole shape of the columnar spacer is formed of the specific structure.

18. The substrate for liquid crystal display panel according to claim 17,
wherein the planar shape of the dot-shaped protrusion for controlling an alignment is a substantially circular.

19. The substrate for liquid crystal display panel according to claim 16,
wherein the specific structure is provided on a non-display area.

20. The substrate for liquid crystal display panel according to claim 19,
wherein the non-display area is an area overlapping with a black matrix formed in the substrate for liquid crystal display panel as viewed in plane.

21. The substrate for liquid crystal display panel according to claim 19,
wherein the non-display area is an area overlapping with a wiring formed in a substrate facing to the substrate for liquid crystal display panel comprising the specific structure as viewed in plane.

22. The substrate for liquid crystal display panel according to claim 16,
wherein each cell area has the specific structure.

23. The substrate for liquid crystal display panel according to claim 16,
wherein the specific structure is substantially uniformly provided on the substrate surface.

24. The substrate for liquid crystal display panel according to claim 16,
wherein the substrate for liquid crystal display panel is a color filter substrate.

25. A liquid crystal display panel comprising the substrate for liquid crystal display panel according to claim 16.

26. A liquid crystal display device comprising the substrate for liquid crystal display panel according to claim 16.

* * * * *